United States Patent
Bunker et al.

(10) Patent No.: US 11,941,114 B1
(45) Date of Patent: Mar. 26, 2024

(54) DETERRENCE TECHNIQUES FOR SECURITY AND AUTOMATION SYSTEMS

(71) Applicant: Vivint, Inc., Provo, UT (US)

(72) Inventors: Brandon Bunker, Highland, UT (US); Rongbin Lanny Lin, Draper, UT (US)

(73) Assignee: Vivint, Inc., Provo, UT (US)

( * ) Notice: Subject to any disclaimer, the term of this patent is extended or adjusted under 35 U.S.C. 154(b) by 320 days.

(21) Appl. No.: 17/122,920

(22) Filed: Dec. 15, 2020

Related U.S. Application Data

(63) Continuation-in-part of application No. 15/885,320, filed on Jan. 31, 2018, now Pat. No. 11,488,077.

(51) Int. Cl.

| | |
|---|---|
| G08B 13/196 | (2006.01) |
| G05B 19/042 | (2006.01) |
| G06F 21/55 | (2013.01) |
| G06V 40/20 | (2022.01) |
| G08B 7/06 | (2006.01) |

(52) U.S. Cl.
CPC ......... *G06F 21/554* (2013.01); *G05B 19/042* (2013.01); *G06V 40/25* (2022.01); *G08B 7/064* (2013.01); *G08B 13/196* (2013.01); *G08B 13/19691* (2013.01); *G05B 2219/2614* (2013.01)

(58) Field of Classification Search
USPC ....................................................... 348/152
See application file for complete search history.

(56) References Cited

U.S. PATENT DOCUMENTS

| | | | |
|---|---|---|---|
| 8,618,927 B2 | 12/2013 | Wohlert | |
| 9,058,734 B2 | 6/2015 | Xiao et al. | |
| 9,230,424 B1* | 1/2016 | Scalisi | H04N 7/186 |
| 9,253,455 B1 | 2/2016 | Harrison et al. | |
| 9,318,015 B2 | 4/2016 | Kates | |
| 9,361,521 B1* | 6/2016 | McLean | G06F 3/167 |
| 9,508,239 B1* | 11/2016 | Harrison | G08B 13/2462 |
| 9,643,722 B1* | 5/2017 | Myslinski | H04N 7/183 |
| 9,696,702 B2 | 7/2017 | Gruenbacher et al. | |
| 9,781,494 B1* | 10/2017 | Barakat | H04Q 9/00 |
| 10,086,782 B1 | 10/2018 | Konrardy et al. | |
| 10,229,394 B1 | 3/2019 | Davis et al. | |
| 10,346,811 B1* | 7/2019 | Jordan | G08B 21/0461 |
| 10,412,811 B1 | 9/2019 | Siminoff et al. | |

(Continued)

OTHER PUBLICATIONS

S. K. Das and D. J. Cook, "Designing and modeling smart environments," 2006 International Symposium on a World of Wireless, Mobile and Multimedia Networks (WoWMoM'06), Buffalo-Niagara Falls, NY, 2006, p. 5.

(Continued)

*Primary Examiner* — Nigar Chowdhury
(74) *Attorney, Agent, or Firm* — Foley & Lardner LLP

(57) ABSTRACT

Methods, systems, and devices for deterrence techniques using a security and automation system are described. In one method, the system may receive a set of inputs from one or more sensors of the security and automation system. The system may determine one or more characteristics of a person proximate the security and automation system based at least in part on the received set of inputs. The system may predict an event based at least in part on a correlation between the one or more characteristics and the event. The system may perform one or more security and automation actions prior to the predicted event.

29 Claims, 33 Drawing Sheets

(56) References Cited

U.S. PATENT DOCUMENTS

| | | | | |
|---|---|---|---|---|
| 10,474,168 | B1* | 11/2019 | Graham | G05D 1/12 |
| 10,984,641 | B2 | 4/2021 | Modestine et al. | |
| 10,986,717 | B1* | 4/2021 | Fu | H05B 47/11 |
| 2005/0188076 | A1 | 8/2005 | Rayburn et al. | |
| 2009/0167862 | A1* | 7/2009 | Jentoft | G08B 13/19641 |
| | | | | 348/143 |
| 2013/0222756 | A1* | 8/2013 | Van Heugten | G02B 5/1828 |
| | | | | 349/200 |
| 2014/0084165 | A1* | 3/2014 | Fadell | H05B 47/19 |
| | | | | 250/340 |
| 2014/0160251 | A1* | 6/2014 | Halamish | G06T 19/006 |
| | | | | 348/47 |
| 2014/0333776 | A1* | 11/2014 | Dedeoglu | H04N 21/44008 |
| | | | | 348/159 |
| 2014/0365380 | A1 | 12/2014 | Kolay et al. | |
| 2015/0154850 | A1* | 6/2015 | Fadell | G06Q 10/083 |
| | | | | 340/501 |
| 2015/0193127 | A1* | 7/2015 | Chai | G06F 3/04817 |
| | | | | 715/719 |
| 2015/0310381 | A1 | 10/2015 | Lyman et al. | |
| 2015/0312531 | A1* | 10/2015 | Samad | H04N 7/186 |
| | | | | 348/143 |
| 2016/0071183 | A1 | 3/2016 | Joshi et al. | |
| 2016/0180620 | A1 | 6/2016 | Eyring et al. | |
| 2016/0188126 | A1 | 6/2016 | Dides | |
| 2016/0195856 | A1* | 7/2016 | Spero | H05B 47/125 |
| | | | | 700/90 |
| 2016/0274230 | A1* | 9/2016 | Wu | G01S 7/412 |
| 2016/0284170 | A1* | 9/2016 | Kasmir | H04M 11/025 |
| 2017/0034485 | A1 | 2/2017 | Scalisi | |
| 2017/0085844 | A1* | 3/2017 | Scalisi | G08B 13/1966 |
| 2017/0251173 | A1* | 8/2017 | Siminoff | G06T 7/70 |
| 2017/0280109 | A1* | 9/2017 | Scalisi | H04N 5/23238 |
| 2017/0322942 | A1* | 11/2017 | Duda | H04N 21/84 |
| 2017/0358186 | A1* | 12/2017 | Harpole | G08B 13/19615 |
| 2018/0034657 | A1 | 2/2018 | Brown et al. | |
| 2018/0047128 | A1* | 2/2018 | Ross | G06T 1/20 |
| 2018/0048688 | A1* | 2/2018 | Siminoff | G06V 10/143 |
| 2018/0063478 | A1* | 3/2018 | Siminoff | H04N 7/186 |
| 2018/0075718 | A1* | 3/2018 | Modestine | G06T 7/246 |
| 2018/0082554 | A1* | 3/2018 | Siminoff | G08B 13/19613 |
| 2018/0091569 | A1* | 3/2018 | Roth | H04N 21/43615 |
| 2018/0091730 | A1* | 3/2018 | Nixon | H04N 5/23296 |
| 2018/0101734 | A1* | 4/2018 | Lemberger | H04N 21/4223 |
| 2018/0101735 | A1* | 4/2018 | Lemberger | H04N 21/2743 |
| 2018/0103200 | A1* | 4/2018 | Bracy | G08B 5/36 |
| 2018/0114420 | A1* | 4/2018 | Siminoff | G08B 13/19606 |
| 2018/0146169 | A1* | 5/2018 | Siminoff | G08B 13/19602 |
| 2018/0151039 | A1* | 5/2018 | Lemberger | H04L 12/4625 |
| 2018/0165933 | A1* | 6/2018 | Siminoff | H04N 5/247 |
| 2018/0176516 | A1* | 6/2018 | Modestine | H04N 21/2187 |
| 2018/0176517 | A1* | 6/2018 | Modestine | H04M 1/0291 |
| 2018/0192009 | A1* | 7/2018 | Jeong | H04N 7/186 |
| 2018/0204433 | A1* | 7/2018 | Takahashi | G08B 13/19645 |
| 2018/0205911 | A1* | 7/2018 | Siminoff | H04N 7/142 |
| 2018/0231653 | A1* | 8/2018 | Pradeep | G06V 40/10 |
| 2018/0300557 | A1* | 10/2018 | Rodenas | G08B 13/19613 |
| 2019/0020669 | A1* | 1/2019 | Glatfelter | G06N 20/00 |
| 2019/0027255 | A1* | 1/2019 | D'Amelia | G08B 31/00 |
| 2019/0033446 | A1* | 1/2019 | Bultan | G01S 15/66 |
| 2019/0108404 | A1* | 4/2019 | Xu | G08B 13/19604 |
| 2019/0108405 | A1* | 4/2019 | Xu | G06V 20/52 |
| 2019/0122522 | A1* | 4/2019 | Stefanski | G08B 21/0423 |
| 2019/0123931 | A1 | 4/2019 | Schuster et al. | |
| 2019/0141919 | A1* | 5/2019 | Kundra | G06V 20/188 |
| | | | | 348/159 |
| 2020/0159723 | A1 | 5/2020 | Goyal | |
| 2020/0161520 | A1* | 5/2020 | Hugon | H01L 25/0753 |
| 2020/0358908 | A1 | 11/2020 | Scalisi | |
| 2022/0368556 | A1 | 11/2022 | Scalis | |

OTHER PUBLICATIONS

S. K. Das and D. J. Cook, "Designing and modeling smart environments," 2006 International Symposium on a World of Wireless, Mobile and Multimedia Networks (WoWMoM'06), Buffalo-Niagara Falls, NY, 2006, pp. 5 pp. 494, doi: 10.1109/WOWMOM. 2006.35. (Year: 2006).

* cited by examiner

DETERRENCE TECHNIQUES FOR SECURITY AND AUTOMATION SYSTEMS

CROSS-REFERENCE TO RELATED APPLICATIONS

This application is a continuation-in-part of U.S. patent application Ser. No. 15/885,320, titled "SMART SENSING TECHNIQUES," filed Jan. 31, 2018, pending, the disclosure of which is incorporated by reference herein in its entirety.

BACKGROUND

The present disclosure, for example, relates to security and automation systems, and more particularly to deterrence techniques for security and automation systems.

Security and automation systems are widely deployed in a smart environment (e.g., a residential, a commercial, or an industrial setting) to provide various types of communication and functional features such as monitoring, communication, notification, and/or others. These systems may be capable of supporting communication with a person through a communication connection or a system management action. For example, a smart home environment utilizing a security and automation system may provide automated control related to a subsystem of the smart home such as a heating, ventilation and air condition (HVAC) system, a lighting system, a home theater and entertainment system, or a security system. Although some techniques related to sensing may improve the reliability of security and automation systems by informing personnel of sensed conditions, these techniques are inefficient and often require unnecessary intervention by the personnel. Additionally, while some systems may be configured to report an occurrence of an event, a user of such systems may still experience theft, property damage, etc.

SUMMARY

The described techniques relate to improved methods, systems, or apparatuses that support deterrence techniques for security and automation systems. A control panel of a security and automation system may monitor and scan a number of devices (e.g., one or more sensors) in a smart environment. The smart environment may be, for example, a residential structure, a commercial building (e.g., an office, grocery store, or retail store), or an industrial facility (e.g., manufacturing factory), among others. The control panel may be in communication with at least one sensing device to monitor a parameter of a resource associated with the smart environment. A resource may be a service or a product. The service may be a structure management service (e.g., a gardening and lawn care service) or a personal service (e.g., a babysitting service) related to an individual associated with the smart environment. The product may be a household appliance (e.g., a dishwasher), a consumable item, or a household item (e.g., cosmetics, laundry detergent, lightbulbs, health related items).

The control panel may predict a future change in a condition associated with the parameter of the resource based on the monitoring. To predict the future change, the control panel may track real-time usage data and perform a statistical analysis, using the real-time usage data and historical usage data, to compute a prediction of the future change in the condition. In some examples, the control panel may apply machine learning techniques (e.g., support vector machines, decision trees, Naïve Bayes classification, ordinary least squares regression, logistic regression, neural network techniques, and the like) to predict the future change in the condition. Once the control panel has computed a prediction, the control panel may autonomously proceed to perform a function to handle the resource (e.g., replace, replenish, order, schedule), prior to the future change occurring.

Conventional techniques related to sensing may improve the dependability of the security and automation system by informing an individual of sensed conditions. However these techniques are inconvenient and demand explicit intervention by the individual. In view of the foregoing, it is desirable to provide a smart sensing system which facilitates monitoring, predicting, and automatic autonomous functions performed by the security and automation system to handle resources of the smart home as necessary, or scheduling services related to the smart home. Benefits of the present systems and methods include smart sensing, by enabling the security and automation system to intelligently monitor, predict, and automatically or autonomously handle resources of the smart home. Thereby improving the operating characteristics of the security and automation system (e.g., managing CPU and memory usage levels, reducing latency, decreasing power consumption).

Additionally or alternatively, the present disclosure may support one or more deterrence techniques. The security and automation system may be configured to receive a set of inputs from one or more sensors. For example, the system may receive a video input, an image input, an audio input, or any combination thereof, among other examples of inputs. The system may determine one or more characteristics of a person proximate the system based on the received inputs. For example, the system may analyze data associated with the person (e.g., the system may analyze a gait of the person, biometrics of the person, clothing of the person, among other examples), determine one or more behaviors of the person, request open source data from a community, analyze the one or more inputs using artificial intelligence (AI), or any combination thereof.

The system may predict an event based on the determined one or more characteristics. For example, the system may determine that the one or more characteristics correspond to the event (e.g., the system may determine a likelihood that the person is going to perpetrate the event). The system may perform one or more actions prior to the predicted event. For example, the system may emit a sound or light (e.g., random or variable sounds, directional lights or sounds, emitting a sound indicating recognition of the person based on identifying the person, etc.), send a drone to follow the person, perform an AI generated response, or any combination thereof. Such techniques may enable the system to deter a person from performing the predicted event or influence a behavior of the person, which may result in enhanced security and a reduced likelihood of crime, among other benefits.

A method for smart sensing using a security and automation system is described. The method may include monitoring a parameter of a resource associated with a structure, predicting a future change in condition associated with the parameter based at least in part on the monitoring, and performing a function using the security and automation system based at least in part on the predicting.

An apparatus for smart sensing using a security and automation system is described. The apparatus may include means for monitoring a parameter of a resource associated with a structure, means for predicting a future change in condition associated with the parameter based at least in part on the monitoring, and means for performing a function using the security and automation system based at least in part on the predicting.

Another apparatus for smart sensing using a security and automation system is described. The apparatus may include a processor, memory in electronic communication with the processor, and instructions stored in the memory. The instructions may be operable to cause the processor to monitor a parameter of a resource associated with a structure, predict a future change in condition associated with the parameter based at least in part on the monitoring, and perform a function using the security and automation system based at least in part on the predicting.

A non-transitory computer-readable medium for smart sensing using a security and automation system is described. The non-transitory computer-readable medium may include instructions operable to cause a processor to monitor a parameter of a resource associated with a structure, predict a future change in condition associated with the parameter based at least in part on the monitoring, and perform a function using the security and automation system based at least in part on the predicting.

Some examples of the method, apparatus, and non-transitory computer-readable medium described above for monitoring the parameter of the resource may further include processes, features, means, or instructions for receiving real-time usage data of the resource from a sensor, and tracking real-time usage data based at least in part on the usage data. In some examples, of the method, apparatus, and non-transitory computer-readable medium described above for performing the function may be based at least in part on tracking the real-time usage data.

In some examples of the method, apparatus, and non-transitory computer-readable medium described above, the resource may include a service or a product. Some examples of the method, apparatus, and non-transitory computer-readable medium described above may further include processes, features, means, or instructions for identifying the service or the product, or both, retrieving, from a database, historical usage data associated with the service or the product, or both based at least in part on the identifying, and comparing the retrieved historical usage data with the real-time usage data to compute a usage model. In some examples, of the method, apparatus, and non-transitory computer-readable medium described above for predicting the future change in condition associated with the parameter may be based at least in part on the usage model.

In some examples of the method, apparatus, and non-transitory computer-readable medium described above, the function may be performed automatically based at least in part on a pre-configured setting of the security and automation system. Some examples of the method, apparatus, and non-transitory computer-readable medium described above may further include processes, features, means, or instructions for identifying schedule data of an individual associated with the structure, and automatically scheduling a service personnel to visit the structure and perform an action associated with the service based at least in part on the schedule data of the individual. In some examples, of the method, apparatus, and non-transitory computer-readable medium described above for performing the function may include automatically scheduling the service personnel.

Some examples of the method, apparatus, and non-transitory computer-readable medium described above for automatically scheduling the service personnel may further include processes, features, means, or instructions for identifying a service provider associated with the service based at least in part on a pre-configured setting, and transmitting, to a remote device of the service provider, a message indicating a service request. In some examples, the message may include at least one of a payment information, a geolocation information of the structure, a contact information of the individual, or any combination thereof. Some examples of the method, apparatus, and non-transitory computer-readable medium described above may further include processes, features, means, or instructions for receiving, from the remote device, an acknowledgment message in response to the service request.

Some examples of the method, apparatus, and non-transitory computer-readable medium described above may further include processes, features, means, or instructions for detecting the service personnel based at least in part on sensor data received from a sensor, identifying a time associated with the detecting, comparing the identified time to a scheduled service time, validating that the identified time is within a threshold limit of the scheduled service time, and providing, to a device of the service personnel, access information to the structure based at least on the validating, wherein the access information comprises at least one of a random code, a personal identification number (PIN), or instructions for providing the service to a designated zone of the structure, or any combination thereof.

Some examples of the method, apparatus, and non-transitory computer-readable medium described above for performing the function may further include processes, features, means, or instructions for providing to the device of the service personnel the access information to the structure.

Some examples of the method, apparatus, and non-transitory computer-readable medium described above may further include processes, features, means, or instructions for operating a garage door opener based at least in part on the validating. Some examples of the method, apparatus, and non-transitory computer-readable medium described above for performing the function may include operating the garage door opener.

Some examples of the method, apparatus, and non-transitory computer-readable medium described above may further include processes, features, means, or instructions for determining that the product may be a consumable item, identifying a consumption rate of the consumable item based at least in part on a consumption model of the consumable item, and automatically requesting a purchase order with a third-party enterprise to restock and deliver the consumable item to the structure. In some examples of the method, apparatus, and non-transitory computer-readable medium described above, the consumable item may include at least one of food or beverages, or both.

Some examples of the method, apparatus, and non-transitory computer-readable medium described above may further include processes, features, means, or instructions for determining that the product may be an apparatus or a household item, identifying a usage rate of the apparatus or the household item based at least in part on a usage model of the apparatus or the household item, including detection of changes such as additional residents or predicted changes for upcoming events such as holidays or birthdays, and automatically requesting a purchase order or a maintenance order with a third-party enterprise to restock and deliver the household item to the structure or provide a maintenance service of the apparatus.

Some examples of the method, apparatus, and non-transitory computer-readable medium described above may further include processes, features, means, or instructions for establishing a connection with the apparatus, and retrieving specification information associated with the apparatus based at least in part on performing a scan using the established connection. In some examples, the specification information may include warranty coverage information, appliance repair and support information, vendor information, an energy consumption and cost report of operating the apparatus, or any combination thereof.

Some examples of the method, apparatus, and non-transitory computer-readable medium described above for performing the function may further include processes, features, means, or instructions for determining a set of recommended actions to perform based at least in part on the future change in condition, generating a message indicating the future change in condition and an option to select at least one recommended action from the set, and transmitting the message to a device of an individual associated with the secunty and automation system.

Some examples of the method, apparatus, and non-transitory computer-readable medium described above may further include processes, features, means, or instructions for receiving, from the device, a message indicating a selection of a recommended action from the set. Some examples of the method, apparatus, and non-transitory computer-readable medium described above for performing the function may be based at least in part on the received message.

In some examples of the method, apparatus, and non-transitory computer-readable medium described above, the service may be a structure management service or a personal service related to an individual associated with the structure. In some examples of the method, apparatus, and non-transitory computer-readable medium described above, the structure management service comprises at least one of a gardening and lawn care service, an internet-provider service, a housekeeping service, a laundry service, a plumbing service, a maintenance service, a termite and pest control service, a water softener service, or any combination thereof. In some examples of the method, apparatus, and non-transitory computer-readable medium described above, the personal service comprises at least one of a babysitting service, a nursing care service, a pet sitting service, a medical provider visit service, or any combination thereof.

A method for a security and automation system is described. The method may include receiving a set of inputs from one or more sensors of the security and automation system, determining one or more characteristics of a person proximate the security and automation system based at least in part on the received set of inputs, predicting an event based at least in part on a correlation between the one or more characteristics and the event, and performing one or more security and automation actions prior to the predicted event.

An apparatus for a security and automation system is described. The apparatus may include a processor, memory in electronic communication with the processor, and instructions stored in the memory. The instructions may be executable by the processor to cause the apparatus to receive a set of inputs from one or more sensors of the security and automation system, determine one or more characteristics of a person proximate the security and automation system based at least in part on the received set of inputs, predict an event based at least in part on a correlation between the one or more characteristics and the event, and perform one or more security and automation actions prior to the predicted event.

Another apparatus for a security and automation system is described. The apparatus may include means for receiving a set of inputs from one or more sensors of the security and automation system, means for determining one or more characteristics of a person proximate the security and automation system based at least in part on the received set of inputs, means for predicting an event based at least in part on a correlation between the one or more characteristics and the event, and means for performing one or more security and automation actions prior to the predicted event.

A non-transitory computer-readable medium storing code for a security and automation system is described. The code may include instructions executable by a processor to receive a set of inputs from one or more sensors of the security and automation system, determine one or more characteristics of a person proximate the security and automation system based at least in part on the received set of inputs, predict an event based at least in part on a correlation between the one or more characteristics and the event, and perform one or more security and automation actions prior to the predicted event.

Some examples of the method, apparatuses, and non-transitory computer-readable medium described herein may further include operations, features, means, or instructions for receiving a video input, an image input, an audio input, or a combination thereof, from a camera associated with the security and automation system, wherein at least one sensor of the one or more sensors comprises the camera.

In some examples of the method, apparatuses, and non-transitory computer-readable medium described herein, determining the one or more characteristics may include operations, features, means, or instructions for analyzing a gait of the person, a physical behavior of the person, a clothing of the person, or an object carried by the person, or any combination thereof and determining, based at least in part on the analyzing, a likelihood that the person may be to perpetrate the predicted event.

In some examples of the method, apparatuses, and non-transitory computer-readable medium described herein, determining the one or more characteristics may include operations, features, means, or instructions for determining that the received set of inputs satisfy one or more thresholds, wherein predicting the event may be based at least in part on the received set of inputs satisfying the one or more thresholds.

Some examples of the method, apparatuses, and non-transitory computer-readable medium described herein may further include operations, features, means, or instructions for determining a frequency that the person may be located within a distance of an object and determining that the frequency satisfies a threshold, wherein predicting the event may be based at least in part on the frequency that the person may be located within the distance of the object satisfying the threshold.

In some examples of the method, apparatuses, and non-transitory computer-readable medium described herein, receiving the set of inputs may include operations, features, means, or instructions for receiving data associated with a security and automation community, wherein predicting the event may be based at least in part on the received data associated with the security and automation community.

In some examples of the method, apparatuses, and non-transitory computer-readable medium described herein, determining the one or more characteristics may include operations, features, means, or instructions for selecting one or more events, people, scenarios, or activities, or any combination thereof, based at least in part on receiving the set of inputs and transmitting a notification to at least one person of a group of personnel based at least in part on the selecting, wherein the notification identifies the selected one or more events, people, scenarios, activities, or any combination thereof.

In some examples of the method, apparatuses, and non-transitory computer-readable medium described herein, performing the one or more security and automation actions may include operations, features, means, or instructions for identifying a setting of the security and automation system and emitting a sound based at least in part on the identified setting.

Some examples of the method, apparatuses, and non-transitory computer-readable medium described herein may further include operations, features, means, or instructions for adjusting the sound based at least in part on the identified setting and emitting, at a second time prior to the predicted event, the adjusted sound.

Some examples of the method, apparatuses, and non-transitory computer-readable medium described herein may further include operations, features, means, or instructions for selecting the sound from a plurality of sounds based at least in part on a random selection procedure.

Some examples of the method, apparatuses, and non-transitory computer-readable medium described herein may further include operations, features, means, or instructions for sending a drone to track the person and receiving, from the drone, data associated with the person.

Some examples of the method, apparatuses, and non-transitory computer-readable medium described herein may further include operations, features, means, or instructions for identifying the person based at least in part on stored information or biometric information, or both, wherein performing the one or more security and automation actions may be based at least in part on the identified person.

Some examples of the method, apparatuses, and non-transitory computer-readable medium described herein may further include operations, features, means, or instructions for emitting a sound based at least in part on the identified person, wherein the sound comprises a command and an indication that the person may have been identified.

Some examples of the method, apparatuses, and non-transitory computer-readable medium described herein may further include operations, features, means, or instructions for selecting the one or more security and automation actions from a set of configured security and automation actions based at least in part on the identified person.

Some examples of the method, apparatuses, and non-transitory computer-readable medium described herein may further include operations, features, means, or instructions for identifying a first classification of the event at a first time, performing a first action of the one or more security and automation actions based at least in part on the identified first classification, identifying a second classification of the event based at least in part on performing the first action, and performing a second action of the one or more security and automation actions based at least in part on the identified second classification.

The foregoing has outlined rather broadly the features and technical advantages of examples according to this disclosure so that the following detailed description may be better understood. Additional features and advantages will be described below. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein—including their organization and method of operation—together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following a first reference label with a dash and a second label that may distinguish among the similar components. However, features discussed for various components—including those having a dash and a second reference label—apply to other similar components. If only the first reference label is used in the specification, the description is applicable to any one of the similar components having the same first reference label irrespective of the second reference label.

DETAILED DESCRIPTION

Figure 1:
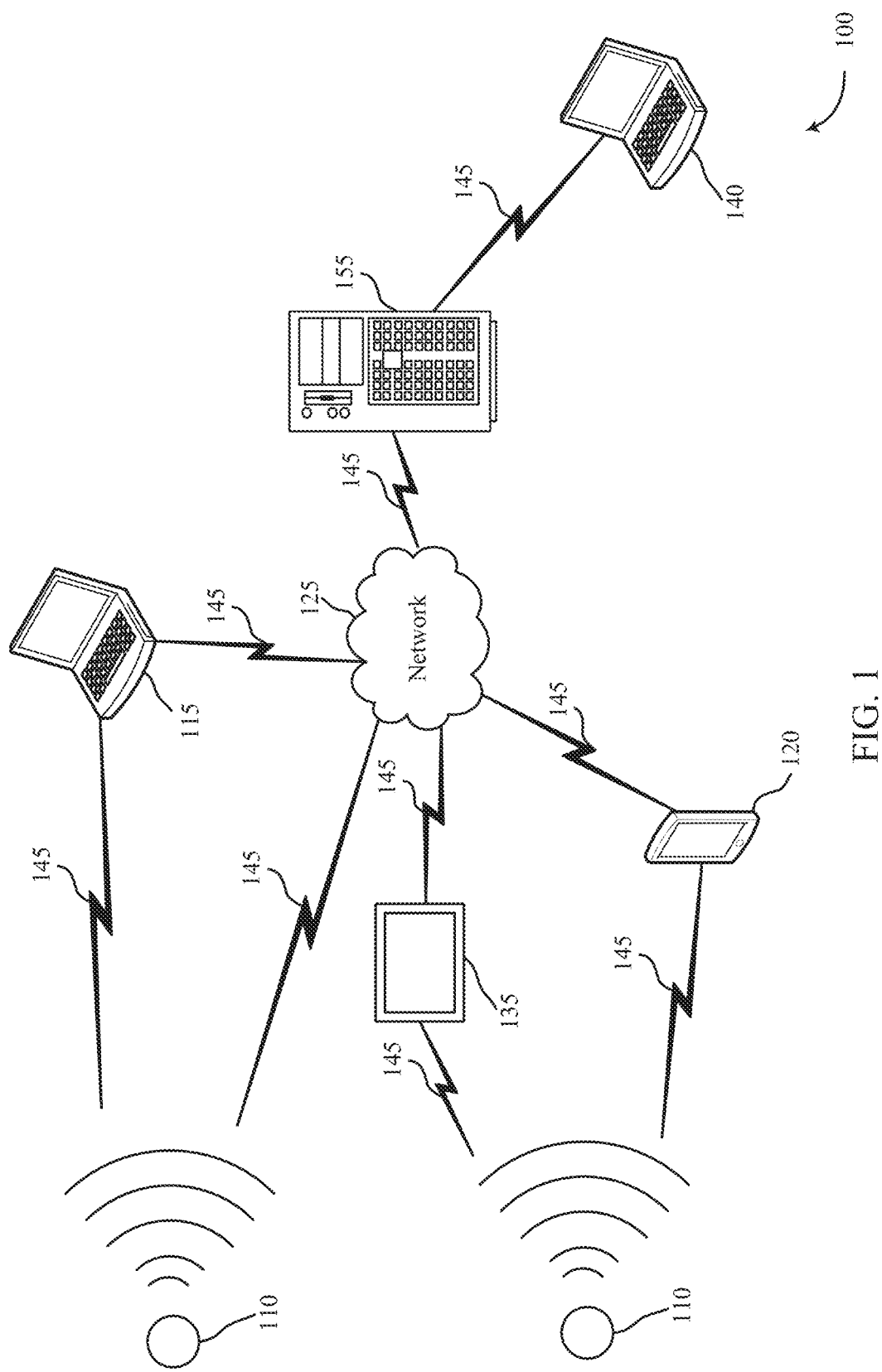
FIG. 1 illustrates an example of a security and automation system in accordance with aspects of the present disclosure.

The described techniques relate to improved methods, systems, or apparatuses that support smart sensing using a security and automation system. The smart home environment may also have a control panel that an individual may use to apply settings, preferences, and reminders, which the system may use in combination with additional data received from a sensing device (e.g., a sensor), to provide programmed control to a subsystem of the security and automation system (e.g., a heating, ventilation and air condition (HVAC) system, a lighting system, a home theater and entertainment system, or a security system). In some cases, a sensing device may be a multi-sensing device capable of sensing multiple conditions (e.g., motion, temperature, light, audio).

In some cases, the security and automation system may learn a behavior and patterns of the individual using the applied settings, preferences, and reminders, for executing operations related to the security and automation system. For example, the security and automation system may learn a schedule (e.g., school schedule, work agenda) of an individual (e.g., a parent, a child) using profile information saved with the system and data received from a sensor, to control a subsystem such as a HVAC system.

The control panel may be in communication with at least one sensing device to monitor a parameter of a resource associated with a smart environment. A resource may be a service or a product. The control panel may predict a future change in a condition associated with the parameter of the resource based on the monitoring. To predict the future change, the control panel may track real-time usage data and perform a statistical analysis, using the real-time usage data and historical usage data, to compute a prediction of the future change in the condition. In some examples, the control panel may apply machine learning techniques to predict the future change in the condition. Once the control panel has computed a prediction, the control panel may autonomously proceed to perform a function to handle the resource (e.g., replace, replenish, order, schedule), prior to the future change occurring.

In some cases, the at least one sensing device may be a standalone sensor or may be embedded, installed, positioned, or integrated with a component associated with the security and automation system. The at least one sensing device may record, track, and provide information to the control panel relating to a status of the component. In some cases, the status may include an indication of whether the component or a resource of the component requires a modification, an update, a replacement, or a replenishment, or any combination thereof.

The control panel may receive and process the information to identify a function to perform. In some examples, processing the information may include identifying information associated with the component, a condition at or related to the smart environment, or the resource associated with the component. For example, the control panel may identify that the information was received from a particular sensor (e.g., an HVAC sensor, an energy sensor, a lawn care sensor). Additionally, the control panel may determine whether one or more sub-components of the component or the component itself requires modification, an update, a replacement, or a replenishment based on the sensor data. If the control panel determines that a modification, an update, a replacement, or a replenishment is required, the control panel may identify additional information, associated with the one or more sub-components of the component or the component, by retrieving the additional information from local memory of the control panel, or a database, or a third-party source via the Internet.

The local memory or the database may include information such as specifications (e.g., component details, sub-component details), ordering information, vendor information, location of the one or more sub-components or the component within the smart home, an address of a premises associated with the component, etc. The control panel may parse and retrieve the information from the database based on identifying the particular sensor and the sensor data. For example, each sensing device of a component may have a unique identifier. The unique identifier may be assigned to a sub-component or the component itself in the local memory or the database. As such, the control panel may use the unique identifier to identify the information. The control panel may generate information associated with the processed information and provide the generated information to an individual associated with the smart environment or a third-party enterprise, or both.

The generated information may include a description of the component or the resource associated with the component. The control panel may communicate (e.g., automatically) and perform one or more functions with the third-party enterprise. For example, the control panel may provide ordering information to the third-party enterprise, or a schedule an appointment with the third-party enterprise to respond to the generated information (e.g., may automatically schedule an appointment with an exterminator when a sensor detects termites, ants, or other pests). The control panel may automatically place an order with a service such that service is provided to a location of the component or the resource associated with the component. In some cases, the control panel may schedule the appointment based on schedule information of the individual (e.g., a personal schedule, a maintenance schedule related to a component or related perishable resource of the smart home) stored in local memory of the security and automation system.

Alternatively, the control panel may wait to receive feedback (e.g., authorization, acknowledgement) from the individual prior to communicating with the third-party enterprise. In some cases, the control panel may track a pending status of the modification, the update, the replacement, or the replenishment of the sub-component or the component, and provide notification, when the status is determined to be completed. In some cases, the control panel may receive a service completed signal from the third-party enterprise, the service completed signal corresponding to a condition indicating that the service has been provided.

In some examples, the at least one sensing device may be an HVAC filter sensor. The HVAC filter sensor may record, track, and provide information to the control panel relating to a status of the HVAC filter component. For example, a status may indicate whether the HVAC filter may need to be replaced. In some cases, the HVAC filter sensor may determine that the HVAC filter may need to be replaced based on sensor data satisfying a threshold value. For example, the HVAC filter sensor may determine when the HVAC filter becomes congested with dust particles or residue. Alternatively, the HVAC filter sensor may determine that the HVAC filter may need to be replaced based on a schedule. For example, the HVAC filter sensor may determine that the HVAC filter needs to be replaced every number of days, weeks, or months.

The control panel may receive the information from the HVAC filter sensor. In this example, the control panel may determine the HVAC filter may need to be replaced based on the received information. In some examples, as provided above, the information may include a unique identifier associated with the HVAC filter sensor that may correlate the HVAC filter sensor with a particular HVAC filter in the smart environment. The control panel may parse and retrieve additional information (e.g., HVAC filter specification) associated with the HVAC filter from the local memory or the database; or in some cases from the Internet. Upon determining that the HVAC filter requires a replacement, the control panel may generate and transmit a message to an appropriate individual (e.g., homeowner) or a third-party enterprise. In some examples, the message may include a description indicating that the HVAC filter may need to be replaced. In some cases, the message may also include ordering information, vendor information, address information, etc.

The control panel may also autonomously communicate and perform one or more functions with the third-party enterprise. In this case, the third-party enterprise may be a vendor or a primary manufacturer of the HVAC filter. As such, the control panel may provide ordering information to the third-party enterprise. That is, the control panel may automatically order a new HVAC filter to be delivered to the environment (i.e., to the smart home) using the ordering information. Alternatively, the control panel may delay communication, until receiving feedback from the individual (i.e., homeowner), with the third-party enterprise. In some cases, the control panel may track a pending status of the replacement of the HVAC filter, and provide notification, when the status is determined to be completed.

In some cases, the at least one sensing device may be a water softener sensor. The water softener sensor may monitor a calcium and magnesium level and/or water flow level of a plumbing component (e.g., faucet, valve, spout). The water softener sensor may record, track, and provide information to the control panel relating to the calcium and magnesium level and/or the water flow level of the plumbing component. The water softener sensor may determine when the plumbing component has increased calcium and magnesium levels and/or reduced water flow, or detect a leak or other problem. Alternatively, the water softener sensor may determine that the plumbing component may need to be replaced or replenished. For example, the water softener sensor may determine that the plumbing component needs to be serviced (e.g., replenished by applying water softening chemicals) based on the increased calcium and magnesium levels and/or reduced water flow. Alternatively, in some cases, the water softener sensor may determine that the plumbing component may need to be replaced.

The control panel may receive the information from the water softener sensor. In this example, the control panel may determine the plumbing component may need to be replaced based on the received information. In some examples, as provided above, the information may include a unique identifier associated with the water softener sensor that may correlate the water softener sensor with a particular plumbing component in the smart environment. The control panel may parse and retrieve additional information (e.g., plumbing component specification) associated with the plumbing component from the database; or in some cases from the Internet. Upon determining that the plumbing component requires a replacement, the control panel may generate and transmit a message to an appropriate individual (e.g., homeowner) or a third-party enterprise. In some examples, the message may include a description indicating that the plumbing component may need to be replaced. In some cases, the message may also include ordering information, vendor information, etc. The control panel may also communicate and perform one or more functions with the third-party enterprise. In this case, the third-party enterprise may be a vendor or a plumbing service. As such, the control panel may provide ordering information to the vendor or the plumbing service. That is, the control panel may autonomously order a new plumbing component to be delivered using the ordering information.

Alternatively, the control panel may delay communication, until receiving feedback from the individual, with the third-party enterprise. In some cases, the control panel may track a pending status of the replacement of the plumbing component, and provide notification, when the status is determined to be completed. In some examples, the control panel may add the plumbing component or a resource (e.g., water softening chemicals) associated with the plumbing component on a shopping list of the individual. As such, the individual may be reminded to purchase water softening chemicals at a later time; for example when visiting a business (e.g., a home goods store). The database may also include one or more service providers capable of supplying replacement parts corresponding to the HVAC filter, or the plumbing component, or the appliance.

In some examples, the at least one sensing device may be a lawn care sensor. The lawn care sensor may record, track, and provide information to the control panel relating to a status of a lawn. For example, a status may indicate whether the lawn may need to be replenished (e.g., watered). In some cases, the lawn care sensor may determine that the lawn may need to be watered based on sensor data. In some examples, the lawn care sensor may be a humidity sensor integrated with the lawn to determine a humidity or moisture level of the soil. Additionally, the lawn care sensor may include or be augmented by an outdoor camera that may capture images of the lawn and determine based on the captured images (among other data) whether the lawn may need to be watered, fertilized, aerated, etc.

In some cases, the control panel may determine that the lawn may need to be updated (i.e., mowed, weeds pulled) based on the captured image. In this case, the control panel may identify a learned preference or a pre-stored setting of the individual. For example, the learned preference or the pre-stored setting may indicate to contact a lawn care business (i.e., third-party enterprise). As such, the control panel may parse and retrieve contact information associated with the lawn care business via the database. The control panel may generate a message and transmit it to the lawn care business. In some examples, the message may include a request to schedule a personnel to visit the environment (e.g., home) to provide a lawn care service during a specified data and time. The schedule may be based on a schedule of the individual associated with the environment. The message may also include address information associated with the environment (e.g., home). In some cases, the control panel may refrain from transmitting the message until receiving authorization from the individual associated with the smart environment via the control panel or from a remote device (e.g., smartphone). The control panel may receive a reply message from the lawn care business confirming the request. In some cases, the control panel may transmit a notification to the remote device of the individual associated with the smart environment notifying him or her of the scheduled lawn care service. In some cases, the control panel may track a pending status of the scheduled lawn care service, and provide notification to the individual when the status is determined to be completed.

In some examples, the at least one sensing device may be a pest control sensor. The pest control sensor may be integrated with or embedded within one or more surfaces (e.g., walls) or components (e.g., an appliance, a light fixture) of the smart environment. For example, the pest control sensor may be installed within or on walls of a smart home. The pest control sensor may record, track, and provide information to the control panel. For example, the information may indicate presence of a pest. The control panel may use the information to notify an individual or a third-party enterprise accordingly to respond.

In some examples, the at least one sensing device may be an appliance repair sensor. The appliance repair sensor may be integrated with or embedded within one or more components of an appliance. An appliance may include any household appliance such as a dishwasher, a fridge, an oven, a microwave, a refrigerator, etc. The appliance repair sensor may determine when one or more sub-components of the appliance or the appliance itself may need to be replaced based on sensor data (e.g., usage data). The appliance repair sensor may provide information to the control panel. Similarly, the control panel may use the information to notify and coordinate replacement of the one or more sub-components of the appliance or the appliance itself.

Similarly, in some examples, the at least one sensing device may be a housekeeping sensor. For example, the house keeping sensor may monitor an area such as a room. A control panel may determine when to schedule a housekeeper to visit the smart environment based on sensor data received from the housekeeping sensor. The housekeeping sensor may include a camera. The camera may capture an image of the area and determine a housekeeper requirement level. In some cases, the housekeeper requirement level may be determined based on comparing a default image of the area (i.e., assigned as a clean version of the area) to the captured image. If the control panel determines that the housekeeper requirement level satisfies a threshold level, the control panel may perform a function. For example, the control panel may contact and schedule a service with a housekeeping business (i.e., third-party enterprise). In some cases, the housekeeping business may be pre-assigned by the individual. The control panel may receive a reply message from the housekeeping business confirming the request.

Additionally or alternatively, the at least one sensing device may be a laundry sensor. The laundry sensor may be integrated with or in embedded within a hamper. The laundry sensor may determine when to notify an individual that he or she may need to do laundry based on an amount of clothing sensed in the hamper. Notifying the individual may include transmitting a message to the individual's device indicating that the amount of clothing within the hamper has reached a threshold level.

In some examples, the at least one sensing device may be a consumables sensor. The consumables sensor may be a multi-sensing component that may be embedded or integrated with a physical compartment that stores consumable items (e.g., foods). For example, a physical compartment may include a refrigerator. Alternatively, the physical compartment may be an unrefrigerated compartment (e.g., pantry). The consumable sensor may record, track and provide information associated with an inventory of consumable items stored in the physical compartment. In some cases, the consumable sensor may identify one or more consumable items that may need to be replenished. The control panel may receive the information associated with the inventory of consumable items stored in the physical compartment. In this case, the control panel may identify one or more consumable items that may need to be replenished. The control panel may generate a message indicating the one or more consumables items to an individual of the environment. In some cases, the control panel may notify a third-party enterprise. In this case, the third-party enterprise may be a vendor such as a grocery store. The control panel may autonomously communicate with the vendor to schedule an order and deliver of the required consumables items. The control panel may provide and support a secure delivery to the smart environment. In some cases, the control panel may indicate in a message, transmitted to the vendor, a location associated with the smart environment in which to deliver the required consumables items. In this case, the control panel may use one or more sensing devices to determine and identify a presence of a delivery person associated with the vendor at the smart environment. Based on the determination and identification, the control panel may unlock an entrance to the smart environment.

In some examples, the security and automation system may implement one or more deterrence techniques for security and automation systems. For example, such a system may be configured to receive a set of inputs from one or more sensors. The set of inputs may include video input, sound input, audio input, image input, user input, light input (e.g., infrared input), or any combination thereof, among other examples of sensor inputs. In some examples, the system may include one or more components providing the input. For example, the system may include cameras or sound sensors, among other examples of sensors as described herein. The system may receive the inputs at a device, such as a control panel. For example, the sensors may be configured to report data (e.g., sensor data) to the system (e.g., the control panel) via wired or wireless communications.

The system may process (e.g., analyze, filter, input to an algorithm such as AI algorithms, etc.) the set of inputs in accordance with any examples described herein. In some examples, such processing may enable the system to determine one or more characteristics of a person proximate the system. For example, the system may analyze sensor data associated with the person (e.g., the system may analyze a gait of the person, biometrics of the person, clothing of the person, among other examples), determine one or more behaviors of the person, request open source data from a community, analyze the one or more inputs using artificial intelligence (AI) (e.g., filter behaviors through AI to select events, people, scenarios, behaviors, activities, etc., for selecting an action or classification), or any combination thereof. As an illustrative example, the system may receive video input of a person. The system may analyze the video data to classify the person as being relatively likely or unlikely to perform a restricted action. For example, the system may determine that the behavior of the person indicates a relatively high likelihood of perpetrating a crime (e.g., the person may be carrying a crowbar, covering their face such as with a hand or wearing a mask, walking past a car multiple times, looking in a window, looking over the shoulder, attempting to open a car door, etc.). Additionally or alternatively, the system may identify the person based on the sensor input. For example, the system may determine an identity of the person using facial recognition, biometric data, etc.

The system may predict an event based on the one or more characteristics. For example, the system may predict an event based on the characteristics correlating to the event (e.g., the system may recognize a behavior as being associated with breaking into a car or house, among other examples of characteristics and events). In some examples, the system may predict the event based on determining whether the set of inputs satisfy one or more thresholds. For example, the system may determine that a frequency or duration of time that a person is located near or moves relatively close to an object (e.g., a car) satisfies a threshold, the system may determine that the probability satisfies a threshold, etc. Additionally or alternatively, the system may request or receive data associated with the event and predict the event based on the received data. As an illustrative example, other systems (e.g., in an open source community) may send data to the system indicating an occurrence of one or more events (e.g., a burglary, car break ins, an identity or characteristics of a perpetrator, etc.) and the system may predict the event using the data.

The system may perform one or more actions based on the predicted event. In some cases, the system may perform an action to deter a person from perpetrating the predicted event. For example, the system may emit a sound or light (e.g., random or variable sounds, directional lights or sounds, emitting a sound indicating recognition of the person based on identifying the person, etc.), send a drone (e.g., a ground robot, an aerial drone, etc.) to follow the person, perform an AI generated response, or any combination thereof. Such actions may be configured to target the person or otherwise influence the behavior of the person such that the event does not occur. For example, the system may emit a sound instructing the person that they are being recorded, a flashing light to make the person uncomfortable, among other examples described herein. In some examples, the system may perform the action based on one or more settings of the system. For example, the system may be configured with a setting indicating an action to perform for a detected or predicted event (e.g., a user may configure the setting, the system may use historical data and AI processing to select the setting, or a combination thereof). The system may perform the action in accordance with the setting.

In some examples, the system may perform the action based on a classification of a detected or predicted event. For example, the system may identify a first classification at a first time. The system may perform a first action in accordance with the first classification (e.g., the system may initially flash a light or emit a request to leave the property for a low risk classification of the event). The system may identify a second classification based on performing the first action. For example, the system may determine that a likelihood of the predicted event is relatively higher (e.g., if the first action fails to dissuade or alter the behavior of the person, the system may transition to a second stage of action). As an illustrative example, the system may call authorities, send a drone, spray water or laser at the person, switch the light or sound to a more aggressive action (e.g., higher intensity light or louder sounds), among other examples. In some examples, the system may perform the action based on an identity of the person. For example, the system may be configured to perform actions directed to an individual (e.g., the system may announce "Jason, please leave the property" or otherwise indicate that the person has been identified, the system may be configured to perform a first action for a first person and a second action for a second person, etc.).

The following description provides examples and is not limiting of the scope, applicability, and/or examples set forth in the claims. Changes may be made in the function and/or arrangement of elements discussed without departing from the scope of the disclosure. Various examples may omit, substitute, and/or add various procedures and/or components as appropriate. For instance, the methods described may be performed in an order different from that described, and/or various steps may be added, omitted, and/or combined. Also, features described with respect to some examples may be combined in other examples.

FIG. 1 is an example of a system 100 using a security and automation system in accordance with aspects of the present disclosure. In some cases, the system 100 may include one or more sensor units 110, local computing device 115, 120, network 125, server 155, control panel 135, and remote computing device 140. One or more sensor units 110 may communicate via wired or wireless communication links 145 with one or more of the local computing device 115, 120 or network 125. The network 125 may communicate via wired or wireless communication links 145 with the control panel 135 and the remote computing device 140 via server 155. In alternate cases, the network 125 may be integrated with any one of the local computing device 115, 120, server 155, or remote computing device 140, such that separate components are not required.

Local computing device 115, 120 and remote computing device 140 may be custom computing entities configured to interact with sensor units 110 via network 125, and in some cases, via server 155. In other cases, local computing device 115, 120 and remote computing device 140 may be general purpose computing entities such as a personal computing device, for example, a desktop computer, a laptop computer, a netbook, a tablet personal computer (PC), a control panel, an indicator panel, a multi-site dashboard, an iPod®, an iPad®, a smartphone, a mobile phone, a personal digital assistant (PDA), and/or any other suitable device operable to send and receive signals, store and retrieve data, and/or execute components.

Control panel 135 may be a smart home system panel, for example, an interactive panel mounted on a wall in a user's home. Control panel 135 may be in direct communication via wired or wireless communication links 145 with the one or more sensor units 110, or may receive sensor data from the one or more sensor units 110 via local computing devices 115, 120 and network 125, or may receive data via remote computing device 140, server 155, and network 125.

The control panel 135 and the local computing devices 115, 120 may include memory, a processor, an output, a data input and a communication component. The processor may be a general purpose processor, a Field Programmable Gate Array (FPGA), an Application Specific Integrated Circuit (ASIC), a Digital Signal Processor (DSP), and/or the like. The processor may be configured to retrieve data from and/or write data to the memory. The memory may be, for example, a random access memory (RAM), a memory buffer, a hard drive, a database, an erasable programmable read only memory (EPROM), an electrically erasable programmable read only memory (EEPROM), a read only memory (ROM), a flash memory, a hard disk, a floppy disk, cloud storage, and/or so forth. In some cases, the local computing devices 115, 120 may include one or more hardware-based components (e.g., DSP, FPGA, ASIC) and/or software-based components (e.g., a component of computer code stored at the memory and executed at the processor, a set of processor-readable instructions that may be stored at the memory and executed at the processor) associated with executing an application, such as, for example, receiving and displaying data from sensor units 110.

The processor of the local computing devices 115, 120 may be operable to control operation of the output of the local computing devices 115, 120. The output may be a television, a liquid crystal display (LCD) monitor, a cathode ray tube (CRT) monitor, speaker, tactile output device, and/or the like. In some cases, the output may be an integral component of the local computing devices 115, 120. Similarly stated, the output may be directly coupled to the processor. For example, the output may be the integral display of a tablet and/or smart phone. In some cases, an output component may include, for example, a High Definition Multimedia Interface™ (HDMI) connector, a Video Graphics Array (VGA) connector, a Universal Serial Bus™ (USB) connector, a tip, ring, sleeve (TRS) connector, and/or any other suitable connector operable to couple the local computing devices 115, 120 to the output.

The remote computing device 140 may be a computing entity operable to enable a remote user to monitor the output of the sensor units 110. The remote computing device 140 may be functionally and/or structurally similar to the local computing devices 115, 120 and may be operable to receive data streams from and/or send signals to at least one of the sensor units 110 via the network 125. The network 125 may be the Internet, an intranet, a personal area network, a local area network (LAN), a wide area network (WAN), a virtual network, a telecommunications network implemented as a wired network and/or wireless network, etc. The remote computing device 140 may receive and/or send signals over the network 125 via wireless communication links 145 and server 155.

In some cases, the one or more sensor units 110 may be sensors configured to conduct periodic or ongoing automatic measurements related to smart sensing. Each sensor unit 110 may be capable of sensing multiple resource parameters, or alternatively, separate sensor units 110 may monitor separate resource parameters. For example, one sensor unit 110 may measure temperature, while another sensor unit 110 (or, in some cases, the same sensor unit 110) may detect motion. In some cases, one or more sensor units 110 may additionally or alternatively monitor other sensor parameters, such as audio, vibrations, light, inventory, etc.

Data gathered by the one or more sensor units 110 may be communicated to local computing device 115, 120, which may be, in some cases, a thermostat or other wall-mounted input/output smart home display. In other cases, local computing device 115, 120 may be a personal computer or smart phone. Where local computing device 115, 120 is a smart phone, the smart phone may have a dedicated application directed to collecting sensor data and calculating predictions therefrom. The local computing device 115, 120 may process the data received from the one or more sensor units 110 to obtain prediction of smart sensing. In alternate cases, remote computing device 140 may process the data received from the one or more sensor units 110, via network 125 and server 155, to obtain prediction of smart sensing. Data transmission may occur via, for example, frequencies appropriate for a personal area network (such as BLUETOOTH® or IR communications) or local or wide area network frequencies such as radio frequencies specified by the IEEE 802.15.4 standard.

In some cases, local computing device 115, 120 may communicate with remote computing device 140 or control panel 135 via network 125 and server 155. Examples of network 125 include cloud networks, local area networks (LAN), wide area networks (WAN), virtual private networks (VPN), wireless networks (using 802.11, for example), and/or cellular networks (using 3G and/or LTE, for example), etc. In some configurations, the network 125 may include the Internet. In some cases, a user may access the functions of local computing device 115, 120 from remote computing device 140. For example, in some cases, remote computing device 140 may include a mobile application that interfaces with one or more functions of local computing device 115, 120.

The server 155 may be configured to communicate with the sensor units 110, the local computing devices 115, 120, the remote computing device 140 and control panel 135. The server 155 may perform additional processing on signals received from the sensor units 110 or local computing devices 115, 120, or may simply forward the received information to the remote computing device 140 and control panel 135.

Server 155 may be a computing device operable to receive data streams (e.g., from sensor units 110 and/or local computing device 115, 120 or remote computing device 140), store and/or process data, and/or transmit data and/or data summaries (e.g., to remote computing device 140). For example, server 155 may receive a stream of sensor data from a sensor unit 110, a stream of sensor data from the same or a different sensor unit 110, and a stream of sensor data from either the same or yet another sensor unit 110. In some cases, server 155 may "pull" the data streams, e.g., by querying the sensor units 110, the local computing devices 115, 120, and/or the control panel 135. In some cases, the data streams may be "pushed" from the sensor units 110 and/or the local computing devices 115, 120 to the server 155. For example, the sensor units 110 and/or the local computing device 115, 120 may be configured to transmit data as it is generated by or entered into that device. In some instances, the sensor units 110 and/or the local computing devices 115, 120 may periodically transmit data (e.g., as a block of data or as one or more data points).

The server 155 may include a database (e.g., in memory) containing sensor data received from the sensor units 110 and/or the local computing devices 115, 120. Additionally, as described in further detail herein, software (e.g., stored in memory) may be executed on a processor of the server 155. Such software (executed on the processor) may be operable to cause the server 155 to monitor, process, summarize, present, and/or send a signal associated with resource usage data.

The control panel 135 may monitor a parameter of a resource associated with a structure. The resource may include a service or a product. The service may be a structure management service or a personal service related to an individual associated with the structure. The structure management service may include at least one of a gardening and lawn care service, an internet-provider service, a housekeeping service, a laundry service, a plumbing service, a maintenance service, a termite and pest control service, a water softener service, or any combination thereof. The personal service may include at least one of a babysitting service, a nursing care service, a pet sitting service, a medical provider visit service, or any combination thereof.

In some cases, monitoring the parameter of the resource may include receiving real-time usage data of the resource from a sensor unit 110, and tracking real-time usage data based on the usage data. In some cases, the control panel 135 may perform a function based on tracking the real-time usage data. The function may be performed automatically based on a pre-configured setting of the security and automation system. The control panel 135 may predict a future change in condition associated with the parameter based on the monitoring.

In some cases, the control panel 135 in conjunction with the server 155 or the local computing devices 115, 120 may identify the service or the product, or both, and retrieve from a database, historical usage data associated with the service or the product, or both based on the identifying. The control panel 135 may compare the retrieved historical usage data with the real-time usage data to compute a usage model. In this case, the control panel 135 may predict the future change in condition associated with the parameter based on the usage model.

In some cases, the control panel 135 may identify schedule data of an individual associated with the structure, and automatically schedule a service personnel to visit the structure and perform an action associated with the service based on the schedule data of the individual. In some cases, automatically scheduling the service personnel may include the control panel 135 identifying a service provider associated with the service based on a pre-configured setting, and transmitting, to the remote computing device 140 of the service provider, a message indicating a service request. The message may at least one of a payment information, a geolocation information of the structure, a contact information of the individual, or any combination thereof. The control panel 135 may receive, from the remote computing device 140, an acknowledgment message in response to the service request.

The control panel 135 may detect the service personnel based on sensor data received from one or more of the sensor units 110, and identify a time associated with the detecting. The control panel 135 may compare the identified time to a scheduled service time, and validate that the identified time is within a threshold limit of the scheduled service time. The control panel 135 may provide, to a device of the service personnel, access information to the structure based at least on the validating. The access information may include at least one of a random code, a personal identification number (PIN), or instructions for providing the service to a designated zone of the structure, or any combination thereof. For example, the function performed by the control panel 135 may include providing the access information. The control panel 15 may operate a garage door opener based on the validating.

In some cases, the control panel 135 may determine that the product is a consumable item, identify a consumption rate of the consumable item based on a consumption model of the consumable item, and automatically request a purchase order with a third-party enterprise to restock and deliver the consumable item to the structure. The consumable item may be at least one of food or beverages, or both.

In some cases, the control panel 135 may determine that the product is an apparatus or a household item, and identify a usage rate of the apparatus or the household item based on a usage model of the apparatus or the household item. In some cases, the control panel 135 may automatically request a purchase order or a maintenance order with a third-party enterprise to restock and deliver the household item to the structure or provide a maintenance service of the apparatus.

In some cases, the local computing device 115, 120, or the remote computing device 140, or the control panel 135 may establish a connection with the apparatus, and retrieve specification information associated with the apparatus based on performing a scan using the established connection. The specification information may include warranty coverage information, appliance repair and support information, vendor information, an energy consumption and cost report of operating the apparatus, or any combination thereof.

Benefits of the system 100 include smart sensing, by enabling the control panel 135 in communication with the one or more sensor units 110, the local computing device 115, 120, and/or the remote computing device 140 to intelligently monitor, predict, and automatically and/or autonomously handle resources of a smart home. Thereby improving the operating characteristics of the control panel 135 (e.g., managing CPU and memory usage levels, reducing latency, decreasing power consumption), because the control panel 135 by periodically receiving and/or pulling data from one or more devices (e.g., sensor units 110) and using predication models regulate other smart devices in the smart home with reduced processing requirements (e.g., CPU usage).

Additionally, or alternatively, the system 100 may support deterrence techniques as described herein. For example, one or more devices of the system 100 may be configured to receive a set of inputs from one or more sensors 110. For example, the control panel 135 (or another device) may receive a video input, an image input, an audio input, or any combination thereof from one or more sensors 110, among other examples of inputs. The sensors may be examples of cameras, video recording devices, light sensors, sound sensors, motion sensors, or any combination thereof, among other examples of sensors. The control panel 135 may determine one or more characteristics of a person proximate the system 100 based on the received inputs. For example, the control panel 135 may analyze data associated with the person (e.g., the system may analyze a gait of the person, biometrics of the person, clothing of the person, among other examples), determine one or more behaviors of the person, request open source data from a community, analyze the one or more inputs using artificial intelligence (AI), or any combination thereof. In some examples, one or more operations described as performed by the control panel 135 may additionally or alternatively be performed by another device (e.g., locally at the sensor 110, at a computing device 115, etc.).

The system 100 may predict an event based on the determined one or more characteristics. For example, the control panel 135 may determine that the one or more characteristics correspond to the event (e.g., the control panel 135 may determine a likelihood that the person is going to perpetrate the event). The system 100 may perform one or more actions prior to the predicted event. For example, the control panel 135 may send a command to emit a sound or light at a device of the system 100 (e.g., random or variable sounds, directional lights or sounds, emitting a sound indicating recognition of the person based on identifying the person, etc.), send a drone to follow the person, perform an AI generated response, or any combination thereof. Such techniques may enable the system 100 to deter a person from performing the predicted event or influence a behavior of the person, which may result in enhanced security and a reduced likelihood of crime, among other benefits.

Figure 2A:
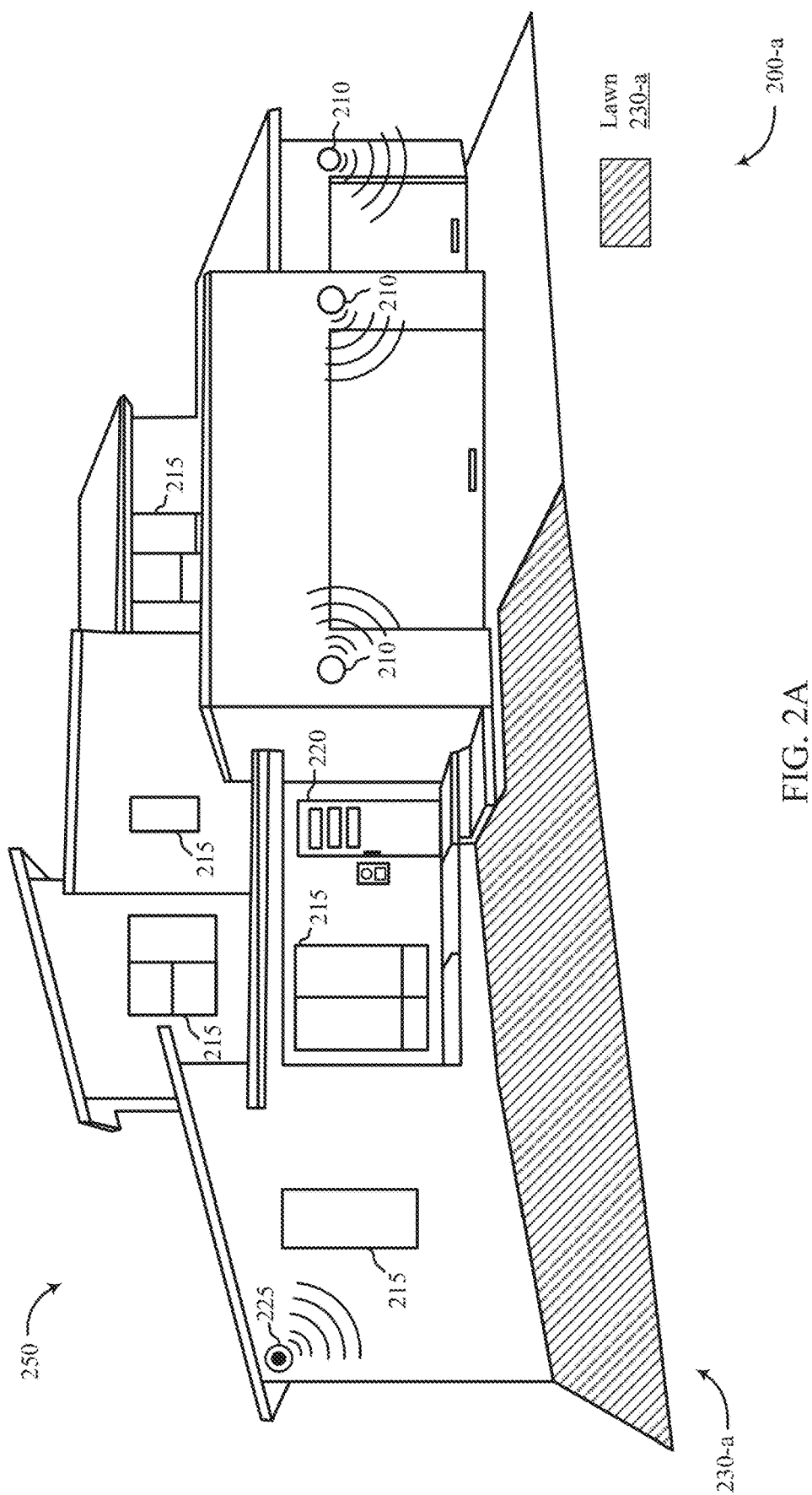
FIGS. 2A and 2B illustrate example diagrams relating to an example security and automation environment in accordance with aspects of the present disclosure.

FIG. 2A illustrates an example diagram relating to an example security and automation environment 200-a in accordance with aspects of the present disclosure. In some examples, the security and automation environment 200-a may implement aspects of the system 100. The security and automation environment 200-a may include one or more sensor units 210 and one or more access points 215 and 220. For example, the access points 215 may include windows of a smart home 250, and the access points 220 may include an entrance door to the smart home 250. In some examples, an access point of the smart home 250 may include one or more garage doors. The one or more sensor units 210 may be installed, mounted, or integrated with one or more of the access points 215 and 220, or alternatively with an interior and/or an exterior surface of the smart home 250.

The security and automation environment 200-a may support smart sensing of a lawn 230-a related to the smart home 250. By providing smart sensing of the lawn 230-a, the control panel 135 may predict future conditions of the lawn 230-*a*. Based on the future condition (i.e., whether the lawn 230-*a* will be in a satisfactory or unsatisfactory state), the control panel 135 may provide suggested solutions to an individual or perform functions automatically to mitigate or eliminate the future condition from occurring.

The control panel 135 may be located within the smart home 250. The control panel 135 may receive data from the one or more sensor units 210 that may be installed, mounted, or integrated with an exterior surface of the smart home 250. In some examples, the control panel 135 may communicate and receive data periodically or continuously from the sensor units 210. The control panel 135, the one or more sensor units 210, and a sensor unit 225 may communicate according to a radio access technology (RAT) such as 5G New Radio (NR) RAT, Long Term Evolution (LTE), Institute of Electrical and Electronics Engineers (IEEE) 802.11 (Wi-Fi), IEEE 802.16 (WiMAX), near-filed communication (NFC), ZigBee protocol, among others.

The one or more sensor units 210 may be same or different sensors configured to conduct continuous or discontinuous measurements of the lawn 230-*a*. In some cases, to improve the operating characteristics (e.g., power consumption, central processing unit (CPU) usage, memory usage) of the control panel 135, the one or more sensor units 210 may be configured by the control panel 135 to transmit data related to the lawn 230-*a*, periodically. For instance, periodic transmissions may include a sensor unit 210 transmitting sensor data to the control panel 135 every n hours, days, or weeks, where n is a positive integer.

For example, a sensor unit 210 may transmit a set of recorded sensor data to the control panel 135 every 4 hours. The control panel 135 may also be configured with a transmission schedule of the one or more sensor units 210. As a result, the control panel 135 may switch to a low power state when no transmission is occurring, i.e., between the control panel 135 and the one or more sensor units 210, to conserve power consumption and computing resources. For example, the control panel 135 may transition between an awake state and a sleep state based on the transmission schedule. By implementing multiple operating states for the control panel 135 such as an awake state and a sleep state, the control panel 135 may operate with a higher efficiency with respect to power, computing, and storage resources.

In some cases, as part of configuring the one or more sensor units 210 with the control panel 135, each sensor unit 210 may establish a connection with the control panel 135. For example, each sensor unit 210 may during initialization broadcast a beacon signal to the control panel 135. Additionally, the control panel 135 itself may broadcast a beacon signal to indicate its presence to the one or more sensor units 210. The beacon signal may include configuration information for the one or more sensor units 210 to configure and synchronize with the control panel 135. In some cases, the beacon signal broadcasted from each sensor unit 210 may include registration information. The registration information may include specification information and a unique identifier (e.g., serial number) identifying each sensor unit 210. The specification information may include warranty coverage information, repair and support information, vendor information, an energy consumption and cost report of operating a sensor unit 210, or any combination thereof.

The control panel 135 may store the registration information in a local memory or remotely (e.g., in a remote database). In some cases, based on the size of the registration information, the control panel 135 may determine to save a copy of a portion of the registration information (e.g., serial number of each sensor unit 210) in local memory and save the full registration information in a remote database. The local memory may be a relational database. The relational database may include a table that may have a set of data elements (e.g., sensor information). For example, the table may include a number of columns, and a number of rows. Each row may be associated with a sensor unit 210, and each column may include information (e.g., sensor values, timestamps for sensor data, status indicators (e.g., a power, a failure, or a maintenance indicator)) associated with each sensor unit 210. In some examples, the remote database may also be a relational database.

The smart home 250 may be associated with a subscription service. A subscription service may, for example, include a security service and the control panel 135 may be part of the security service. For example, the control panel 135 may be the property of the security service. The control panel 135 may communicate received sensor data to a server associated with the security service. For example, the server 155 may host the security service, and the control panel 135 may forward data (e.g., sensor data, registration information, account information, scheduled services, etc.) to the server 155. In some cases, some or all of the functions described herein may be performed at the server 155. Alternatively, the control panel 135 may be the property of the individual associated with the smart home 250. In this case, the individual may install and register an application related to the security service onto the control panel 135. The individual therefore may access, modify, monitor, features of the security service via the application. The application may upload and download sensor-related data to and from the server 155.

In some cases, the smart home 250 may be a member of a smart neighborhood. The smart neighborhood may include a cluster of smart homes that may share resources amongst each other. For example, a remote database may be a local memory of a neighboring smart home. The smart home 250 may therefore transmit sensor data to the neighboring smart home for storage. In the case that the smart neighborhood is associated with a security service, each smart home of the neighborhood may be subscribed with the security service. For example, to transmit sensor data for storing at a neighboring home, both the smart home and the neighboring home may have to be subscribed with the same security service. The security service may provide security transmission protocols to mitigate possibility of data being compromised during exchange between two or more smart homes. A security transmission protocol may be a wireless protected access (WPA), WPA2, among others. In some examples, the control panel 135 may communicate with one or more of the sensor units 210 using the security transmission protocol.

With reference to the lawn 230-*a*, the lawn 230-*a* may be a single zone or may be separated into multiple subzones (not shown). The control panel 135 may automatically configure a zone or two or more subzones for the lawn 230-*a* based on a dimension of the lawn 230-*a* and a number of sensor units 210 monitoring the lawn 230-*a*. For example, the control panel 135 may receive a snapshot of the lawn 230-*a*. For example, a drone (e.g., a sensor unit 210 or the sensor unit 225) may capture an aerial snapshot of the smart home 250 including the lawn 230-*a*. In addition, to the aerial snapshot, the drone may be configured with laser scanning techniques to measure a dimension of the lawn 230-*a*. The snapshot and the measured dimension may be transmitted to the control panel 135. For example, a sensor unit 210 or the sensor unit 225 may transmit the snapshot and the measured dimension to the control panel 135 via an established connection (e.g., Wi-Fi connection). The control panel 135 may determine to automatically assign a single zone or a number of subzones to the lawn 230-*a* based on the measured dimension. In some cases, the control panel 135 may also be aware of a sprinkler system configuration of the lawn 230-*a*. That is, the control panel 135 may identify locations (e.g., positions, coordinates) of sprinkler nodes across the lawn 230-*a*. In this case, the control panel 135 may also consider assignment of the zone or the subzones based on the sprinkler system configuration (i.e., the number of sprinkler nodes installed across the lawn 230-*a*).

The control panel 135 may provide a visualization of the smart home 250 including the lawn 230-*a* via an application running on the control panel 135. To identify the lawn 230-*a*, the control panel 135 may perform image processing techniques on the captured snapshot. For example, the control panel 135 may load and provide for display, via a user interface of the control panel 135, the captured snapshot and the measured dimension of the lawn 230-*a*. In some cases, assigning a zone or two or more subzones may be provided manually by an individual (e.g., administrator). The individual may assign a zone or a number of subzones to the lawn 230-*a* via an application. For example, the individual may assign at least one of the sensor units 210 to a single zone or assign to each subzone at least one sensor unit using an application installed on the control panel 135. The control panel 135 may receive the assignment via a user interface or an input device (e.g., a keyboard, a mouse, a stylus) of the control panel 135. In some cases, the control panel 135 may receive the assignment from the local computing device 115 or 120, or the remote computing device 140. The local computing device 115 or 120, or the remote computing device 140 may access the control panel 135 remotely to perform an operation (e.g., zone assignment, check a status of the smart home 250, or the lawn 230-*a*).

A sensor unit 210 may be inserted into the ground of the lawn 230-*a*. Each sensor unit 210 may be capable of sensing multiple parameters associated with the lawn 230-*a*, or alternatively, separate sensor units 210 may monitor separate parameters. For example, one sensor unit may measure a humidity (i.e., moisture level) associated with the soil of the lawn 230-*a*, while another sensor unit may monitor a temperature associated with the soil. The one or more sensor units 210 may also monitor a soil salinity, soil pH, external temperature, and external humidity associated with the lawn 230-*a*.

In some cases, a sensor unit 225 may be a camera that monitors the status of the lawn 230-*a*. For example, the sensor unit 225 may capture an image or a video of the lawn 230-*a*. In some examples, the sensor unit 225 may be a drone with a camera, or the sensor unit 225 may be a camera that is mounted, installed, or configured to an exterior surface of the smart home 250. In the case that the sensor unit 225 is a drone with a camera or a standalone camera, the camera may be configured to capture aerial snapshots of the lawn 230-*a*. In some examples, the camera may be a wide-angle camera having a field-of-view which may cover a portion or all of the lawn 230-*a*. The camera may also have pan/tilt or zoom capabilities. In some examples, the camera may be a narrow-field-of-view camera compared to the wide-angle camera, to monitor a portion (e.g., a subzone) of the lawn 230-*a*.

The sensor unit 225 may also monitor light conditions relative to the lawn 230-*a*. For example, the sensor unit 225 may be a thermal camera that may capture thermal images of the lawn 230-*a*. Using the captured thermal images the sensor unit 225 may track and record a temperature and exposure time of the lawn 230-*a* to light (e.g., sunlight). In some cases, the control panel 135 may determine a geolocation (e.g., latitude and longitude) of the smart home 250, and request weather data from a weather service via a server (e.g., the server 155). Using the weather data and geolocation of the smart home 250, the control panel 135 may improve providing smart sensing and processing of the received sensor data from the one or more sensor units 210 and the sensor unit 225 by correlating the weather data with the received sensor data to determine a status of the lawn 230-*a*. A status of the lawn 230-*a* may indicate whether the lawn 230-*a* is nourished or necessitates attention (e.g., watering).

The one or more sensor units 210 and the sensor unit 225 may timestamp sensor data. In some cases, the sensor data may also include metadata. For example, the metadata may correlate the sensor data with a sensor unit 210 or 225. The one or more sensor units 210 and the sensor unit 225 may transmit the sensor data (e.g., captured images or video, temperature, humidity, light, vibration) associated with the lawn 230-*a* to the control panel 135. The control panel 135 may receive the sensor data and perform post-processing. For example, the control panel 135 may analyze the sensor data to determine a status of the lawn 230-*a*.

Analysis of the sensor data may include the control panel 135 comparing the received sensor data to historical sensor data of the lawn 230-*a*. The historical sensor data may be flagged with indicators that identify a status of the lawn 230-*a* in a previous period. For example, historical sensor data may include a captured image that may have pixel indicators identifying an area of the lawn 230-*a* that was unattended (e.g., weeds growing, a section of the lawn 230-*a* that has low levels of humidity, etc.). The control panel 135 may perform image processing and recognition techniques that may correlate the received sensor data with the historical sensor data to identify a correlation.

In some cases, the control panel 135 may predict a future change in the status of the lawn 230-*a*. For example, the control panel 135, in response to correlating the received sensor data with the historical sensor data, may determine that the lawn 230-*a* is in a satisfactory state. However, as part of the analysis and correlation, the control panel 135 may identify a section of the lawn 230-*a* that may have a characteristic that may be similar to historical sensor data of the lawn 230-*a*. For example, a section of the lawn 230-*a* may on average have a lower humidity level or a higher temperature reading compared to the remainder sections of the lawn 230-*a*. This may be in an indicator that the section of the lawn 230-*a* with a higher temperature reading and a lower humidity level is receiving less nutrition compared to other sections of the lawn 230-*a*. As a result, this section may require attention at a subsequent time. For example, the control panel 135 may estimate that the section of the lawn 230-*a* may further deteriorate based on received forecasted weather data from the server 155, and the sensor data. The control panel 135 may flag this for an individual by sending a notification or may automatically perform a function to mitigate the risk of the section of the lawn 230-*a* becoming worse.

In some examples, the smart home 250 may support one or more deterrence techniques for security and automation systems as described herein. For example, the smart home 250 may be configured to predict an event based on one or more inputs and perform one or more actions in order to deter a person, animal, object, etc., from perpetrating the event. Such techniques may enable the system to reduce a probability incurring property damage or theft, improve monitoring of the smart home 250, or both, among other benefits.

The control panel 135 may be configured to receive one or more inputs. In some examples, the sensors 210 may transmit data to the control panel (e.g., sensor data such as light data, video data, image data, audio data, motion data, etc.). Additionally or alternatively, the smart home 250 may be in a smart neighborhood and may receive communications from other smart homes 250 in the neighborhood. Additionally or alternatively, a user may provide an input to the control panel 135 via the control panel 135 or another device.

The control panel 135 may process the set of inputs. For example, the control panel 135 may process data to identify one or more characteristics of an individual, event, object, or any combination thereof (e.g., the control panel 135 may identify an individual as a possible criminal). For instance, the control panel 135 may analyze video data, image data, sound data, motion data, or any combination thereof. As an illustrative example, the control panel 135 may analyze a gait of a person (e.g., a video of a person walking may be analyzed to determine whether the movement of the person indicates caution or sneaking behavior). Additionally or alternatively, the control panel 135 may analyze a behavior of the person (e.g., identify behaviors that indicate caution or otherwise suspicious behaviors such as checking over their shoulders, a frequency of walking past an object or area, etc.), additionally or alternatively, the control pane 135 may analyze a characteristic of a person (e.g., the control panel 135 may identify that the individual is wearing a mask, carrying a crowbar or weapon, etc.). In some examples, the control panel 135 may identify an identity of the person proximate the smart home 250. For example, the control panel 135 may use biometric information, facial recognition, AI learning (e.g., gait analysis), or any combination thereof to determine the identity of the person.

In some cases, the control panel 135 may predict an event, a likelihood that the person may perpetrate the event, or both based on such processing of the set of inputs. For example, the control panel 135 may predict an event based on the determined characteristics of the one or more inputs correlating to the event (e.g., the control panel 135 may determine that an unknown person attempting to open a car door is an attempted car theft, the control panel 135 may receive audio data indicative of gunshots in the neighborhood and identify a possibility that a criminal may hide in the yard and begin lighting the yard or other deterrence actions, etc.). As an illustrative example, the control panel 135 may determine that a frequency or duration of time that a person is located near or moves relatively close to an object (e.g., a car, an access point 215) satisfies a threshold. Additionally or alternatively, the system may request or receive data associated with the event and predict the event based on the received data. As an illustrative example, other homes in the neighborhood (e.g., in an open source community) may send data to the control panel 135 indicating an occurrence of one or more events (e.g., a burglary, car break ins, an identity or characteristics of a perpetrator, etc.) and the system may predict the event using the data.

In some examples, the control panel 135 may input the data to an AI algorithm, which may enable the control panel 135 to analyze various situations and provide different outputs based on the inputs. In other words, AI filtering may be used to identify one or more events, people, scenarios, activities, and so on. The AI may additionally or alternatively select one or more outputs based on AI processing. As an illustrative example, the AI component may learn which outputs or actions result in successful deterrence of some events based on a set of inputs, and the AI component may implement the successful outputs for a respective set of inputs in future situations (e.g., an AI component may use variable sounds for different people or events based on learning which outputs are successful from historical attempts and sound outputs, among other examples of AI learning). As another illustrative example, the AI filtering may choose which events, people, scenarios, activities, and the like are forwarded or otherwise notified to a human guard or the user of the smart home 250.

The control panel 135 may perform one or more actions based on the predicted or detected event. In some cases, the control panel 135 may perform an action to deter a person from perpetrating a predicted event. For example, the control panel 135 may send a command to a light or sound component of the smart home 250 to activate. As an illustrative example, the smart home 250 may emit a light (e.g., flashing lights, strobe lights, sweeping lights, directional lights, etc.).

Additionally or alternatively, the smart home 250 may emit a sound (e.g., whistling, barking, shouting, an announcement to leave the property, etc.). In some examples, the smart home 250 may select and emit a sound dynamically. For example, the smart home 250 may randomly select from a set of configured sounds, the smart home 250 may use AI to select different sounds for different settings, the smart home 250 may emit a sound in accordance with one or more settings of the system (e.g., set by a user), or any combination thereof. By implementing varying or multiple sounds, the smart home 250 may be enabled to maintain effective deterrence methods (e.g., if people stop responding to a first sound, the control panel 135 may select a second sound different than the first sound) or scale an intensity of the one or more actions, for example, based on a classification of the event as described herein.

In some examples, the one or more actions may include sending a drone to follow a person or object of interest (e.g., a drone may be sent to follow a person to their car to obtain a license plate number), water may be sprayed at the person, lasers may be shone at the person, etc. In some examples, the control panel 135 may select a directionality or location for an action. For example, the smart home 250 may emit a sound with one or more locations in the home (e.g., the sound of dogs barking may be played in the home and move progressively closer to the location of the person, a growling sound may be played near an entry point 215 that a person intends to break through, gunshot sounds may be directed at the person, lights may be emitted towards a location of the person, etc.).

In some examples, the control panel 135 may perform the action based on a classification of a detected or predicted event. For example, the control panel 135 may identify a first classification at a first time (e.g., a low risk event or identity of a person). The control panel 135 may perform a first action in accordance with the first classification (e.g., the system may initially flash a light or emit a request to leave the property for a low risk classification of the event). The system may identify a second classification based on performing the first action. For example, the system may determine that the behavior of a person is unaffected by the first action. In such examples, the control panel 135 may transition to a second stage of action. For example, the control panel 135 may select a higher intensity action (e.g., increase volume or intensity of sounds, send a drone, notify authorities, etc.).

In some examples, the control panel 135 may perform the one or more actions based on an identity of the person. For example, the control panel 135 may be configured to perform actions directed to an individual (e.g., the system may indicate that the person has been identified, for example by reciting their name, a user may program the smart home 250 to announce "Jason, please leave the property" if Jason is detected on the premises, etc.). As an illustrative example, the control panel 135 may be configured to perform some actions for a first person and different actions for a second person (e.g., a known neighbor may be allowed to enter the premises while a stranger or unauthorized person may not be granted access).

Figure 2B:
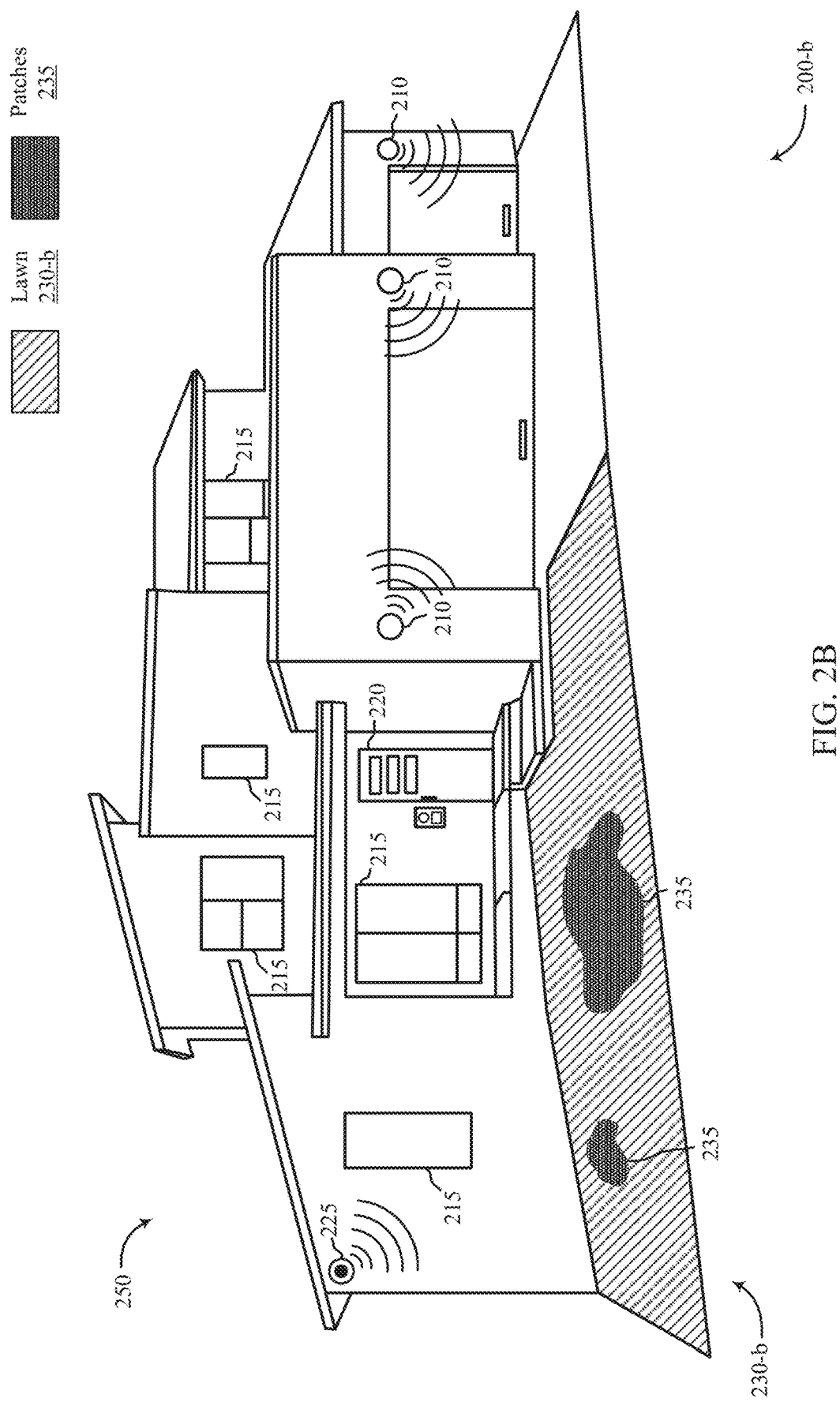

FIG. 2B illustrates an example diagram relating to an example security and automation environment 200-b in accordance with aspects of the present disclosure. In some examples, the security and automation environment 200-b may implement aspects of the security and automation environment 200-a. With reference to FIG. 2B, the control panel 135 may determine that patches 235 of lawn 230-a have a status indicating an unsatisfactory state. Patches 235 may include a section of the lawn 230-a that may have weeds growing, or a section of grass that is malnourished (e.g., under watered). Returning to the analysis of the sensor data, the control panel 135 may perform machine learning to determine the status of the lawn 230-a.

For example, the control panel 135 may have a set of training sensor data. The training sensor data may be reflective of a status of the lawn 230-a that indicates the lawn 230-a is nourished. The control panel 135 may process the received sensor data with the historical sensor data and the set of training sensor data to determine a future status of the lawn 230-a. For instance, the control panel 135 may identify the patches 235 as a result of performing the machine learning. In this cases, the patches 235 may be indicate of a future condition of the lawn 230-a, and may have not yet occurred. The control panel 135 may support at least one of the following machine learning techniques including: vector machines, decision trees, Naïve Bayes classification, ordinary least squares regression, or logistic regression, to predict the future change in the condition of the lawn 230-a.

In some cases, the control panel 135 may confirm a determined status of the lawn 230-a by performing additional analysis using different types of sensor data related to the lawn 230-a. For example, a first sensor data analysis may include the captured images (e.g., thermal imaging) of the lawn 230-a by the sensor unit 225, while a second sensor data analysis may include recorded sensor data (e.g., soil moisture, soil temperature) by the one or more sensor units 210. In an example, if both the first and the second sensor data analysis indicates that the lawn 230-a is unnourished, the control panel 135 may confirm that the status of the lawn 230-a is in an unsatisfactory state. The control panel 135 may transmit a notification to a device of an individual indicating the status of the lawn 230-a.

Figure 3A:
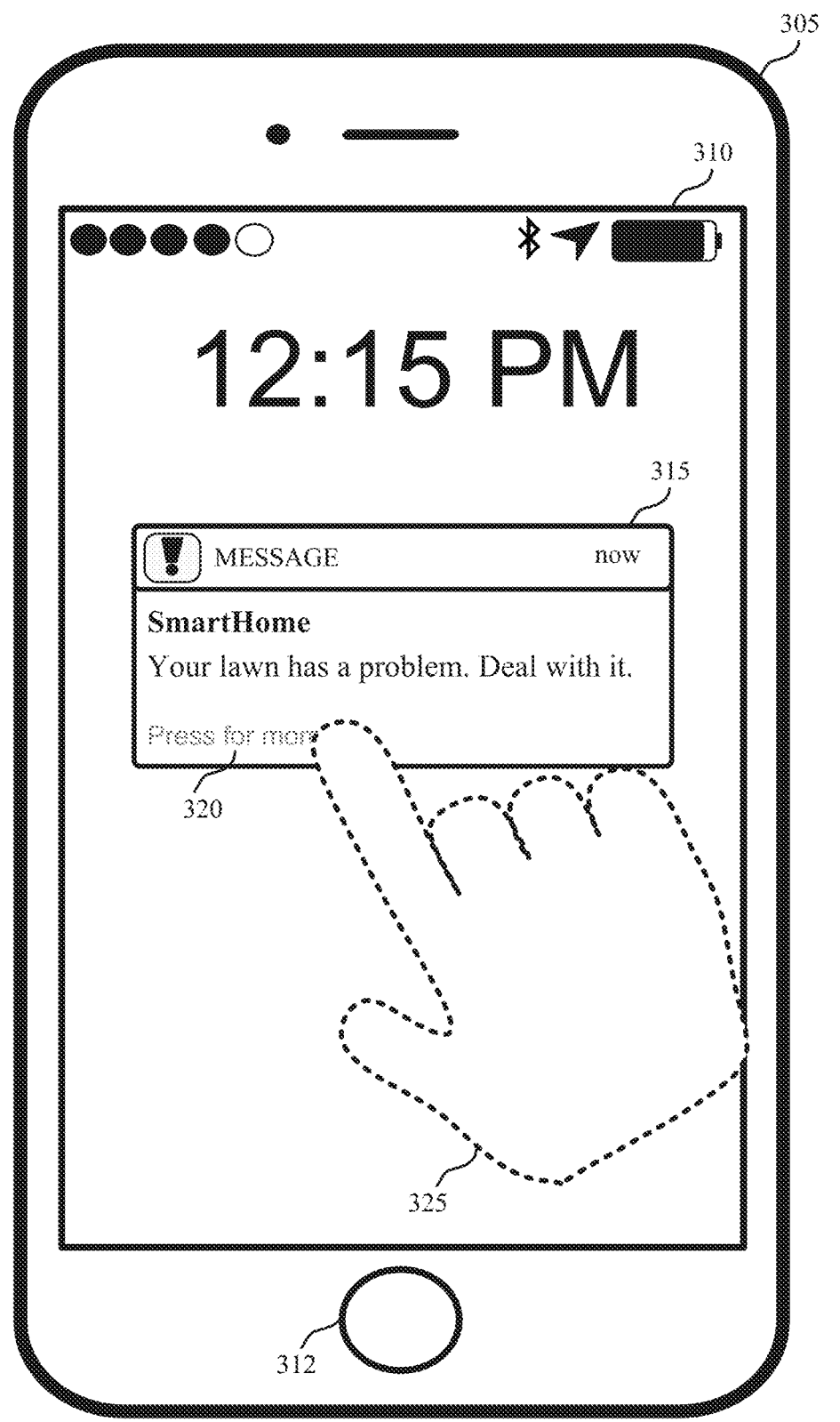
FIGS. 3A through 3F illustrate an example of a wireless device in accordance with aspects of the present disclosure.

FIG. 3A illustrates an example of a wireless device 300 in accordance with aspects of the present disclosure. The wireless device 300 may be a smartphone 305. The wireless device 300 may also be the control panel 135, or the local computing devices 115 or 120, or the remote computing device 140 as described in FIGS. 1 and 2. The smartphone 305 may include a user interface 310. The user interface 310 may be a touch screen that may display one or more graphics, and recognize a touch from an individual, stylus, or the like. The smartphone 305 may also include one or more physical buttons 312.

The control panel 135 may transmit a notification message to the smartphone 305. The smartphone 305 may receive and display the notification message via dialogue window 315 on a home screen of the user interface 310. The home screen may include a number of visual elements associated with the user interface 310. For example, a visual element may include a signal strength indicator for wireless communications, a time, and a battery status indicator. In some cases, the notification message may be preprogrammed with the control panel 135. That is, the control panel 135 may be preconfigured with a number of pre-generated messages that may be communicated or broadcasted (e.g., from the control panel 135). The notification message may provide an individual with a pre-generated notification message associated with the lawn 230-a. For example, the notification message may state a message such as "Your lawn has a problem. Deal with it." The individual may ignore, respond, or acknowledge the notification message by making contact or touching the user interface 310, for example, with one or more fingers of the individual's hand 325. In some cases, the user interface 310 may be configured to recognize any number of different types of inputs.

For instance, an individual may tap the user interface 310 to select a corresponding option. Further inputs recognized by the user interface 310 may include multiple, simultaneous touches of the user interface 310 and/or gestures. Gestures may generally include a touch of the user interface 310 (e.g., a touch-point), optionally accompanied by a corresponding movement of the finger, stylus or other element touching the user interface 310. Gestures may be combined with multiple touch-points or may be used with a single touch-point of the user interface 310. In some cases, multiple touch-point and gesture inputs may be recognized by the user interface 310. For example, an individual may use their hand to touch the user interface 310 at two touch-points. Upon touching the user interface 310, the individual may then move their fingers in a predetermined manner recognizable by the smartphone 305 (e.g., using a gesture recognition application as part of an operating system or as a separate application of the smartphone). When multiple touch-points and gestures are detected, the smartphone 305 may recognize the gesture, identify an action associated with the gesture, and perform the action. For example, the action may be to ignore or respond to the notification message.

In some examples, the dialogue window 315 may be a modal dialog window that may force the individual associated with the smartphone 305 to interact with the notification message before allowing the individual to return to using other features (e.g., applications, messaging, calling) of the smartphone 305. The notification message may also provide additional information. To view the additional information, the individual may select the "Press for more" option 320 within the dialogue window 315.

Figure 3B:
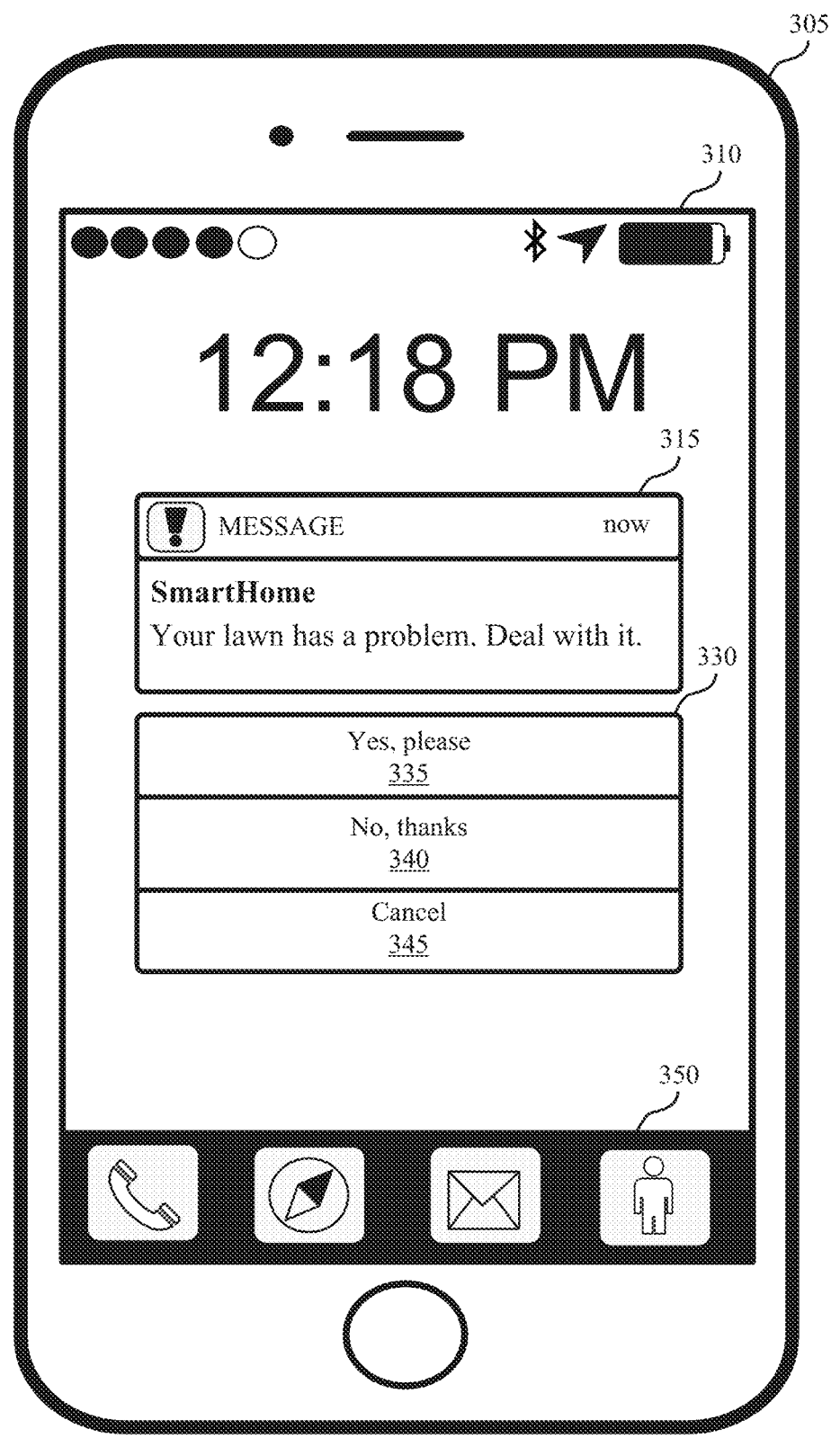

FIG. 3B illustrates an example of a wireless device 300 in accordance with aspects of the present disclosure. In the example of FIG. 3, the user interface 310 may transition out of a home screen and display one or more additional windows (e.g., dialogue windows or modal windows). In some cases, additional, different or fewer buttons may be provided, or different types of inputs may be provided on the user interface 310. For example, a tray 348 may display icons of frequently used applications. After the individual selects the option 320 to view additional information, the user interface 310 may display the additional information in a dialogue window 330.

The additional information may include one or more options for the individual to respond to the notification message. For example, a first option 335 may be a "Yes, please" selection, a second option 340 may be a "No, thanks" selection, and a third option 345 may be a "Cancel" choice. If the individual selects the second option 340, the smartphone 305 may communicate the selection to the control panel 135. The control panel 135 may receive the selection and continue normal routine operation (e.g., enter a low power state, receive sensor data). The control panel 135 may also record the selection and use it to model a response pattern for the individual. Alternatively, if the individual selects the third option 345, the control panel 135 may receive and record the selection for modeling the response pattern. In some cases, the third option 345 may prompt the control panel 135 to transmit a reminder notification message to the smartphone 305. For example, the third option 345 may act as a snooze choice, and the control panel 135 may transmit the reminder notification message after an expiration of a predetermined period. The predetermined period may be selected by the individual or be a preconfigured system setting of the control panel 135. Alternatively, if the individual selects the first option 335, the dialogue window 315 may display different information.

Figure 3C:
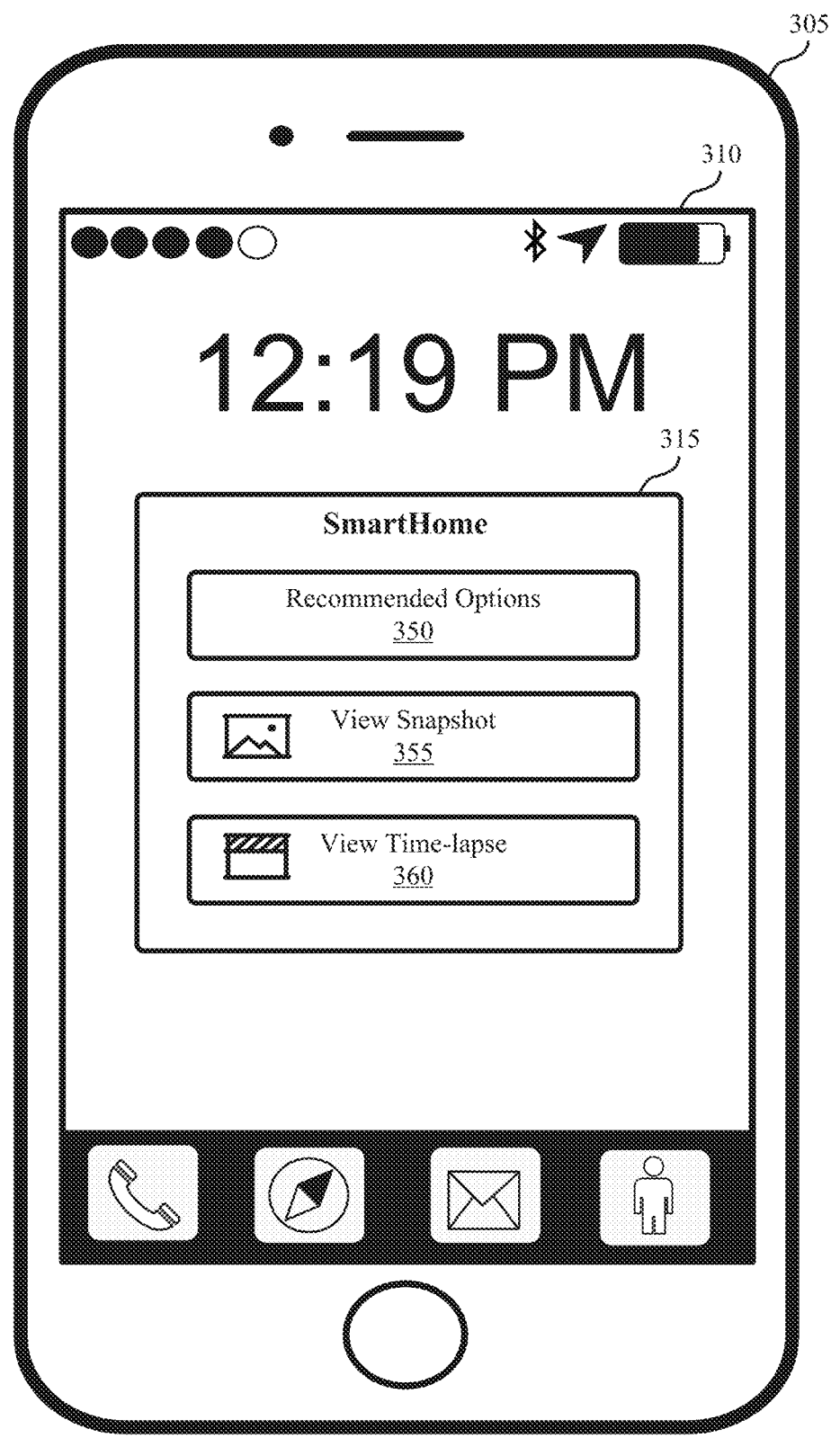

FIG. 3C illustrates an example of a wireless device 300 in accordance with aspects of the present disclosure. In the example of FIG. 3C, the dialogue window 315 may display one or more selectable options for the individual. A first option 350 may include recommend options suggested by the control panel 135 (e.g., suggested by the home automation system), a second option 355 may include a choice to view a snapshot of the lawn 230-a, and a third option 360 may include an option to view a time-lapse of the lawn 230-a.

With reference to FIG. 2B, the control panel 135 may determine a set of recommended actions to perform based on the determined status of the lawn 230-a. The control panel 135 may identify a learned preference or a pre-stored setting of the individual, to determine the set of recommended actions. For example, the control panel 135 may analyze historical data related to actions taken by the individual with respect to the lawn 230-a. The recommended actions may include adjusting one or more parameters of or controlling a sprinkler system, identifying a product (e.g., fertilizer) that may provide a solution to the patches 235, or suggest scheduling an appointment with a gardening and lawn care service, among others. If the individual selects the first option 350, the dialogue window 315 may display additional information or selections for the individual.

Figure 3D:
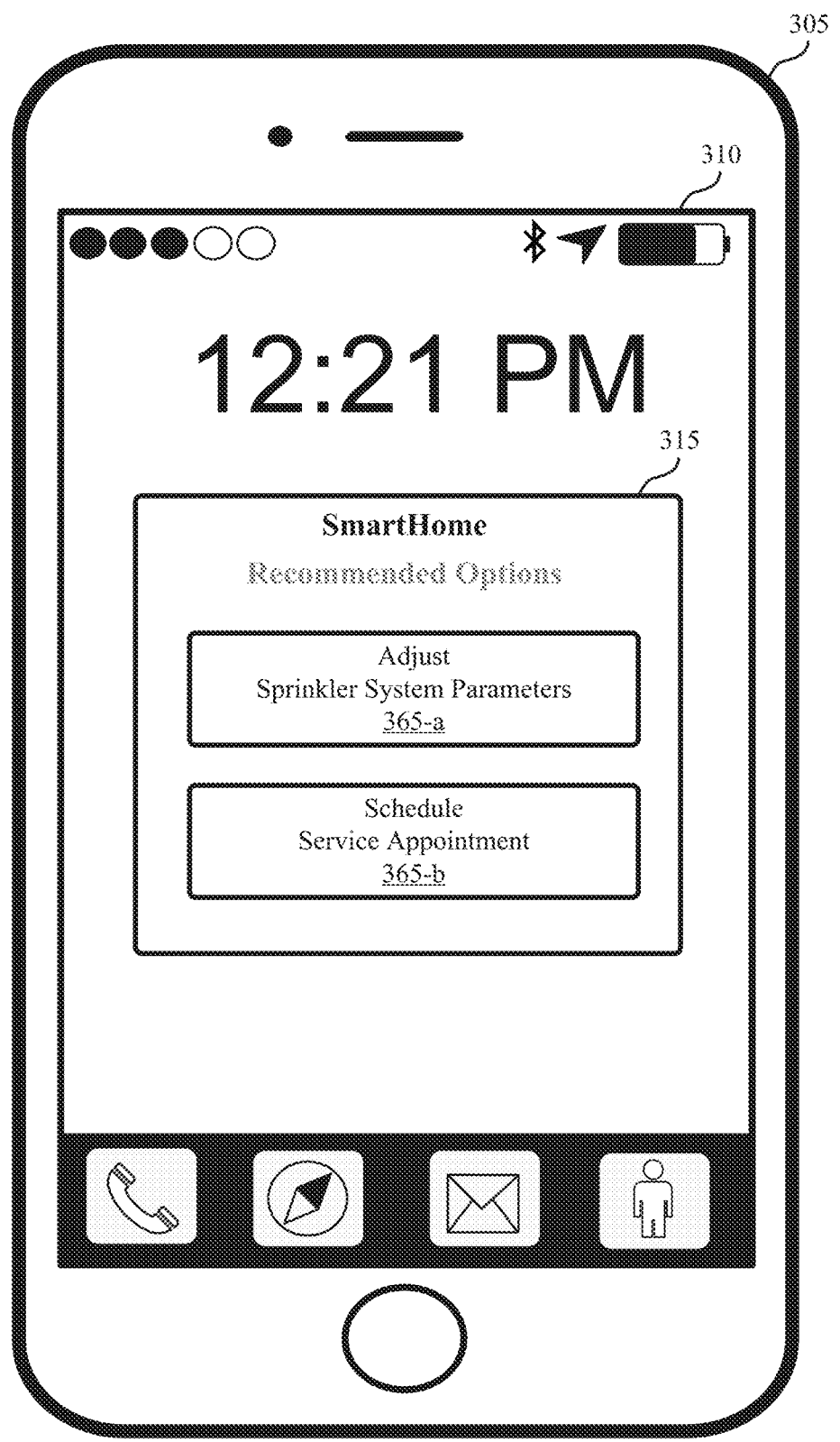

FIG. 3D illustrates an example of a wireless device 300 in accordance with aspects of the present disclosure. After the individual selects the first option 350, the dialogue window 315 may display one or more selectable options for the individual. A first option 365-a may include an option to adjust one or more sprinkler system parameters and a second option 365-b may include an option to schedule a service appointment. In some cases, the control panel 135 may determine the severity of the patches 235. For example, the control panel 135 may determine whether the patches 235 may be replenished to a normal status by providing frequent watering of the patches 235. If the control panel 135 determines that the patches can be improved using the sprinkler system, the control panel 135 may automatically modify one or more parameters of the sprinkler system to provide the desired result (i.e., improvement of the patches 235).

A parameter of the sprinkler system may include a run time for a sprinkler zone associated with the lawn 230-a. In some examples, the sprinkler system may be intelligent with respect that the control panel 135 may modify a parameter of one or more sprinkler nodes without affecting operation of other sprinkler nodes of the sprinkler system. The control panel 135 may transmit a message requesting approval to adjust a parameter of the sprinkler system. For example, the control panel 135 may transmit to a device (e.g., smartphone 305) a request for authorization to perform the adjustment. The control panel 135 may receive, from the device, an acknowledgment message in response to the transmitted request. As a result, the control panel 135 may modify a parameter of the sprinkler system. Alternatively, the control panel 135 may automatically perform the adjustment without requesting authorization from the individual.

In some cases, the control panel 135 may determine that the lawn 230-a may require servicing (i.e., mowed, weeds pulled) based on the sensor data. In this case, the control panel 135 may identify a learned preference or a pre-stored setting of the individual with respect to the lawn 230-a. For example, the learned preference or the pre-stored setting may indicate to contact a lawn care service (i.e., third-party enterprise). As such, the control panel 135 may parse and retrieve contact information associated with the lawn care service via a database. In some cases, the control panel 135 may identify one or more lawn care services and transmit a message to the smartphone 305 for the individual to select a lawn care service. To identify a lawn care service, the control panel 135 may communicate with one or more third-party servers (e.g., the server 155, or a search engine server). The control panel 135 may communicate one or more search parameters to the third-party server. For example, the control panel 135 may provide a geolocation of the smart home 250, a search radius associated with the geolocation, a service category (i.e., lawn care service), among others. In some cases, the third-party server may provide a list of identified lawn care services based on the provided search parameters.

The control panel 135 may provide the list to the smartphone 305 for viewing by the individual. The control panel 135 may receive a selection of a lawn care service from the individual via the smartphone 305. Once the control panel 135 receives a selection of the lawn care service; or in the case the control panel 135 has a learned preference or a pre-stored setting of a previously used lawn care service, the control panel 135 may generate a message and transmit it to the lawn care service (e.g., to a server associated with the lawn care service). In some examples, the message may include a request to schedule a personnel to visit the smart home 250 to provide the service during a specified date and time. The schedule may be based on a schedule of the individual associated with the smart home 250. The message may also include address information associated with the smart home 250. The message may be an e-mail, or an automatic request form filled on a website of the lawn care service, an SMS, etc.

In some cases, the control panel 135 may refrain from transmitting the message until receiving authorization from the individual. In some cases, scheduling the lawn care service may include providing payment information. The control panel 135 may be configured with one or more payments options. For example, an individual may store credit card information with the control panel 135. As such, transmitting the message to the individual for authorization may include requesting the individual to authorize payment and scheduling of the lawn care service via their personnel device (e.g., smartphone 305). The control panel 135 may also provide the payment information in the message transmitted to the lawn care service.

The control panel 135 may receive a reply message from the lawn care service confirming the request. In some cases, the control panel 135 may transmit a notification message to the smartphone 305 notifying the individual of the scheduled lawn care service. In some cases, the control panel 135 may track a pending status of the scheduled lawn care service, and provide notifications to the individual when the status is determined to be completed. In some examples, the control panel 135 may automatically schedule the lawn care service based on a predetermined setting (e.g., preapproval by the individual).

Figure 3E:
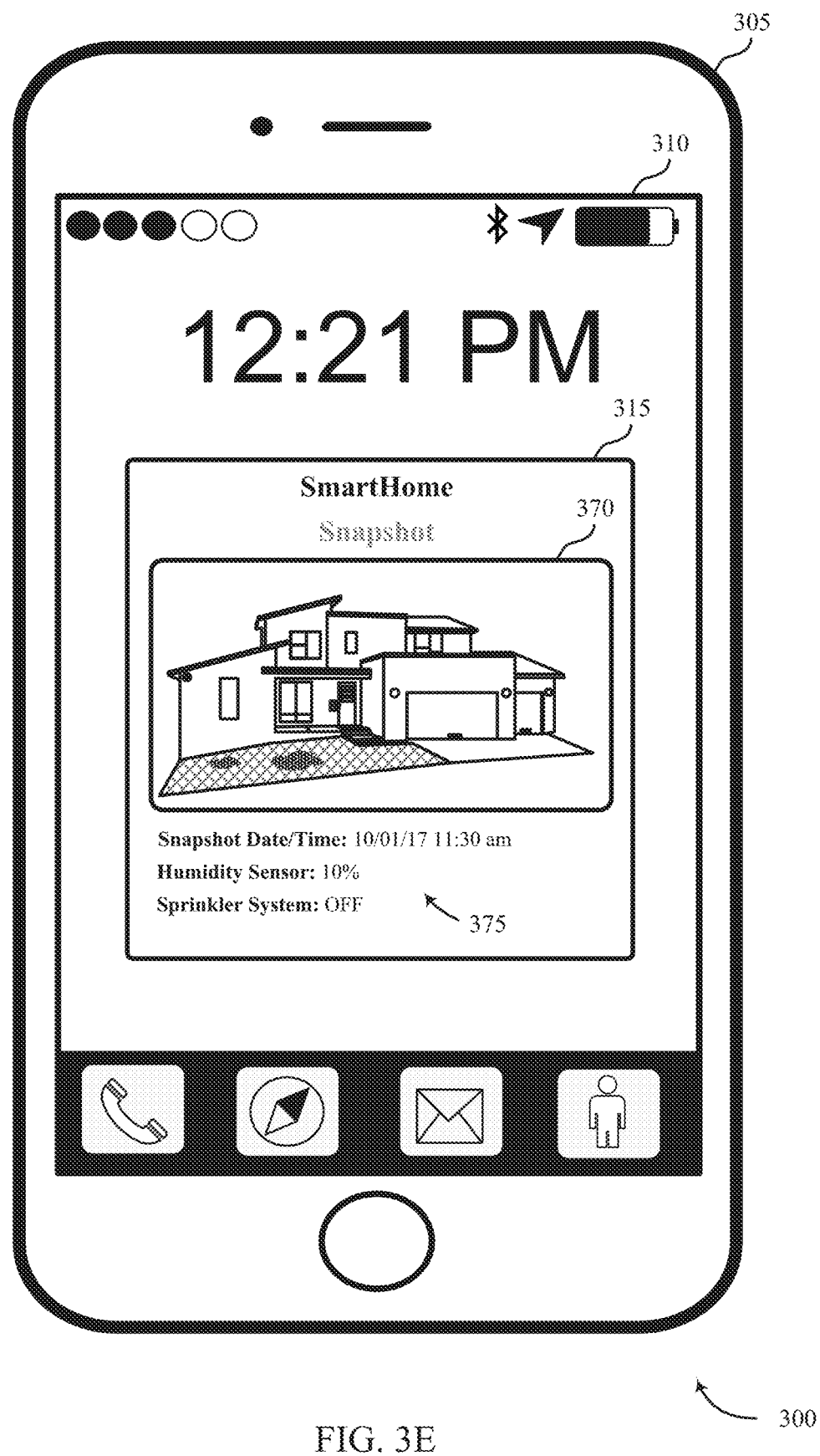

With reference to FIG. 3C, if the individual selects the second option 355, the dialogue window 315 may display additional information or different options for the individual. FIG. 3E illustrates an example of a wireless device 300 in accordance with aspects of the present disclosure. In the example of FIG. 3E, the dialogue window 315 may display a snapshot 370 of the smart home 250 including the lawn 230-a and the patches 235. In addition to the snapshot 370, the dialogue window 315 may also display additional information 375. The displayed additional information 375 may include a timestamp of the snapshot 370, sensor data (e.g., a humidity level sensed by a humidity sensor), and a status (e.g., ON/OFF) of a sprinkler system.

Figure 3F:
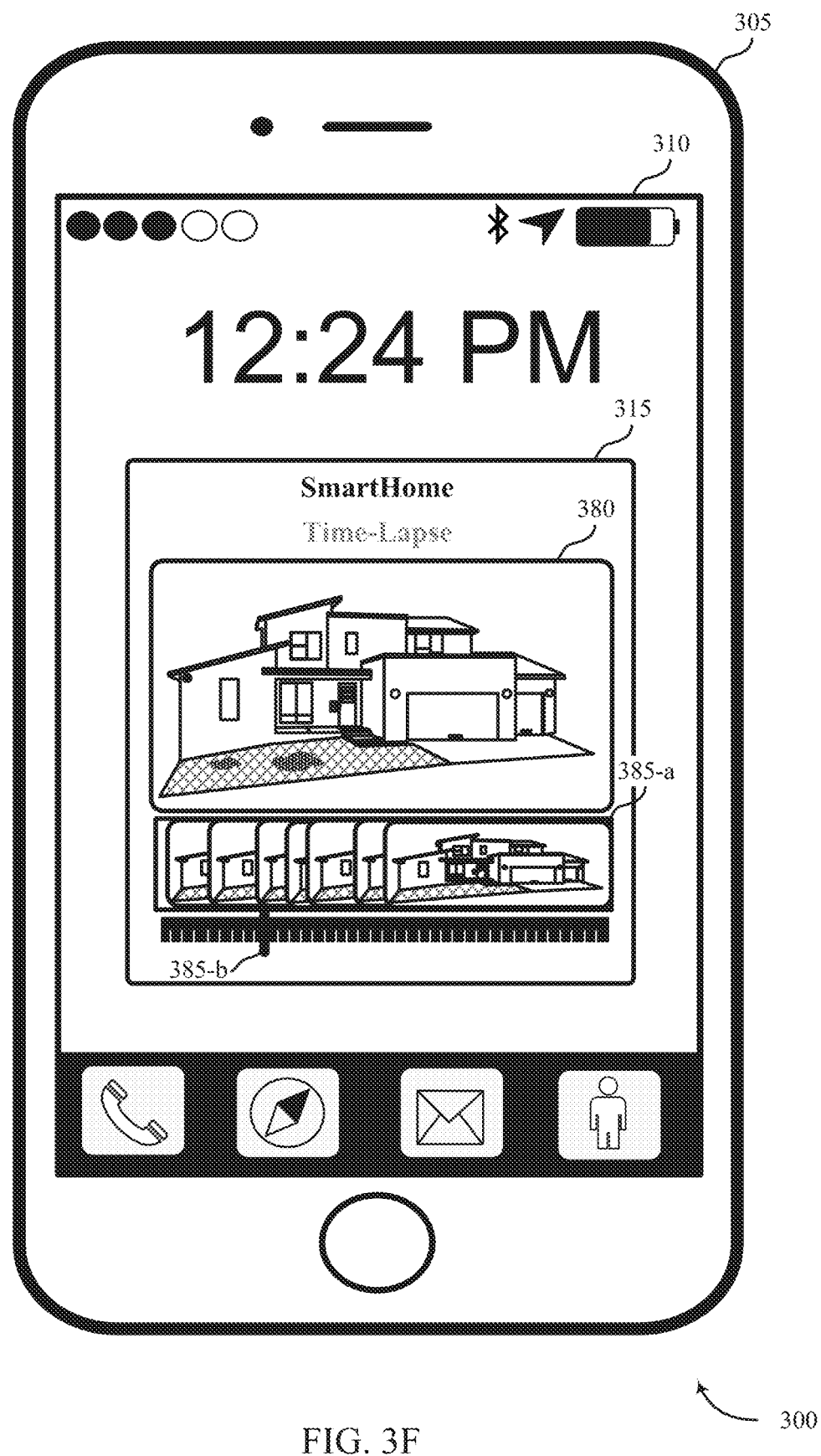

With reference to FIG. 3C, if the individual selects the third option 360, the dialogue window 315 may display additional information or different options for the individual. FIG. 3F illustrates an example of a wireless device 300 in accordance with aspects of the present disclosure. In the example of FIG. 3F, the dialogue window 315 may display a time-lapse 380 of the smart home 250. An individual may scan across different frames using the time-lapse visualizer 385-a or the time-lapse marker 385-b. In some examples, the control panel 135 may generate a time-lapse video of sensor data (e.g., captured images or video) based on analysis points or activity of interest related to one or more attributes. An attribute may include detection of change or transition of color or luminance. The control panel 135 may detect a change or a transition of color or luminance between video frames, color or luminance can be detected based on changes across video frames, such as a pair of consecutive video frames. The control panel 135 may flag video frames where change in color and luminance is detected, as such the time-lapse 380 may be a condensed data file (i.e., video). An individual may determine how to respond to the notification message provided by the control panel 135 based on the snapshot 370 or the time-lapse 380.

Figure 4:
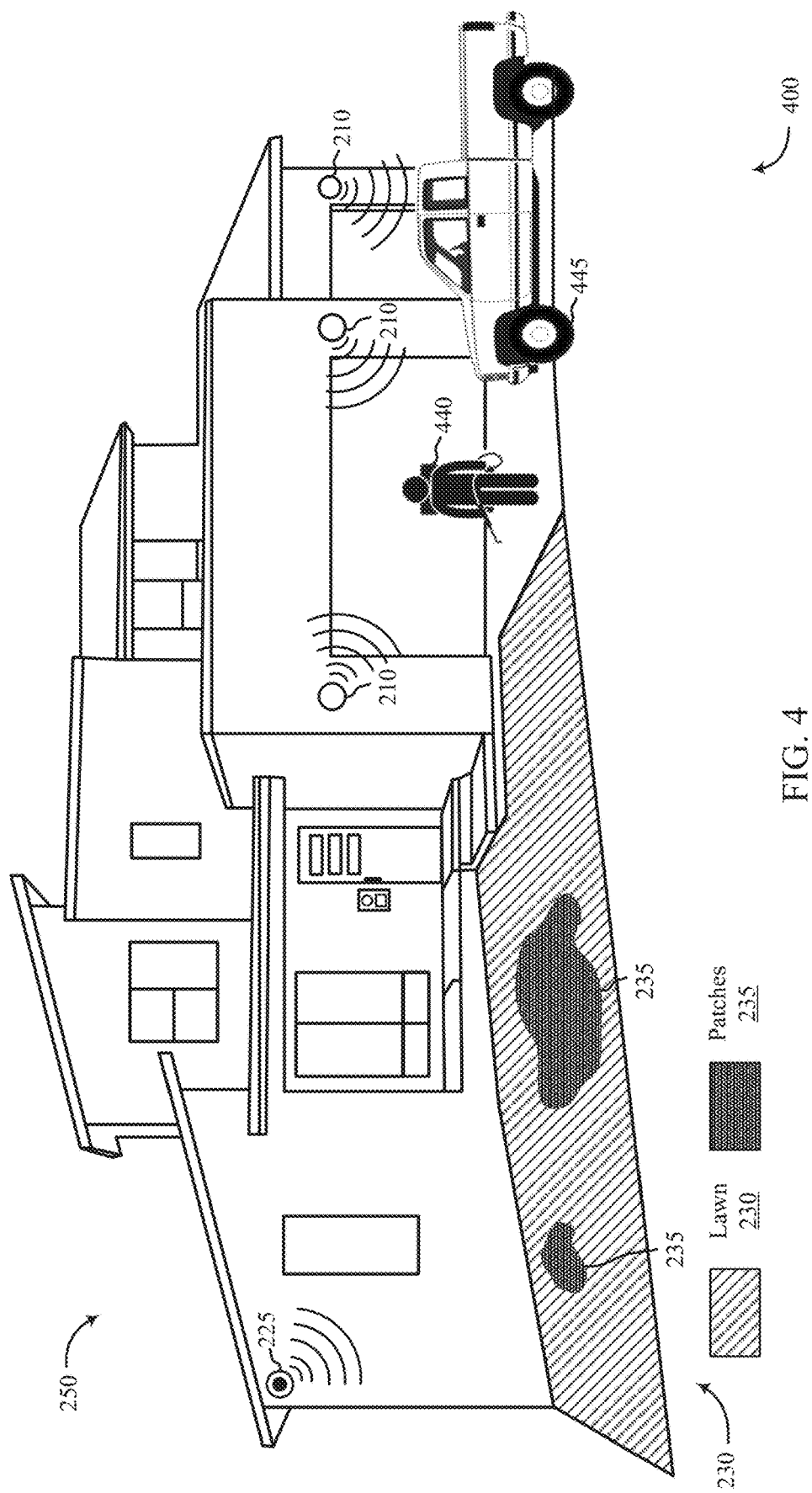
FIG. 4 illustrates an example diagram relating to an example security and automation environment in accordance with aspects of the present disclosure.

FIG. 4 illustrates an example diagram relating to an example security and automation environment 400 in accordance with aspects of the present disclosure. In some examples, the security and automation environment 400 may implement aspects of the security and automation environment 200-a and 200-b. The security and automation environment 400 may include one or more sensor units 210 and the sensor unit 225 as described with reference to FIGS. 2A and 2B. The one or more sensor units 210 or the sensor unit 225 may detect that a person 440 is located within a distance threshold to the smart home 250. The one or more sensor units 210 or the sensor unit 225 may also detect a vehicle 445. The one or more sensor units 210 or the sensor unit 225 may transmit sensor data indicating the detected person 440 to the control panel 135. The sensor data may include sensed motion at or near the smart home 250, sensed sound at or near the smart home 250, sensed activation of a doorbell at or near an entry to the smart home 250, or an image of the detected person 440 and the vehicle 445.

The control panel 135 may receive and perform post-processing on the sensor data. For example, the control panel 135 may perform image recognition (e.g., facial recognition) on a captured image of the detected person 440. If a face is detected, processing the captured images may include determining who the person 440 is, whether the person 440 is on an approved list of visitors (e.g., an approved service personnel list), or the like. Recognition may include detecting other aspects. For instance, if the person 440 is there to perform the lawn care service, an insignia, symbol, or the like on the person's 440 clothing may be detected to identify the lawn care service. In some cases, the control panel 135 may perform image recognition techniques on the captured image of the vehicle 445 to identify a symbol on the vehicle 445 that may identify the lawn care service. In some cases, the control panel 135 may receive a message from a personnel device carried by the person 440. The message may indicate that the person has arrived at the smart home 250 to perform the lawn care service. The message may also include identification information with respect to an identity of the person 440 and the lawn care service.

In some cases, the control panel 135 may identify a timestamp (e.g., time and date) associated with the sensor data indicating the detection of the person 440. The control panel 135 may compare the timestamp to a scheduled service time. The control panel 135 may validate that the timestamp is within a threshold limit of the scheduled service time. In some cases, the control panel 135 may transmit a notification to a device (e.g., smartphone 305) of an individual associated with the smart home 250 indicating arrival of the person 440. The control panel 135 may also track a duration of the person 440 at a premises of the smart home 250 and an activity level of the person 440 with respect to performing the requested service of the lawn 230-a. The control panel 135 may generate a report indicating a total duration of the service and transmit the report to the device (e.g., smartphone 305) of the individual. In some cases, the control panel 135 may support and provide an option for the individual to view a real-time video feed. For example, the real-time video feed may show the person 440 servicing the lawn 230-a. The control panel 135 may detect when the person 440 departs the premises of the smart home 250, and notify the individual of the departure.

Figure 5:
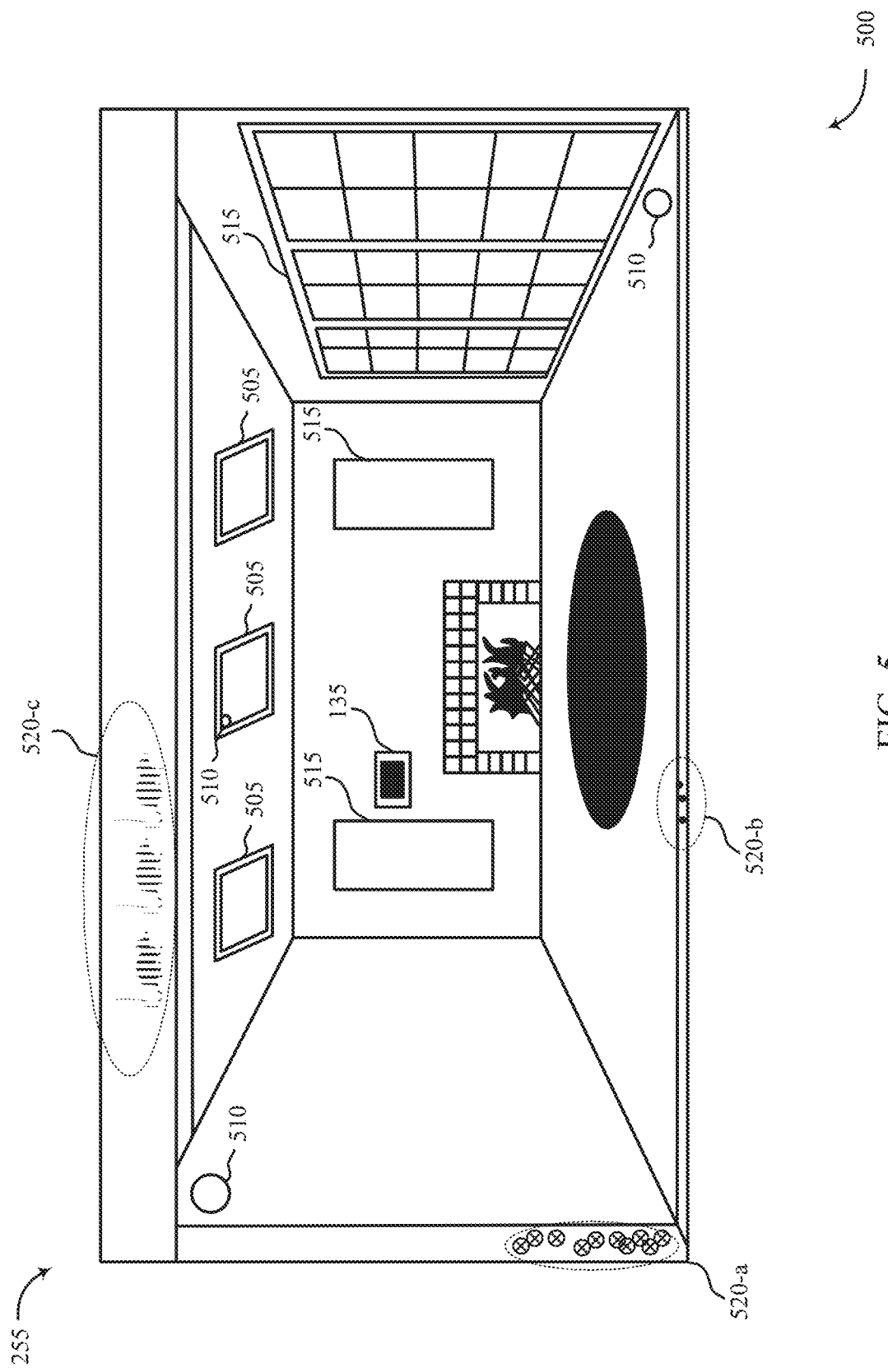
FIG. 5 illustrates an example diagram relating to an example security and automation environment in accordance with aspects of the present disclosure.

FIG. 5 illustrates an example diagram relating to an example security and automation environment 500 in accordance with aspects of the present disclosure. In some examples, the security and automation environment 500 may implement aspects of the system 100. In some examples, the security and automation environment 500 may implement aspects of the security and automation environment 200-a. 200-b, and 400. The security and automation environment 500 may include one or more sensor units 510 and one or more access points 515. For example, the access points 515 may include windows or doors of a smart room 255. The one or more sensor units 510 may be installed, mounted, or integrated with one or more of the access points 515, or alternatively with an interior and/or an exterior surface (e.g., walls, floors) of the smart room 255.

The control panel 135 may be located within the smart room 255. The control panel 135 may receive data from the one or more sensor units 510 that may be installed and mounted with a surface of the smart room 255. The one or more sensor units 510 may be integrated with a home appliance or fixture such as a light bulb fixture. For example, one sensor unit may be installed and mounted on a wall, a second sensor unit may be installed or mounted on a floor. Additionally or alternatively, a third sensor unit may be installed or integrated with a light fixture 505. In some examples, the control panel 135 may communicate and receive data periodically or continuously from the sensor units 510. The control panel 135, the one or more sensor units 510 may communicate according to a RAT.

The one or more sensor units 510 may represent one or more separate sensors or a combination of two or more sensors in a single sensor device. For example, the one or more sensor units 510 may be an accelerometer sensor, an audio sensor, a motion sensor, a capacitance sensor, a camera, a temperature sensor, among others. The security and automation environment 500 may support smart sensing of a pest within a smart home i.e., the smart room 255. A pest may be any animal that may exert a harmful effect on an individual associated with the smart room 255, or on a consumable item (e.g., food and beverages). For example, pests may include, but are not limited to, cockroaches 520-a, termites 520-b, and rodents 520-c.

The one or more sensor units 510 may detect cockroaches 520-a on an exterior or interior surface of a wall or a floor associated the smart room 255. For example, one sensor unit may be a motion sensor that may detect movement on the walls, another sensor unit 510 may be a camera that may capture images or a video within a field-of-view of where the detected movement is occurring. Both sensor units 510 may transmit the sensor data (i.e., detected movement and captured image(s)) to the control panel 135. The control panel 135 may perform processing on the sensor data to determine or identify who or what is associated with the detected movement. For example, the control panel 135 may perform image recognition techniques or video analytics that may identify and confirm that an object in an area of the detected movement is an animal as opposed to other types of objects, such as persons.

In some cases, the one or more sensor units 510 may detect the termites 520-b on an exterior or interior surface of a wall or a floor associated the smart room 255. For example, one sensor unit may be installed, mounted, or integrated with a floor of the smart room 255, and may monitor and detect vibrations relative to the floor. The sensor unit 510 may transmit the sensor data (e.g., detected vibrations) to the control panel 135. The control panel 135 may receive and perform processing on the sensor data to confirm that an anomaly exists on an exterior or interior surface of the floor. For example, the control panel 135 may compare the received sensor data to other sensor data (e.g., a sensor unit installed, mounted, or integrated with a wall that may also monitor vibrations), to confirm whether the detected vibrations from the sensor unit 510 is an isolated event or whether it is widespread across the smart room 255.

The control panel 135 may perform analytics on the received sensor data. Analytics may include the control panel 135 requesting sensor data (e.g., vibration specific data) from a third-party server. The request may indicate a type of sensor data, a sensitivity range (e.g., gravitational sensitivity) of the sensor data, a category (e.g., earthquake sensor data, residential sensor data, commercial sensor data, animal sensor data). For example, the type may be vibrational sensor data, the range may be of the detected sensor readings (0.5 g), and the category may be humans and animals. As a result, the control panel 135 may receive the sensor data from the third-party server (e.g., the server 155). The control panel 135 may then perform analytics by comparing the received sensor data from one or more of the sensor units 510 and the received sensor data from the third-party server. Based on the comparison, the control panel 135 may eliminate the option that the sensor data is related to humans, and determine that the sensor data is associated with an animal (i.e., pest).

In some cases, the one or more sensor units 510 may detect the rodents 520-c on an exterior or interior surface of a wall or a floor associated with the smart room 255. In some examples, a first sensor unit may be a temperature sensor combined with a camera. The sensor unit 510 may monitor an ambient temperature of the smart room 255, and the camera may be a thermal camera that may be an infrared sensor for monitoring increased fluctuations in infrared radiation. A second sensor unit may be a motion sensor that may detect motion, and a third sensor unit may be an audio sensor that may detect sounds.

In the example of detecting the rodents 520-c, the second sensor unit may detect motion and the third sensor unit may detect a sound. Both the second and third senor units may transmit the sensor data (i.e., detected motion and sound) to the control panel 135. The control panel 135 may correlate and associate the sensor data from the second senor unit and the third sensor unit based on a timestamp of the sensor data and the location of the senor units in the smart room 255. As a result, the control panel 135 may perform analytics on a combination of the sensor data from both sensor units. Analytics may include the control panel 135 identifying whether the detected sound and motion is human-generated or animal-generated. For example, the control panel 135 may be configured to distinguish between human speech and animal sounds (e.g., a dog barking), as well as distinguish between human footsteps and animal footsteps (e.g., distinguish between biped footstep patterns and quadruped footstep patterns, etc.). The control panel 135 may therefore confirm that the detected movement and sound is associated with an animal (e.g., rodents 520-c) or a human.

In some cases, the control panel 135 may signal the first sensor unit to capture images or a video of the smart room 255 including thermal images with respect to the interior surface of the walls and floors of the smart room 255. Alternatively, the first sensor unit may capture images and video based on detected increased fluctuations in infrared radiation. The control panel 135 may receive thermal images captured by the first sensor unit that may further confirm that the detected movement and sound is associated with the rodents 520-c. In some cases, the control panel 135 may generate a map of the smart room 255 with respect to the rodents 520-c. For example, the map may show location-related data of the rodents 520-c (e.g., spatial and temporal data of the movement of the rodents 520-c) with respect to the smart room 255. The control panel 135 may notify an individual associated with the smart room 255. For example, the control panel 135 may transmit a notification message alerting the individual of the detected pests. The notification message may include the generated map of the smart room 255 and location-related data of the rodents 520-c.

Figure 6A:
FIGS. 6A through 6C illustrates an example of a wireless device in accordance with aspects of the present disclosure.

FIG. 6A illustrates an example of a wireless device 600 in accordance with aspects of the present disclosure. The wireless device 600 may be a smartphone 605. The wireless device 600 may also be the control panel 135, the local computing devices 115,120, or the remote computing device 140 as described in FIGS. 1 through 5. The wireless device 600 may also implement aspects of the wireless device 300. The smartphone 605 may receive and display the message received from the control panel 135 via dialogue window 615 on a user interface 610. In some cases, the message may be preprogrammed with the control panel 135. That is, the control panel 135 may be preconfigured with a number of messages that may be communicated to the smartphone 605. For example, the message may provide an individual with a notification message e.g., "Your home has a problem. Deal with it." The individual may disregard or accept the notification message by touching the user interface 610, for example, with one or more fingers of the individual's hand 625. The notification message may also provide additional information. To view the additional information, the individual may select the "Press for more" option 620 within the dialogue window 615.

Figure 6B:
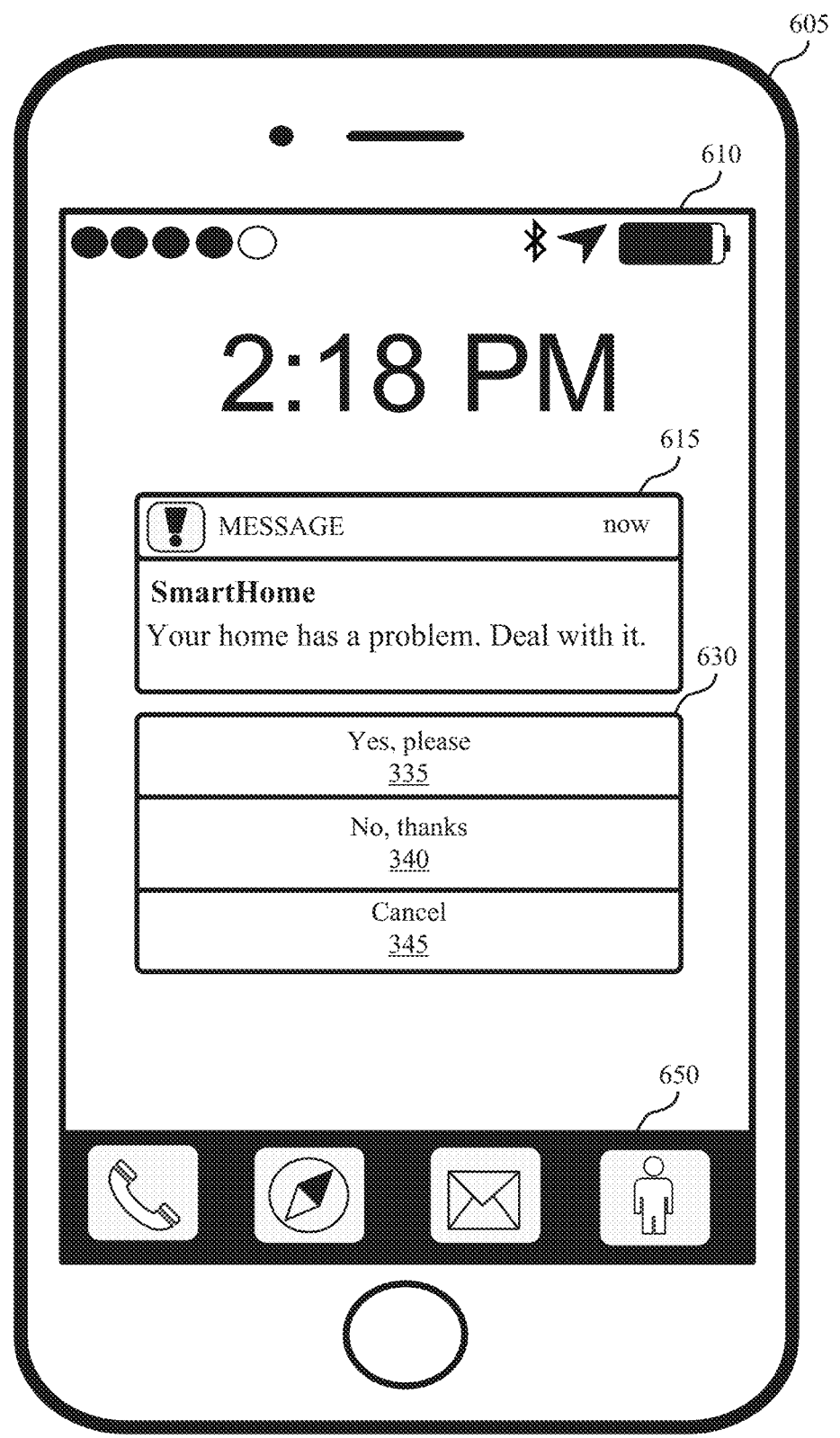

FIG. 6B illustrates an example of a wireless device 600 in accordance with aspects of the present disclosure. In the example of FIG. 6B, the user interface 610 may transition out of a home screen and display one or more additional windows (e.g., dialogue windows or modal windows). In some cases, additional, different or fewer buttons may be provided, or different types of inputs may be provided on the user interface 610. For example, a tray 650 may display icons of frequently used applications. After the individual selects the option 620 to view additional information, the user interface 610 may display the additional information in a dialogue window 630. The additional information may include one or more options for the individual to respond to the notification message. For example, a first option 635 may be a "Yes, please" decision, a second option 640 may be a "No, thanks" selection, and a third option 645 may be a "Cancel" choice, as described with reference to FIG. 3B. In some cases, if the individual selects the first option 635, the dialogue window 315 may display different information.

With reference to FIG. 5, in some cases, the control panel 135 may perform a function associated with the detection of one or more pests relative to the smart room 255. For example, the control panel 135 may generate one or more suggested options for an individual to select as a response action to the detection of the one or more pests. In an example, the control panel 135 may identify a product or a service for handling the detected pest.

Figure 6C:
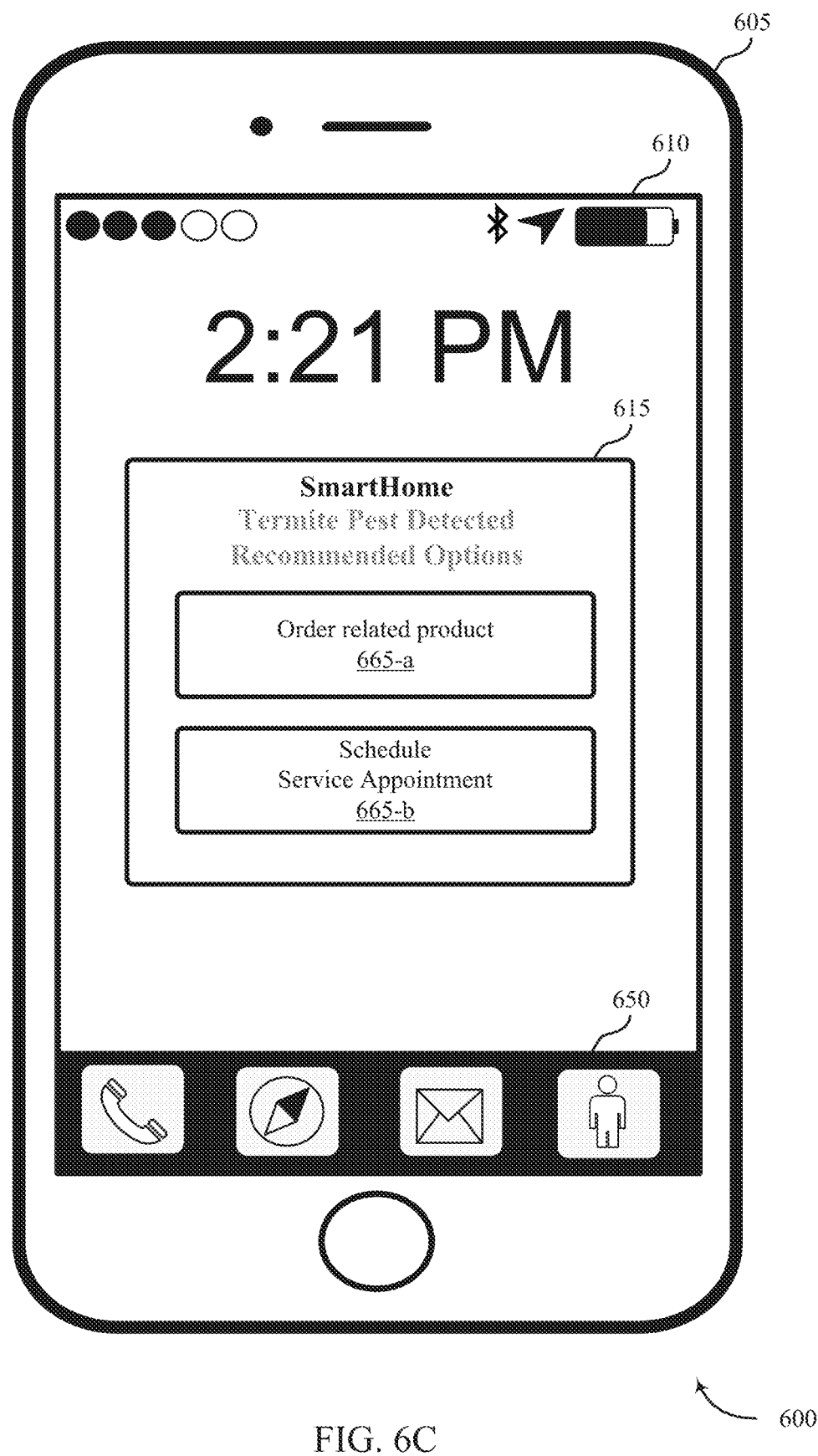

FIG. 6C illustrates an example of a wireless device 600 in accordance with aspects of the present disclosure. In some cases, the control panel 135 may determine a set of recommended options based on a learned preference or a pre-stored setting of the individual. For example, the control panel 135 may analyze historical data related to actions taken by the individual with respect to the detected pests. The dialogue window 615 may display one or more selectable options for the individual. A first option 655-*a* may include an option to order a related product and a second option 655-*b* may include an option to schedule a service appointment.

In some cases, the control panel 135 may receive website information from one or more devices associated with an individual of the smart room 255. The website information may include identification information of E-commerce websites visited by the individual and purchases made by the individual. The control panel 135 in communication with a third-party server (e.g., the server 155, an E-commerce server) may provide information that may support identifying a product related to pest removal. For example, the control panel 135 may submit a query that may include one or more search terms and criteria for the third-party server to use and limit a product search to a specific pest and a product price. The control panel 135 may receive a list of products related to the provided search term(s) and criteria, and provide the list of products to the smartphone 605 for viewing by the individual.

The control panel 135 may receive a selection of a product from the individual via the smartphone 605. After the control panel 135 receives the selection of the product, the control panel 135 may proceed to generate delivery and payment information and provide the information to a server associated with an E-commerce website related to the selected product. In some cases, prior to transmitting and submitting the delivery and payment information to the E-commerce website, the control panel 135 may provide an approval/authorization message to the individual via the smartphone 605. Once the control panel 135 receives approval from the individual, the control panel 135 may process the order by transmitting the order to the server of the E-commerce website. The control panel 135 may monitor a status of a shipping of the product, by receiving shipping information from the server of the E-commerce website. The status of the shipping may be provided by the control panel 135 to the smartphone 605 for viewing by the individual.

In some cases, the control panel 135 may receive audio data from the smartphone 605 in response to the notification message. For example, the individual wanting to order a product or learn information about a past product order may provide an input (e.g., audio data) at the smartphone 605 that may be transmitted to the control panel 135. In some examples, an individual wanting to order a product (e.g., pest related product) may initiate an order by selecting a product from the provided list using the smartphone 605 via manually selecting the product or via voice command. In some cases, the control panel 135 may transmit the order to another device (e.g., the server 155) to perform one or more functions (including order finalizing, processing, shipping, etc.).

In some cases, an individual may have need of frequently ordering a specific product (e.g., a pest control product), a sensor unit 510 could be placed in an area where the product is frequently used (e.g., near a kitchen, near a bathroom, near a bedroom). When the sensor unit 510 detects that the product needs to be replaced or reordered (either before or after the product is entirely gone) the sensor unit 510 may transmit an order request to the control panel 135 to be processed (e.g., finalizing, processing, shipping). In some cases, the control panel 135 may process an order without additional input, from the individual. The control panel 135 may also select a default providing entity (e.g., consumer store), brand (name-brand vs. store brand), quantity (based on one or more past orders and/or a user selection), shipping information (e.g., cost, shipping entity, time to shipping, time to delivery, delivery requirements such as signature, packaging, some combination, other information, etc.), some combination, or other information. Such defaults may be user related, system related, product related, or providing entity related, among other things.

In some cases, the control panel 135 may identify a list of termite and pest control services and transmit a message to the smartphone 605 for the individual to select a termite and pest control service to service the smart room 255. To identify a termite and pest control service, the control panel 135 may communicate with one or more third-party servers (e.g., the server 155, or a search engine server). The control panel 135 may communicate one or more search parameters to the third-party server. For example, the control panel 135 may provide a geolocation of a smart home, a search radius associated with the geolocation, a service category (i.e., termite and pest control service), among others. In some cases, the third-party server may provide a list of identified termite and pest control service based on the provided search parameters. The control panel 135 may provide the list to the smartphone 605 for viewing by the individual. The control panel 135 may receive a selection of a termite and pest control service from the individual via the smartphone 605.

Once the control panel 135 receives a selection of a termite and pest control service or in the case the control panel 135 has a learned preference or a pre-stored setting of a previously used termite and pest control service, the control panel 135 may generate a message and transmit it to the termite and pest control service. In some examples, the message may include a request to schedule a personnel to visit the smart room 255 to provide a termite and pest control service during an assigned date. The schedule may be based on a schedule of the individual associated with the smart room 255. The control panel 135 may synchronize with a schedule of the individual by downloading the individual's schedule from the smartphone 605.

In some cases, the control panel 135 may refrain from transmitting the message until receiving authorization from the individual. In some cases, scheduling the termite and pest control service may include providing payment information. The control panel 135 may be configured with one or more payments options. For example, an individual may store credit card information with the control panel 135. As such, transmitting the message to the individual for authorization may include requesting the individual to authorize payment and scheduling of the termite and pest control service. The control panel 135 may also provide the payment information in the message transmitted to the termite and pest control service.

The control panel 135 may receive a response message from the termite and pest control service confirming the request. In some cases, the control panel 135 may transmit a notification message to the smartphone 605 notifying the individual of the scheduled termite and pest control service. In some cases, the control panel 135 may track a pending status of the scheduled termite and pest control service, and provide one or more notifications to the individual when the status is determined to be completed. In some examples, the control panel 135 may automatically schedule the termite and pest control service based on a predetermined setting (e.g., preapproval by the individual).

Figure 7:
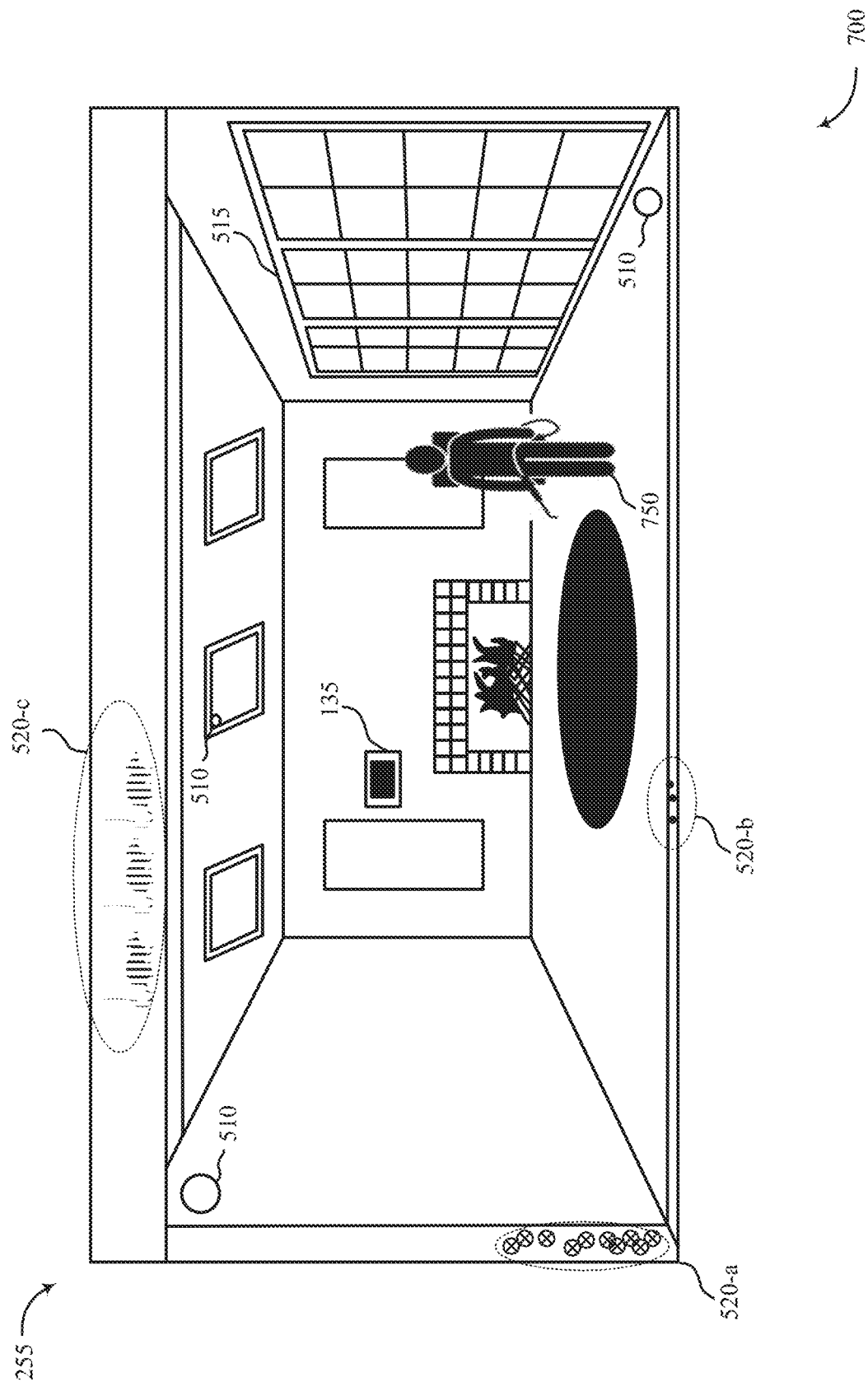
FIG. 7 illustrates an example diagram relating to an example security and automation environment in accordance with aspects of the present disclosure.

FIG. 7 illustrates an example diagram relating to an example security and automation environment 700 in accordance with aspects of the present disclosure. In some examples, the security and automation environment 700 may implement aspects of the security and automation environment 500. The security and automation environment 700 may include one or more sensor units 510 as described with reference to FIG. 5.

The security and automation environment 700 may provide admission to person 750 to access the smart room 255. In some examples, security and automation environment 700 may include a doorbell camera. The doorbell camera may be installed, mounted, or integrated near or at access point of the smart room 255. In some examples, one or more sensor units 510 in conjunction with the doorbell camera may detect that the person 750 is located proximate to the access points 515 of the smart room 255 based on received sensor data. The sensor data may include sensed motion at or near the access points 515 to the smart room 255, or sensed sound at or near the access points 515 to the smart room 255.

In some cases, the person 750 may knock or ring a doorbell of entry access point to smart room 255. The doorbell camera in communication with the control panel 135 may identify a suggested security action. The suggested security action may include establishing a communication session between a remote device (e.g., the smartphone 605) and a communication device associated with the doorbell camera at or near the entry of the smart room 255. Additionally or alternatively, the suggested action may include transmitting instructions for turning a light on or off at the smart room 255 or locking or unlocking an access point (e.g., entry access point) to the smart room 255, or turning an alarm on or off to the smart room 255.

In some cases, the control panel 135 may use schedule information regarding a service personnel scheduled to service the smart room 255 to determine that the person 750 is the service personnel. In some cases, the control panel 135 may receive sensor data (e.g., captured images, video, motion, sound) and perform post-processing on the sensor data. The control panel 135 may identify a timestamp of the sensor data. The control panel 135 may compare the timestamp to a scheduled service time. The control panel 135 may validate that the timestamp is within a threshold limit of the scheduled service time. In some examples, the control panel 135 may perform image recognition on a captured image of the person 750. If a face is detected, processing the captured images may include determining an identity of the person 750. For instance, if the person 750 is there to perform the termite and pest control service, an insignia, symbol, or the like on the person's 750 clothing may be detected to identify the termite and pest control service. In some cases, the control panel 135 may receive a message from a device (e.g., remote computing device 140) carried by the person 750. The message may indicate that the person 750 has arrived at the smart room 255 to perform the termite and pest control service. The message may also include identification information with respect to an identity of the person 750 and the termite and pest control service.

In some cases, the control panel 135 may transmit a notification to a device (e.g., smartphone 605) of an individual associated with the smart room 255 indicating arrival of the person 750 or that the person 750 is adjacent to or in front of at least one of the access points 515 of the smart room 255. In some cases, the control panel 135 may coordinate and enable a one-way or two-way communication between the individual (e.g., homeowner) that may be remote from the smart room 255 and the person 750. For example, the one-way or two-way communication may be communicated from a doorbell camera integrated with a communication device to communicate with the person 750.

The control panel 135 may authorize access for the person 750. For example, the control panel 135 may disarm a security system and unlock at least one of the access points 515 for the person 750 to enter the smart room 255. The access may be specific to the smart room 255. For example, the security and automation environment 700 may be associated with a plurality of zones (e.g., smart rooms such as a kitchen, a living room, other bedrooms). Each zone may have a number of sensor units 510 that may be capable of detecting presence of a person. The control panel 135 may initiate an alarm if the person 750 is detected roaming around other zones outside of the smart room 255.

The control panel 135 may also track a duration of the person 750 within the smart room 255 and/or an activity level of the person 750 with respect to the scheduled service. The control panel 135 may generate and transmit a statement indicating a total duration of the service to the smartphone 605. In some cases, the control panel 135 may support and provide an option for an individual associated with the smart room 255 to view a captured image or a real-time video feed. In some cases, the control panel 135 may detect when the person 750 departs from the smart room 255, and notify, the individual of the departure. The control panel 135 may also rearm the security system (or zone) of the smart room 255 based on the departure of the person 750.

Figure 8:
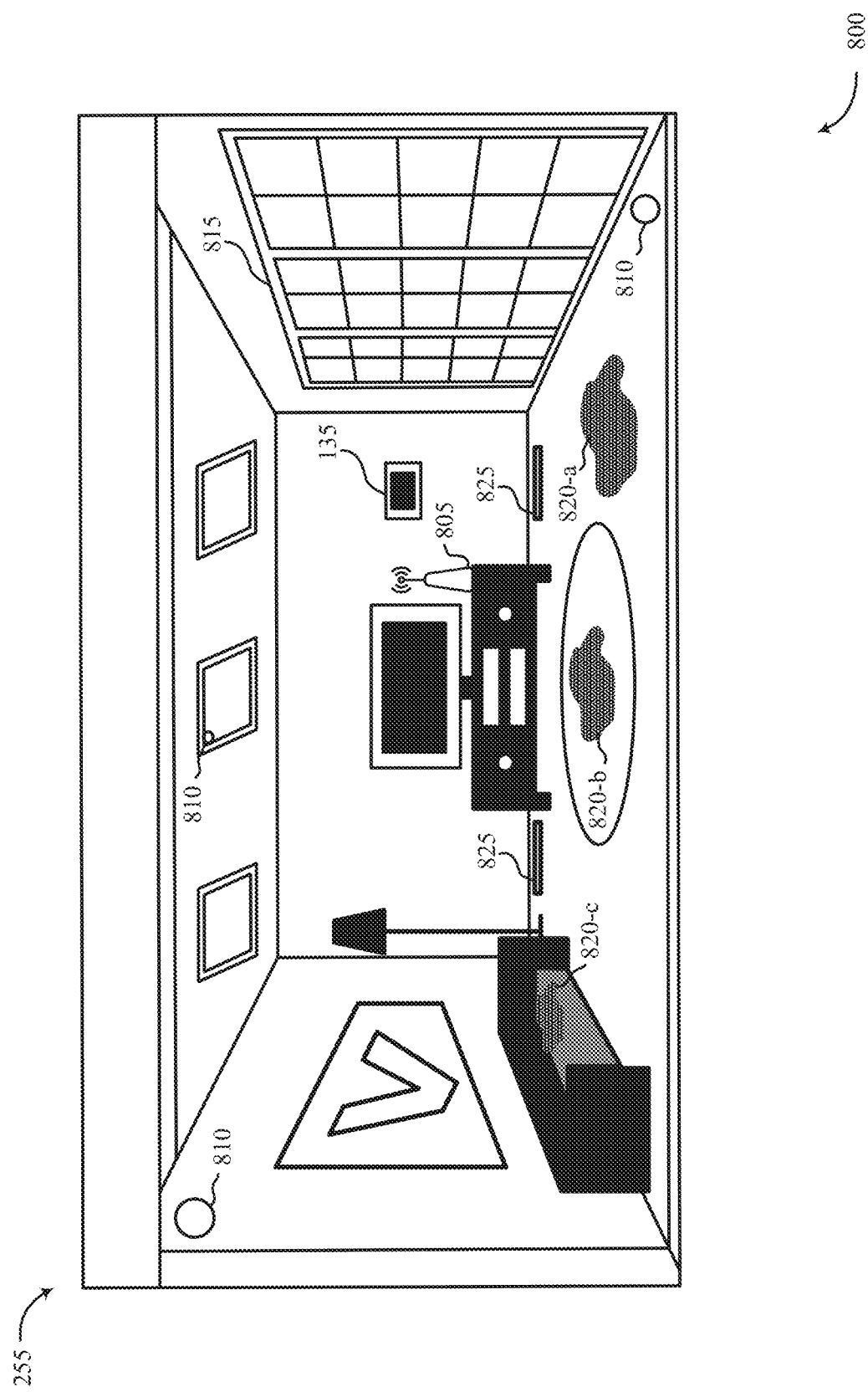
FIG. 8 illustrates an example diagram relating to an example security and automation environment in accordance with aspects of the present disclosure.

FIG. 8 illustrates an example diagram relating to an example security and automation environment 800 in accordance with aspects of the present disclosure. In some examples, the security and automation environment 800 may implement aspects of the system 100. In some examples, the security and automation environment 800 may implement aspects of the security and automation environment 200-*a*, 200-*b*, 400, 500, and 700. The security and automation environment 800 may include one or more sensor units 810 and one or more access points 815. For example, the access points 815 may include windows or doors of a smart room 255. The one or more sensor units 810 may be installed, mounted, or integrated with one or more of the access points 815, or alternatively with an interior and/or an exterior surface of the smart room 255.

The control panel 135 may be located within the smart room 255. The control panel 135 may receive data from the one or more sensor units 810 that may be installed and mounted with a surface of the smart room 255. The one or more sensor units 810 may be integrated with a home appliance or fixture such as a light bulb fixture. For example, a first sensor unit may be installed and mounted on a wall, a second sensor unit may be installed or mounted on a floor. Additionally or alternatively, a third sensor unit may be installed or integrated with a light fixture. In some examples, the control panel 135 may communicate and receive data periodically or continuously from the sensor units 810. The control panel 135 and the one or more sensor units 810 may communicate according to one or more RATs.

In some cases, the one or more sensor units 810 may monitor a cleanliness level of the smart room 255. To monitor the cleanliness level, the control panel 135 may in combination with the one or more sensor units 810 analyze sensor data to determine a change in the cleanliness level. For example, the control panel 135 may apply machine learning to determine a change in a cleanliness level of the smart room 255.

At least one sensor unit 810 may include a camera. The camera may capture images of the smart room 255 at an initial time. The captured images and initial time may be related to a period where the smart room 255 is considered to be at a normal cleanliness level. The normal cleanliness level may be assigned or selected by an individual. For example, the control panel 135 may display, at the control panel 135 or at a device of the individual, images of the smart room 255. The individual may select one or more captured images considered by the individual to be an indication of a clean room. The control panel 135 may receive the selection and assign the selected images as the training set for a machine learning technique. At a later time, the control panel 135 may receive captured images from the one or more sensor units 810. The control panel 135 may perform machine learning on the received captured images from the sensor units 810. For example, the control panel 135 may compare the received captured images to the training set, and determine a cleanliness level. In some examples, the control panel 135 may perform a correlation between the captured images and the training set to identify patches (e.g., zone, section, area) that may be indicative of uncleanliness. The control panel 135 may perform additional processing of the captured images to determine an identification of the patches. For example, the control panel 135 may perform image processing and recognition to identify that a first patch 820-*a* may include one or more shoes, a second patch 820-*b* may be a stain on a carpet, and that a third patch 820-*c* may be a batch of clothes laying on a couch.

In some cases, the control panel 135 may determine to perform a function based on the identified cleanliness level of the smart room 255. For example, the control panel 135 may identify one or more recommended options for an individual associated with the smart room 255. In an example, a recommended option may be one or more cleaning products, and a second option may be to schedule a housekeeping service to visit the smart room 255.

Figure 9A:
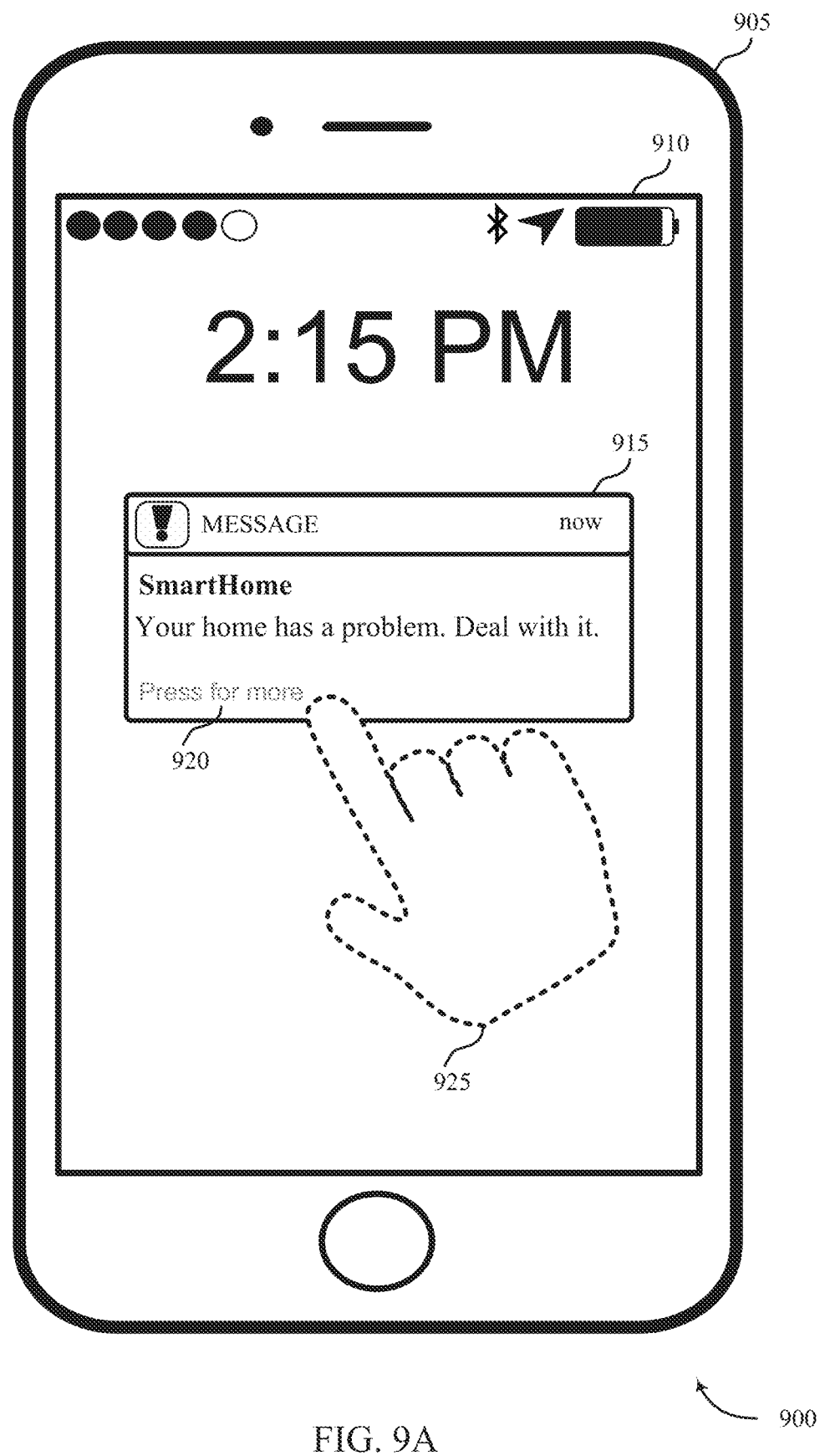
FIGS. 9A through 9C illustrates an example of a wireless device in accordance with aspects of the present disclosure.

FIG. 9A illustrates an example of a wireless device 900 in accordance with aspects of the present disclosure. The wireless device 900 may be a smartphone 905. The wireless device 900 may also be a control panel as described in FIGS. 1 and 2. The wireless device 900 may also implement aspects of the wireless device 300 or 600. The smartphone 905 may include a user interface 910. The user interface 910 may be a touch screen that may display one or more graphics, and recognize a touch from an individual, stylus, or the like. The smartphone 905 may receive and display the message received from the control panel 135 via dialogue window 915 on the user interface 910. For example, the message may provide an individual with a pre-generated message stating e.g., "Your home has a problem. Deal with it." The message may also provide additional information. To view the additional information, the individual may select the "Press for more" option 920 within the dialogue window 915.

Figure 9B:

FIG. 9B illustrates an example of a wireless device 900 in accordance with aspects of the present disclosure. The user interface 910 may change from a home screen and display one or more additional windows (e.g., dialogue windows or modal windows). In some cases, additional, different or fewer buttons may be provided, or different types of inputs may be provided on the user interface 910. For example, a tray 950 may display icons of frequently used applications. After the individual selects the option 920 to view additional information, the user interface 910 may display the additional information in a dialogue window 930. The additional information may include one or more options for the individual to respond to the notification. For example, a first option 935 may be a "Yes, please" decision, a second option 940 may be a "No, thanks" selection, and a third option 945 may be a "Cancel" choice, as described with reference to FIGS. 3B and 6B.

Figure 9C:
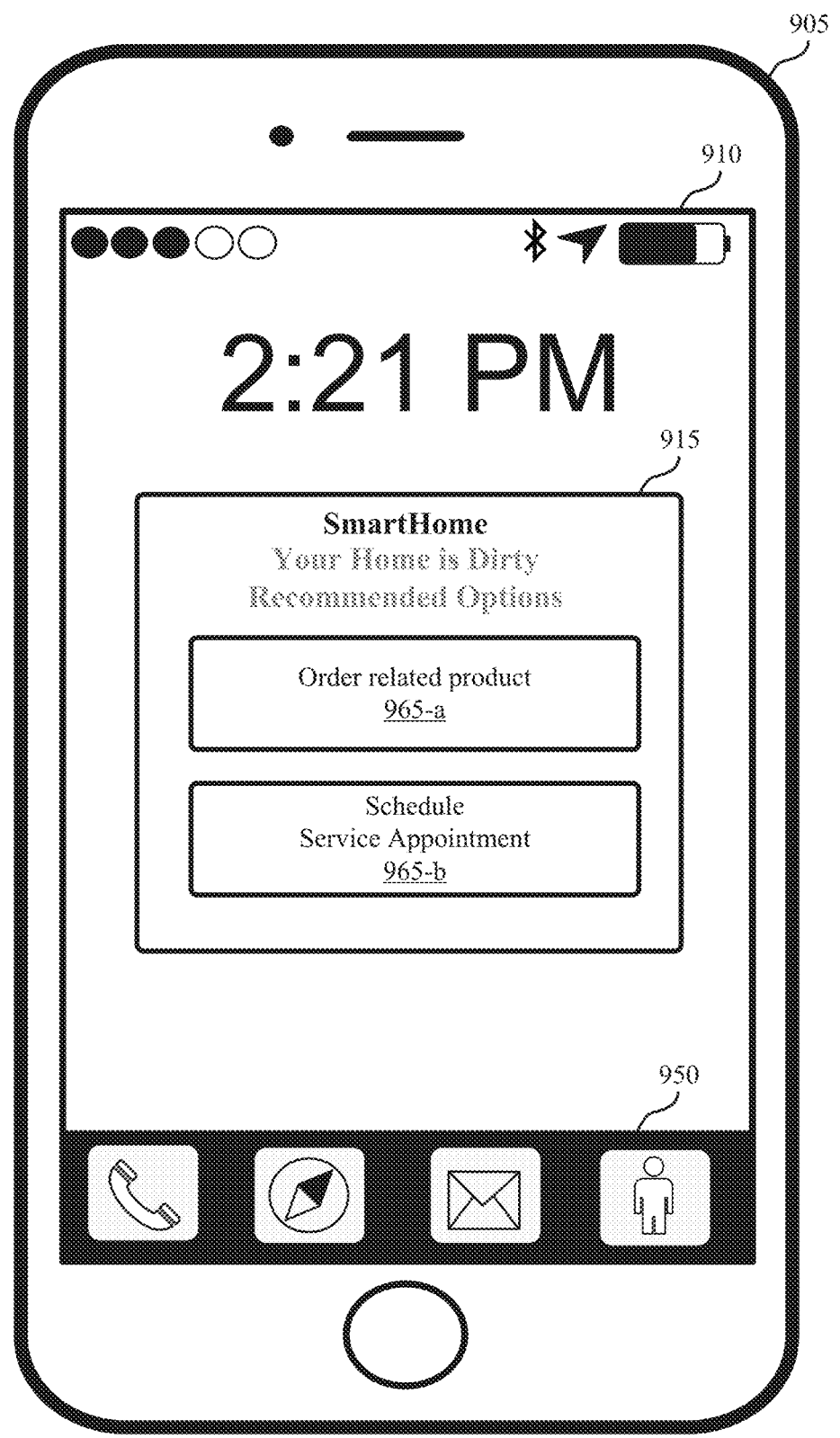

FIG. 9C illustrates an example of a wireless device 900 in accordance with aspects of the present disclosure. In some cases, the control panel 135 may determine a set of recommended options based on a learned preference or a pre-stored setting of the individual. For example, the control panel 135 may analyze historical data related to actions taken by the individual with respect to the detection of uncleanliness in the smart room 255. The dialogue window 915 may display one or more selectable options for the individual. A first option 955-*a* may include an option to order a related product and a second option 955-*b* may include an option to schedule a service appointment.

In some cases, the control panel 135 may receive information from one or more devices associated with an individual of a smart home. The information may include identification information of websites visited by the individual and purchases made by the individual. The control panel 135 in communication with a third-party server (e.g., the server 155, an E-commerce server) may provide information that may support identifying a product related to a cleaning product. For example, the control panel 135 may submit a query that may include search terms and criteria for the third-party server to use and limit a product search to a specific cleaning product brand and/or price. The control panel 135 may receive a list of products related to the provided search term(s) and criteria, and provide the list of products to the smartphone 905 for viewing by the individual.

In some cases, an individual may frequently order a specific product (e.g., a laundry detergent, clothing, toiletries, cleaning products, etc.), at least one sensor unit 810 could be placed in an area of the smart room 255 where the product is frequently used (e.g., near a kitchen, near a bathroom, near a bedroom). When the at least one sensor unit 810 detects that the product needs to be replaced or reordered (before the product is entirely gone) the at least one sensor unit 810 may transmit an order request to the control panel 135 to be processed (e.g., finalizing, processing, shipping). In some cases, the control panel 135 may process an order without additional input, from an individual. The control panel 135 may also select a default providing entity (e.g., consumer store), brand (name-brand vs. store brand), quantity, shipping information (e.g., cost, shipping entity, time to shipping, time to delivery, delivery requirements such as signature, packaging, some combination, other information, etc.), or other information.

In some cases, the control panel 135 may also suggest other products for ordering, e.g., products that may need to be replaced or reordered (either before or after the product is entirely gone) such as toiletries, cosmetics, shaving products, etc. For example, an individual may select and designate to always order a product from one retailer but order a different product (e.g., paper towels from another retailer). As another example, an individual may request to always order one category of items (e.g., food items) from one retailer but another category of items (e.g., clothing, toiletries) from another retailer. In some cases, the control panel 135 may receive user related information that may be based on a series of questions based on different options (providing specific retailers to choose from, most important factors such as price, shipping speed, quality, etc.), past order history (relating to the same, related, and/or different products), etc.

The control panel 135 may receive a selection of a product from the individual via the smartphone 905. After the control panel 135 receives the selection of the product, the control panel 135 may proceed to generate delivery and payment information and provide the information to a server related to the selected product. In some cases, prior to transmitting and submitting the delivery and payment information to server or website (e.g., E-commerce platform), the control panel 135 may request an approval from the individual via the smartphone 905. Once the control panel 135 receives approval from the individual, the control panel 135 may process the order by transmitting the order to the server. The control panel 135 may monitor a status of a shipping of the product, by receiving shipping information from the server. The status of the shipping may be provided by the control panel 135 to the smartphone 905 for viewing by the individual.

In some cases, the control panel 135 may identify a list of housekeeping services and transmit a message to the smartphone 905 for the individual to select a housekeeping service to service the smart room 255. To identify a housekeeping service, the control panel 135 may communicate with one or more third-party servers (e.g., the server 155, or a search engine server). The control panel 135 may communicate one or more search parameters to the third-party server. For example, the control panel 135 may provide a geolocation of a smart home, a search radius associated with the geolocation, a service category (i.e., housekeeping service), among others. In some cases, the third-party server may provide a list of identified housekeeping service based on the provided search parameters. The control panel 135 may provide the list to the smartphone 905 for viewing by the individual. The control panel 135 may receive a selection of a housekeeping service from the individual via the smartphone 905. The control panel 135 may proceed to schedule an appointment with the selected housekeeping service.

In some cases, the control panel 135 may also communicate with an appliance. An appliance may include a microwave oven, an HVAC, a washing machine, a dryer, a gas fireplace, a refrigerator, a vacuum cleaner, an electric water heater tank. These appliances may also be smart appliances that may communicate with the control panel 135 or a device (e.g., the local computing devices 115, 120 or the remote computing device 140) associated with an individual (e.g., a smartphone, laptop, TV).

In some examples, the control panel 135 may communicate with a washer and a dryer to receive laundry-related information. For example, a washer and dryer may transmit laundry-related information to the control panel 135. The control panel 135 may identify a timing information indicating when the individual associated with the smart room 255 did laundry last. The control panel 135 may use this information in addition to the identified mound of clothes laying on the couch to suggest to the individual to perform laundry. In some cases, the control panel 135 may recommend as part of the housekeeping service to request a laundry service.

In some examples, an individual may be unable of performing a laundry service because the washer or the dryer may require maintenance. In some cases, the control panel 135 may receive a message, from the individual associated with the smart room 255, indicating that the washer or the dryer requires attention. Alternatively, the control panel 135 may also receive diagnostic information directly from the washer and the dryer. The diagnostic information may include a make and model of the washer and the dryer, warranty coverage information, repair and support information, vendor information, an energy consumption and cost report of operating the dryer and the washer or any combination thereof. The dryer and the washer may also provide the diagnostic information directly to the device associated with the individual. In some cases, the control panel 135, the local computing devices 115, 120, or the remote computing device 140 may establish a connection with the dryer and the washer. Based on the connection, the control panel 135, the local computing devices 115, 120, or the remote computing device 140 may receive the diagnostic information directly from the washer and the dryer.

The control panel 135 may determine to schedule a maintenance service based on the received diagnostic information. For example, the control panel 135 may use the repair and support information, or the vendor information to schedule a maintenance service or submit an order for replacing the dryer or the washer based on the warranty coverage information. In some cases, the control panel 135 as part of scheduling the maintenance service, may identify a vendor and provide the warranty coverage information to the vendor. The control panel 135 may prior to contacting the vendor associated with the dryer and the washer, communicate the diagnostic information to the individual. For example, the control panel 135 may provide the diagnostic information for viewing on a device (e.g., smartphone, laptop, TV) associated with the individual.

In some cases, the control panel 135 may receive sensor data associated with an HVAC system. For example, the control panel 135 may receive sensor data indicating an HVAC filter status associated with at least one of the HVAC registers 825. The HVAC filter status may indicate that an HVAC filter may require replacement. The HVAC filter may be a disposable air filter that may be conventionally employed with at least one of the HVAC registers 825. In some cases, however, after a period of use, an HVAC filter may become dirty or blocked and may need to be replaced. By employing the control panel 135 to monitor and manage proper filter maintenance, an HVAC system associated with the security and automation environment 800 may continue to operate at maximum efficiency and reduce operating costs.

In some cases, at least one sensor unit 810 may be an airflow sensor that may be installed on a surface of at least one of the HVAC registers 825. The air flow sensor may monitor a level of airflow dispensing from at least one of the HVAC registers 825 when the HVAC system is operating (i.e., turned ON). The control panel 135 may receive sensor data from the airflow sensor. In some cases, the control panel 135 may determine that an HVAC filter may require replacement based on the received sensor data. For example, the sensor data may indicate an airflow level that may be below a threshold value.

In some examples, the control panel 135 may predict a future condition of an HVAC filter or one or more other components of the HVAC system. For example, the control panel 135 may predict a lifespan of an HVAC filter associated with at least one of the HVAC registers 825 based on one or more parameters (e.g., usage model of the HVAC system). The one or more parameters may include a current airflow level associated with an HVAC register, an average runtime value of the HVAC system, and a frequency of operation (e.g., a number of times a day, week, or a month) associated with the HVAC system, or a power signature of the HVAC system, or any combination thereof. The control panel 135 may apply machine learning techniques to predict the future condition of the HVAC filter using current sensor data, a training set of sensor data, and historical sensor data associated with a HVAC filter and at least one of the HVAC registers 825, and the one or more parameters.

In some cases, the control panel 135 may receive sensor data related to a plumbing system. For example, the control panel 135 may receive sensor data from a sensor unit indicating a status associated with a plumbing fixture. The status may indicate a reduced water flow or water pressure associated with the plumbing fixture. The status may also indicate that the plumbing fixture may require maintenance e.g., based on the reduced flow or pressure. A plumbing fixture may include a bathtub, a channel drain, a kitchen sink, a shower, a faucet, a water closet, among others.

In some cases, a sensor unit may be a water flow sensor, a pressure sensor, a pipe temperature sensor, an acoustic sensor, an ultrasonic flowmeter sensor that may installed, mounted, or integrated with a surface of a plumbing fixture or a component of the plumbing fixture (e.g., a valve, a pipe). For example, a water flow sensor may be integrated with a valve to monitor a flow of water. The control panel 135 may receive sensor data from the water flow sensor. In some cases, the control panel 135 may determine that a plumbing fixture or a component of it may require replacement based on the received sensor data. For example, the sensor data may indicate a water flow level that may be below a threshold value.

In some examples, a sensor unit may be a water softener sensor. The water softener sensor may monitor a calcium and magnesium level and/or water flow level of a plumbing component (e.g., faucet, valve, spout). The water softener sensor may record, track, and provide information to the control panel 135 relating to the calcium and magnesium level and/or the water flow level of the plumbing component. The water softener sensor may determine when the plumbing component has increased calcium and magnesium levels and/or reduced water flow, or detect a leak or other problem. Alternatively, the water softener sensor may determine that the plumbing component may need to be replaced or replenished. For example, the water softener sensor may determine that the plumbing component needs to be serviced (e.g., replenished by applying water softening chemicals) based on the increased calcium and magnesium levels and/or reduced water flow. Alternatively, in some cases, the water softener sensor may determine that the plumbing component may need to be replaced.

The control panel 135 may receive the information from the water softener sensor. In this example, the control panel 135 may determine the plumbing component may need to be replaced based on the received information. In some examples, the information may include a unique identifier associated with the water softener sensor that may correlate the water softener sensor with a particular plumbing component in a smart home. The control panel 135 may parse and retrieve additional information (e.g., plumbing component specification) associated with the plumbing component from a database (e.g., local memory or remote memory); or in some cases from the Internet. Upon determining that the plumbing component requires a replacement, the control panel 135 may generate and transmit a message to an appropriate individual (e.g., homeowner) or a third-party enterprise. In some examples, the message may include a description indicating that the plumbing component may need to be replaced. In some cases, the message may also include ordering information, vendor information, address information, etc.

In some examples, the control panel 135 may predict a future condition of a plumbing fixture or a component of it. For example, the control panel 135 may predict a lifespan of a shower nozzle associated with a shower based on one or more parameters (e.g., usage model of the shower nozzle). The one or more parameters may include a current water flow level associated with the shower nozzle, an average runtime value of the shower, and a frequency of operation (e.g., a number of times a day, week, or a month) associated with the shower, or a water signature of the shower, or any combination thereof. The control panel 135 may apply machine learning techniques to predict the future condition of the shower nozzle using current sensor data, a training set of sensor data, and historical sensor data associated with the shower nozzle and the one or more of the parameters.

In some cases, the control panel 135 may provide a suggested product (e.g., water softening product, an HVAC filter) for ordering. The control panel 135 in communication with a third-party server (e.g., the server 155) may provide information that may support identifying a product related to HVAC systems or plumbing systems. For example, the control panel 135 may submit a query that may include search terms for the third-party server to use and limit a product search to a specific water softening or HVAC product brand and/or price. The control panel 135 may receive a list of products related to the provided search term(s) and criteria, and provide the list of products to the smartphone 905 for viewing by the individual.

The control panel 135 may also communicate and perform one or more functions with the third-party enterprise. In this case, the third-party enterprise may be a vendor or a plumbing service, or an HVAC service. As such, the control panel 135 may provide ordering information to the vendor or the plumbing service, or an HVAC service. That is, the control panel 135 may automatically order a new plumbing component to be delivered to the smart home using the ordering information. Alternatively, the control panel 135 may delay communication, until receiving feedback from the individual, with the third-party enterprise. In some cases, the control panel 135 may track a pending status of the replacement of the plumbing component, and provide notification, when the status is determined to be completed. In some examples, the control panel 135 may add the plumbing component or a resource (e.g., water softening chemicals) associated with the plumbing component on a shopping list via an application running on a device of the individual. As such, the individual may be reminded to purchase water softening chemicals later, for example, when visiting a business (e.g., a home goods store).

In some cases, the control panel 135 may receive a selection of a product from the individual via the smartphone 905. After the control panel 135 receives the selection of the product, the control panel 135 may proceed to generate delivery and payment information and provide the information to the third-party server related to the selected product. In some cases, prior to transmitting and submitting the delivery and payment information to the third-party server, the control panel 135 may provide an approval/authorization message to the individual via the smartphone 905. Once the control panel 135 receives approval from the individual, the control panel 135 may process the order by transmitting the order to the third-party server. The control panel 135 may monitor a status of a shipping of the product, by receiving shipping information from the third-party server. The status of the shipping may be provided by the control panel 135 to the smartphone 905 for viewing by the individual In some cases, the control panel 135 may identify a maintenance service and transmit a message to the individual to select a maintenance service to service an appliance (e.g., the washer and the dryer). To identify a maintenance service, the control panel 135 may communicate with one or more third-party servers (e.g., the server 155, or a search engine server). The control panel 135 may communicate one or more search parameters to the third-party server. In some cases, the third-party server may provide a list of identified maintenance services based on the provided search parameters. The control panel 135 may provide the list to the individual. The identified maintenance services may be associated with a vendor or a contractor. For example, in some cases, the control panel 135 may communicate to a third-party server a query with a list of variables to identify one or more contractors that may perform the maintenance service. For instance, an individual may desire to have an appliance serviced at a lower price compared to a price that a supplier of the appliance may charge. The list of variables may include diagnostic information associated with the appliance of the requested maintenance, timing of the requested maintenance, a location of the requested maintenance, a difficulty level of the requested maintenance, among others. The control panel 135 may receive from the third-party server (e.g., the server 155) a list of contractors including contractor information (e.g., review, biography, credentials) and price quotes of each contractor. Although, the above description is with regards to a maintenance service, the same may apply for identifying a housekeep service.

The control panel 135 may receive a selection of a maintenance service from the individual via the device of the individual or directly via the control panel 135. Once the control panel 135 receives a selection of the maintenance service or in the case the control panel 135 has a learned preference or a pre-stored setting identifying a maintenance service, the control panel 135 may generate a message and transmit it to the maintenance service. In some examples, the message may include a request to schedule a personnel to visit the smart room 255 to provide a maintenance service during a specified data and time. The schedule may be based on a schedule of the individual associated with the smart room 255.

In some cases, the control panel 135 may refrain from transmitting the message until receiving authorization from the individual. In some cases, scheduling the maintenance service may include providing payment information. The control panel 135 may be configured with one or more payments options. As such, transmitting the message to the individual for authorization may include requesting the individual to authorize payment and scheduling of the maintenance service. The control panel 135 may also provide the payment information in the message transmitted to the maintenance service.

The control panel 135 may receive a reply message from the maintenance service confirming the request. In some cases, the control panel 135 may transmit a notification notifying the individual of the scheduled maintenance service. In some cases, the control panel 135 may track a pending status of the scheduled maintenance service and provide notification to the individual when the status is determined to be completed.

The control panel 135 may also monitor a status of a network access point 805. Monitoring the status may include receiving operating characteristics and power consumption from the network access point 805. In some examples, an operating characteristic may include a signal strength indicator for wireless communication, a failure indicator, a maintenance indicator, among others. In some cases, the control panel 135 may receive diagnostic information including the operating characteristic from the network access point 805. The control panel 135 may use the diagnostic information to perform a function. For example, the control panel 135 may determine to transmit a diagnostic report to a service provider (e.g., a network operator) associated with the network access point 805. In some cases, the control panel 135 may transmit a message including the diagnostic report to a device associated with an individual of the smart room 255.

In some cases, the network access point 805 may be associated with a network sensor that may include an Internet sensor or a home Wi-Fi sensor. The Internet sensor may determine a connection status to the Internet. The home Wi-Fi sensor may determine a quality of service (QoS) of a Wi-Fi network. In some cases, the network sensor may be a combination of the Internet sensor and the home Wi-Fi sensor. As such, the network sensor may determine a QoS based on a connection to the Internet via the Wi-Fi network. The network sensor may record, track, and provide information associated with sensor data of the network sensor to the control panel 135.

The control panel 135 may use the information provided from the network sensor to modify, update, or replace a network component associated with the network sensor. For example, the network component may be a home router. In this case, the control panel 135 may determine that a network connection (e.g., Wi-Fi network) is below a QoS threshold value based on the provided information. As such, the control panel 135 may notify an individual (e.g., homeowner) or a third-party enterprise (e.g., network operator) of the QoS threshold value not being satisfied. The control panel 135 may schedule an internet-provider service based on the diagnostic information. For example, the control panel 135 may use one or more techniques described herein to schedule the internet-provider service.

Figure 10:
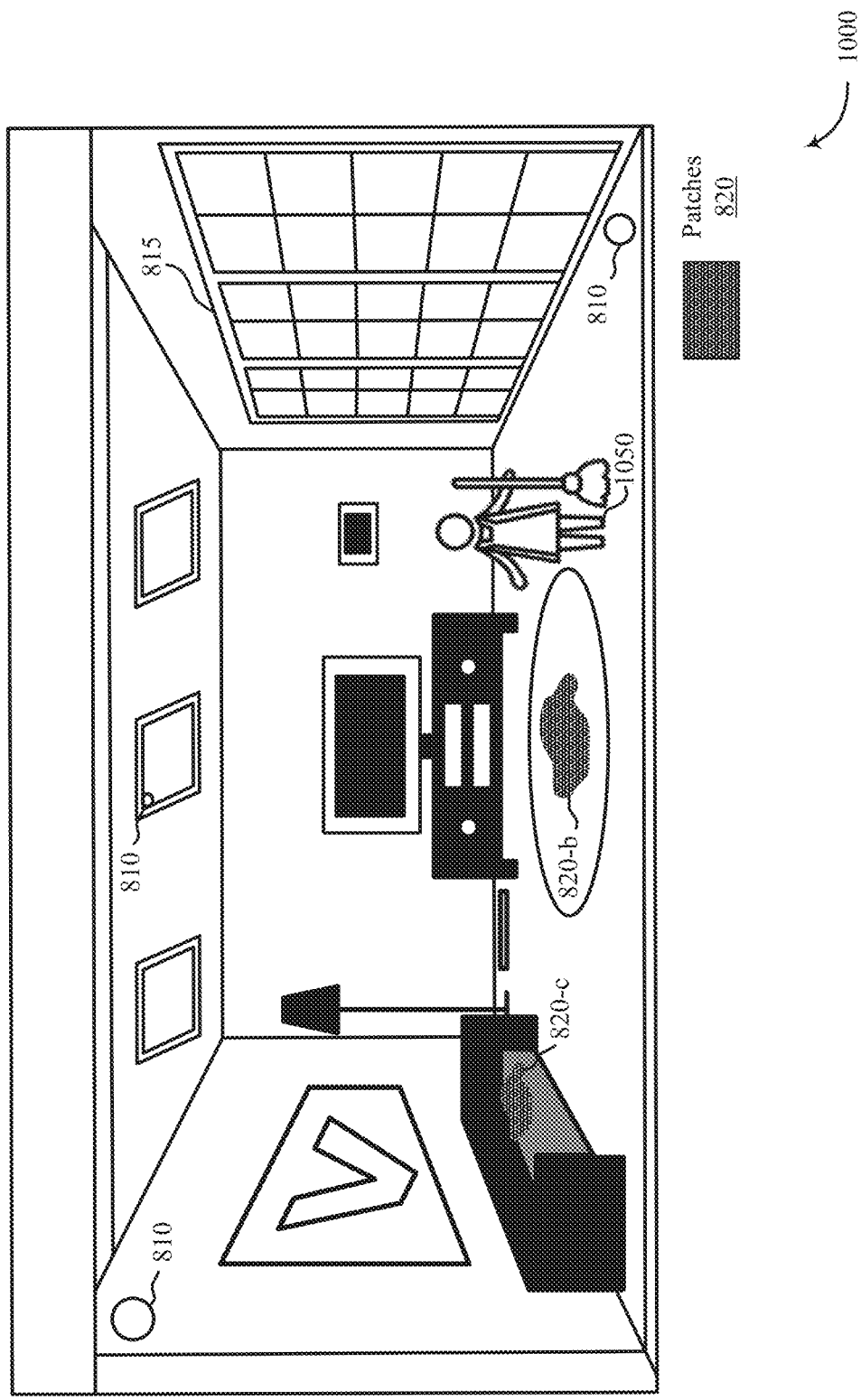
FIG. 10 illustrates an example diagram relating to an example security and automation environment in accordance with aspects of the present disclosure.

FIG. 10 illustrates an example diagram relating to an example security and automation environment 1000 in accordance with aspects of the present disclosure. In some examples, the security and automation environment 1000 may implement aspects of the security and automation environment 800. The security and automation environment 1000 may include one or more sensor units 810 as described with reference to FIG. 8. The security and automation environment 1000 may provide admission to person 1050 to access the smart room 255. In some examples, security and automation environment 1000 may include a doorbell camera. The doorbell camera may be installed, mounted, or integrated near or at access point of the smart room 255. In some examples, one or more sensor units 810 in conjunction with the doorbell camera may detect that the person 1050 is located within a distance threshold to an entry access point of the smart room 255 based on received sensor data. The sensor data may include sensed motion at or near the entry to the smart room 255, sensed sound at or near the entry to the smart room 255, sensed activation of a doorbell at or near the entry to the smart room 255.

In some cases, the person 1050 may knock or ring a doorbell of entry access point to smart room 255. The doorbell camera in communication with the control panel 135 may identify a suggested security action. The suggested security action may include establishing a communication session between a remote device (e.g., the smartphone 905) and a communication device associated with the doorbell camera at or near the entry of the smart room 255. Additionally or alternatively, the suggested action may include transmitting instructions for turning a light on or off at the smart room 255 or locking or unlocking an access point (e.g., entry access point) to the smart room 255, or turning an alarm on or off to the smart room 255.

In some cases, the control panel 135 may use schedule information regarding a service personnel scheduled to service the smart room 255 may determine that the person 1050 is a housekeeper personnel. In some cases, the control panel 135 may receive sensor data (e.g., captured images, video, motion, sound) and perform post-processing on the sensor data. The control panel 135 may identify a timestamp (e.g., time and date) associated with the sensor data indicating the detection of the person 1050. The control panel 135 may compare the timestamp to a scheduled service time. The control panel 135 may validate that the timestamp is within a threshold limit of the scheduled service time.

In some examples, the control panel 135 may perform image recognition (e.g., facial recognition) on a captured image of the person 1050. If a face is detected, processing the captured images may include determining an identity of the person 1050. For instance, if the person 1050 is there to perform the housekeeping service, an insignia, symbol, or the like on the person's 1050 clothing may be detected to identify the housekeeping service. In some cases, the control panel 135 may receive a message from a device carried by the person 1050. The message may indicate that the person has arrived at the smart room 255 to perform the housekeeping service.

In some cases, the control panel 135 may transmit a notification to a device of an individual associated with the smart room 255 indicating arrival of the person 1050 or that the person 1050 is at an entry of the smart room 255. In some cases, the control panel 135 may coordinate and enable a one-way or two-way communication between the individual (e.g., homeowner) that may be remote from the smart room 255 and the person 1050. For example, the one-way or two-way communication may be communicated from a doorbell camera integrated with a communication device to communicate with the person 1050.

The control panel 135 may authorize access for the person 1050. For example, the control panel 135 may disarm a security system and unlock an access point for the person 1050 to enter the smart room 255. The access may be specific to the smart room 255. For example, the security and automation environment 1000 may be associated with a plurality of zones (e.g., smart rooms such as a kitchen, a living room, other bedrooms). Each zone may have a number of sensor units 810 that may detect presence of a person. The control panel 135 may initiate an alarm if the person 1050 is detected roaming around other zones outside of the smart room 255. The control panel 135 may also track a duration of the person 1050 being present within the smart room 255 and/or an activity level of the person 1050 with respect to the scheduled service. The control panel 135 may generate a report indicating a total duration of the service and transmit the report to the smartphone 905. In some cases, the control panel 135 may detect when the person 1050 departs from the smart room 255, and notify the individual of the departure. The control panel 135 may also rearm the security system (or zone) of the smart room 255 based on the departure of the person 750.

Figure 11:
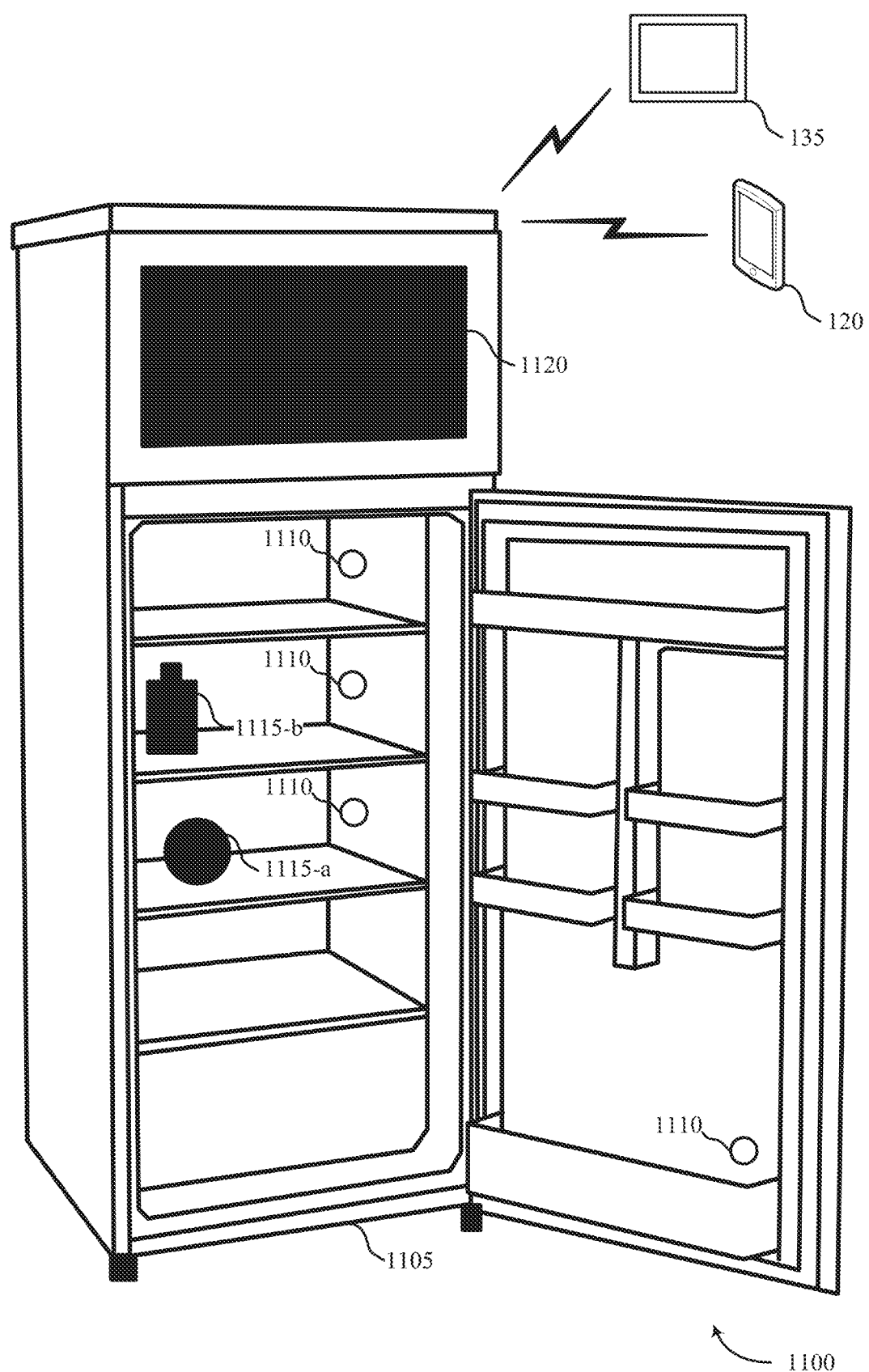
FIG. 11 illustrates an example diagram relating to an example security and automation environment in accordance with aspects of the present disclosure.

FIG. 11 illustrates an example diagram relating to an example security and automation environment 1100 in accordance with aspects of the present disclosure. The security and automation environment 1100 may include an appliance 1105. The appliance 1105 may be a smart appliance. For example, appliance 1105 may be a smart refrigerator. The appliance 1105 may be integrated with a receiver for receiving information such as packets, user data, or control information associated with various information channels (e.g., control channels, data channels, and information related to smart sensing techniques, etc.), and a transmitter for transmitting information associated with consumables stored within the appliance 1105. For example, the appliance 1105 may communicate with the control panel 135 or the local computing device 120. The appliance 1105 may have one or more sensor units 1110 installed, mounted, or integrated within the appliance 1105.

At least one of the sensor units 1110 may be a sensor that may monitor a consumable item 1115. In some cases, monitoring the consumable item 1115 may include identifying the consumable item. The at least one of the sensor units 1110 may be a camera. The camera may capture an image of the consumable item e.g., 1115-$a$ and 1115-$b$. The camera may transmit the captured image of the consumable item to the control panel 135. The control panel 135 may receive the captured image and perform image processing to identify that the consumable item 1115-$a$ is e.g., a watermelon, and that the consumable item 1115-$b$ is a milk carton.

The control panel 135-*a* may also determine an amount of the consumable item 1115-*a* and 1115-*b*.

In some cases, the control panel 135 may apply machine learning techniques to predict a future condition of a consumable item (e.g., when the a consumable item will be completely consumed). In some cases, the machine learning technique may include identifying a consumption rate of the consumable item based on a consumption model of the consumable item. The control panel 135 may automatically request a purchase order with a third-party enterprise to restock and deliver the consumable item.

The control panel 135 may use the prediction and additional information (e.g., a consumption rate, occurrences of the consumable item being replenished by an individual of the smart home) perform a function. The function may include providing an order request to a service (e.g., E-commerce platform) for the consumable item 1115 to be replenished and delivered. The control panel may alternatively seek permission from an individual prior to providing the order request. In some examples, the control panel 135 may seek the permission based on order parameters such as price of an item, quantity of the item, shipping cost associated with the item, etc. The control panel 135 may transmit a notification to the individual's personal device (e.g., smartphone) or adding the consumable item to a shopping list via an application programmed and running on the personal device.

Figure 12:
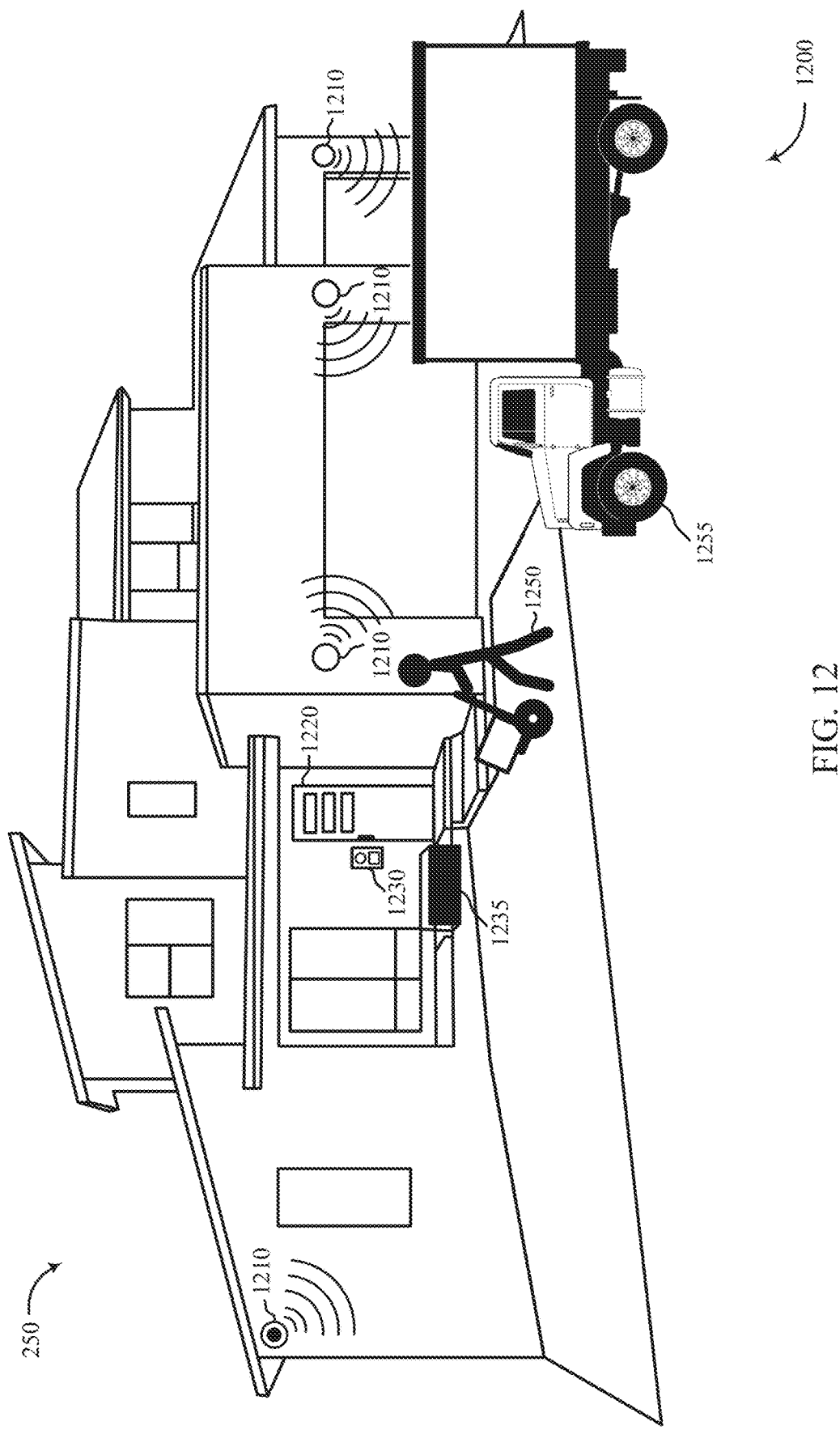
FIG. 12 illustrates an example diagram relating to an example security and automation environment in accordance with aspects of the present disclosure.

In some cases, the control panel 135 may generate a message indicating the one or more consumables items 1115 to an individual. For example, the control panel 135 may notify a third-party enterprise or the individual via the local computing device 120. In this case, the third-party enterprise may be a vendor such as a grocery store. The vendor may schedule with the control panel 135 to deliver or have delivered the consumables items 1115. The control panel 135 may provide and support a secure delivery of a consumable item to a smart home. In some cases, the control panel 135 may indicate in a message, transmitted to the vendor, a location of the smart home to deliver the required consumables items. Similar applications may apply to household items such as cosmetics, laundry detergent, pet supplies, paper products, prescription medication, and other homecare supplies FIG. 12 illustrates an example diagram relating to an example security and automation environment 1200 in accordance with aspects of the present disclosure. The security and automation environment 1200 may include one or more sensor units 1210 and an access point 1220. Security and automation environment 1200 may, additionally or alternatively, support delivery of packages, consumable items, products, and services, to the smart home 250. Access point 1220 may include an entrance door to the smart home 250. Additionally, access points of security and automation environment 1200 may include one or more garage doors of the smart home 250. In some cases, the one or more sensor units 1210 may be installed, mounted, or integrated with the access point 1220, or alternatively with an interior or exterior surface of the smart home 250.

In some cases, the control panel 135 may or an individual associated with the smart home 250 may select to generate a custom access code for a delivery personnel. The custom access code may include a random access code, a preconfigured access code, and a delayed access code, or any combination thereof. The control panel 135 or the individual may also select a delivery area at the smart home 250 where a package (e.g., product-related) is to be delivered. For example, the control panel 135 or the individual may choose a garage as the designated location at the smart home 250. Accordingly, the provided access code may enable a delivery person to access the garage of the smart home 250.

In some cases, the control panel 135 or the individual may choose just inside a front door at the smart home 250. Accordingly, the provided access code may enable a delivery person to access inside the front door of the smart home 250. Additionally or alternatively, the control panel 135 or the individual may select a delivery time for a package during ordering of a product. For example, a delivery time may be a window of time such as a two hour window between 1:00 PM and 3:00 PM on Saturday, Nov. 11, 2017.

In some examples, smart home 250 may include a doorbell camera 1230. The doorbell camera 1230 may be installed, mounted, or integrated near or at access point 1220. The doorbell camera 1230 may receive information regarding a delivery of a package to the smart home 250. The information received may include a delivery company name, delivery person information (e.g., delivery person name, photo ID, work ID, etc.), a unique code (e.g., barcode, QR code, etc.), a unique code associated with the delivery person, scheduled date of delivery, an expected time of delivery (e.g., a window of time), tracking number, number of packages, weight of each package, dimensions of each package, etc.

In some cases, doorbell camera 1230 may be granted access to a personal account associated with a delivery company. Thus, in some cases, the doorbell camera 1230 in communication with control panel 135 may query delivery information by accessing the personal account, from which control panel 135 or the doorbell camera 1230 may receive notifications of expected deliveries, real-time updates to the delivery information, real-time notices of a delivery person's arrival to the smart home 250, or a combination thereof. In some cases, the doorbell camera 1230 may generate a notification based on the received information regarding a delivery of a package to the smart home 250.

The doorbell camera 1230 may also provide instructions to a delivery person based on a preconfigured setting. For example, an individual associated with the smart home 250 may provide authorization to delivery personnel to drop off packages within a particular zone (e.g., package delivery zone 1235, or designated area in a garage of the smart home 250). The package delivery zone 1235 may be outside or inside the smart home 250. In some cases, the doorbell camera 1230 in communication with one or more sensor units 1210 may detect a delivery person 1250. In some cases, the doorbell camera 1230 in communication with one or more sensor units 1210 may determine a location of a delivery vehicle 1255.

The location of the delivery vehicle 1255 may be determined by a location device on the delivery vehicle 1255 such as a GPS. Additionally or alternatively, the delivery person 1250 may provide information regarding his or her location (e.g., present delivery location, next delivery location). In some examples, based on geo-location, a state of a lock component associated with the access point 1220 may change when the delivery person 1250 is within a particular range.

In some examples, the doorbell camera 1230 in conjunction with control panel 135 may receive information indicating that the delivery vehicle 1255 is at and/or within a predefined distance of the smart home 250. The doorbell camera 1230 may receive sensor data from one or more sensor units 1210 located outside of the smart home 250 that may be configured to recognize the delivery vehicle 1255, a delivery uniform, a delivery company logo, etc. Thus, in some cases, upon receiving information indicating the delivery vehicle 1255 is at or near the smart home 250, the doorbell camera 1230 may scan captured images to detect the delivery vehicle 1255 and/or the delivery person 1250.

The delivery person 1250 may receive instructions at a wireless device via the control panel 135 or the doorbell camera 1230 to drop of a package in package delivery zone 1235. In this example, the package delivery zone 1235 may be an area near the entrance—i.e., access point 1220. In some cases, package delivery zone 1235 may include a secured storage component with a digital or mechanical lock for delivery person 1250 to drop off the package within the secured storage component. In some cases, the delivery person 1250 may be provided a security code for unlocking the secured storage component via the doorbell camera 1230 based at a time that the delivery person 1250 is detected and identified by the doorbell camera 1230. One or more sensor units 1210 may detect the delivery person 1250 near or at access point 1220. The one or more sensor units 1210 may capture sensor data such as, but not limited to, an image, record a video, capture audio data, monitor motion, etc., associated with the delivery person 1250. The doorbell camera 1230 may determine an identity of the delivery person 1250.

In some examples, the doorbell camera 1230 may identify a presence of a package carried by the delivery person 1250 based on performing an analysis of captured image, video, or both associated with the delivery person 1250. The doorbell camera 1230 may broadcast instructions to the delivery person 1250 to deliver the package to a designated location (i.e., 1235) at or near the entry to the smart home 250. The instructions may be pre-recorded, custom text, or both. Custom text may include pre-packaged text that is broadcasted (e.g., played) via the doorbell camera 1230. Pre-packaged text may be associated with one or more individuals of the smart home 250 pre-recording response messages. In some examples, the doorbell camera 1230 may broadcast a message notifying the delivery person 1250 that he or she is being recorded based on identifying the presence of the package carried by the delivery person 1250.

In some cases, the delivery person 1250 may ring a doorbell and/or knock on the door (e.g., access point 1220) of the smart home 250 and/or trigger a motion detector. Upon detecting the delivery person 1250 at the door, the doorbell camera 1230 may capture a photo and/or video image of the delivery person 1250. The doorbell camera 1230 may compare the captured image to an image of the delivery person 1250 provided by a delivery company (e.g., a photo ID of the delivery person). In some cases, an automated system (e.g., a prerecorded message, a voice simulated message, etc.) of the doorbell camera 1230 may request that the delivery person 1250 stare into a camera in order to capture an image with a similar viewpoint as that of an image of the delivery person 1250 provided by the delivery company.

Additionally, or alternatively, the delivery person 1250 may be instructed to place an identification card in relation to a camera of the doorbell camera 1230. The identification card may include a photo ID of the delivery person 1250, a name of the delivery person 1250, a company name, a company logo, a unique code (e.g., barcode, QR code, etc.), short-range communication capabilities (e.g., radio frequency ID (RFID), near-field communication (NFC), etc.), and the like. Upon receiving data from and/or capturing an image of the identification card, the doorbell camera 1230 may use any combination of the captured information (e.g., photo ID, name, barcode, RFID, etc.) to verify the identity of the delivery person 1250. In some cases, such as when the delivery person 1250 arrives outside an expected period of time, additional verification may be requested.

In some examples, before granting the delivery person 1250 access to a delivery area (i.e., package delivery zone 1235), the doorbell camera 1230 may request the delivery company verify the location of the delivery person 1250, via communication with the control panel 135. For example, control panel 135 may query a server of the delivery company to determine the current location of the delivery vehicle 1255 associated with the expected delivery. Additionally, or alternatively, before granting the delivery person 1250 access to a delivery area (i.e., package delivery zone 1235), the control panel 135 may request that a person associated with the smart home 250 approve granting the delivery person 1250 access to the delivery location (i.e., package delivery zone 1235). For example, the individual may receive a real-time notification regarding the arrival of the delivery person 1250 to the smart home 250.

The individual may receive a live audio and/or photo and/or video image feed of the delivery in progress. In some cases, the individual may be enabled to communicate with the delivery person 1250 in real-time between the individual's mobile device (e.g., local computing device 120) and communication component in communication with the doorbell camera 1230, via a network. In some examples, the doorbell camera 1230 may request that the delivery person 1250 input information associated with the package such as a tracking number and/or an employee identification code. In some cases, the doorbell camera 1230 may determine that the information is sent and/or received by a computing machine owned by the delivery company. For example, the control panel 135 may determine that the information entered by the delivery person 1250 is verified and registered by a secure server owned by the delivery company. Upon verifying that the information is entered and verified by the delivery company, temporary access to the package delivery zone 1235 may be granted.

In some examples, the control panel 135 may also transmit a temporary access code to a device associated with the delivery person 1250. For example, upon detecting the arrival and/or verifying the identity of the delivery person 1250, the control panel 135 may transmit a temporary access code to a device of the delivery person 1250 (e.g., smart phone, computing device, near-field communication device). The temporary access code may include a temporary electronic key configured to unlock an access point, a temporary frequency code configured to open an access point wirelessly, or a temporary keypad code configured to open an access point via a keypad outside the access point.

In some cases, the doorbell camera 1230 may scan a barcode on a package. In some examples, the doorbell camera 1230 may capture an image of barcode on a package. The doorbell camera 1230 in communication with the control panel 135 may then evaluate the captured image of the barcode to determine whether the package is expected. If the doorbell camera 1230 in communication with the control panel 135 determines that the barcode is associated with an expected package and/or delivery period, the doorbell camera 1230 may broadcast instructions to the delivery person 1250. The instructions may include a message for example an audio message, a video message, or both instructing the delivery person 1250.

In some examples, the doorbell camera 1230 may manage a delivery of a package once the arrival of an expected delivery is verified (e.g., verifying delivery information, identity of delivery person). In some cases, the doorbell camera 1230 may provide instructions to the delivery person 1250 regarding where to place a package. The instructions may be provided to the delivery person 1250 upon detecting the delivery person 1250 arriving at the smart home 250. For example, the delivery person 1250 may knock on the access point 1220, for example, knock or ring a doorbell. Upon detecting the delivery person 1250 at the door, a communication device (e.g., a speaker at the door that is part of the doorbell camera 1230) may provide instructions to the delivery person 1250.

The instructions may include pre-recorded messages, digital text-to-speech messages, etc. For example, the doorbell camera 1230 may transmit a recorded message to delivery person 1250. The recorded message may include instructions how and where to deliver the package. In some examples, the doorbell camera 1230 may provide instructions to the delivery person 1250 via a data communication. For example, the delivery person 1250 may receive an email, a text message, etc. In some cases, the delivery person 1250 may be notified that the process of placing the delivery at the designated delivery location will be recorded. In some cases, the instructions may be broadcasted to the delivery person 1250 via doorbell camera 1230 a number of times during a predetermined duration. For example, the instructions may be repeated two times to the delivery person 1250 within a one minute time interval.

In some cases, the doorbell camera 1230 in communication with one or more sensor units 1210 may determine if the delivery person 1250 places the package inside the package delivery zone 1235. Upon determining where the delivery person 1250 places the package inside the package delivery zone 1235, the doorbell camera 1230 in communication with one or more sensor units 1210 may determine a proximity or a difference between the designated delivery location and the actual location where the package is delivered satisfies a predetermined threshold. Upon determining the proximity and/or the difference between the designated delivery location and the actual location where the package is delivered satisfies a predetermined threshold, the doorbell camera 1230 may prompt the delivery person 1250 to adjust the location of the package placement. For example, the doorbell camera 1230 may provide an audio feedback (e.g., play a recorded voice instruction, digitally communicate a text-to-speech instruction, etc.), visual feedback via one or more sensor units 1210.

Figure 13:
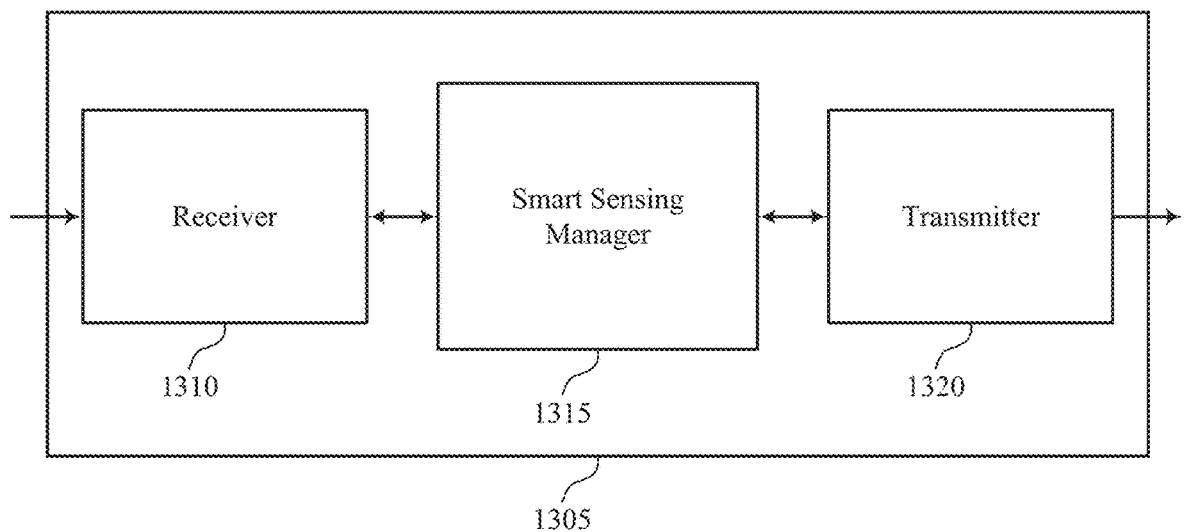
FIGS. 13 through 15 show block diagrams of a device in accordance with aspects of the present disclosure.

FIG. 13 shows a block diagram 1300 of a device 1305 in accordance with aspects of the present disclosure. Device 1305 may be an example of aspects of a control panel 135, a local computing device 115, 120, a server 155, or remote computing device 140 as described herein. Device 1305 may include receiver 1310, smart sensing manager 1315, and transmitter 1320. Device 1305 may also include a processor. Each of these components may be in communication with one another (e.g., via one or more buses).

Receiver 1310 may receive information such as packets, user data, or control information associated with various information channels (e.g., control channels, data channels, and information related to smart sensing techniques, etc.). Information may be passed on to other components of the device. The receiver 1310 may be an example of aspects of the transceiver 1635 described with reference to FIG. 16. The receiver 1310 may utilize a single antenna or a set of antennas.

Smart sensing manager 1315 and/or at least some of its various sub-components may be implemented in hardware, software executed by a processor, firmware, or any combination thereof. If implemented in software executed by a processor, the functions of the smart sensing manager 1315 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure.

The smart sensing manager 1315 and/or at least some of its various sub-components may be physically located at various positions, including being distributed such that portions of functions are implemented at different physical locations by one or more physical devices. In some examples, smart sensing manager 1315 and/or at least some of its various sub-components may be a separate and distinct component in accordance with various aspects of the present disclosure. In other examples, smart sensing manager 1315 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Smart sensing manager 1315 may monitor a parameter of a resource associated with a structure, predict a future change in condition associated with the parameter based on the monitoring, and perform a function using the security and automation system based on the predicting.

In some examples, smart sensing manager 1315 may receive a set of inputs from one or more sensors of the security and automation system, determine one or more characteristics of a person proximate the security and automation system based at least in part on the received set of inputs, predict an event based at least in part on a correlation between the one or more characteristics and the event, and perform one or more security and automation actions prior to the predicted event.

Transmitter 1320 may transmit signals generated by other components of the device. In some examples, the transmitter 1320 may be collocated with a receiver 1310 in a transceiver component. For example, the transmitter 1320 may be an example of aspects of the transceiver 1635 described with reference to FIG. 16. The transmitter 1320 may utilize a single antenna or a set of antennas.

Figure 14:
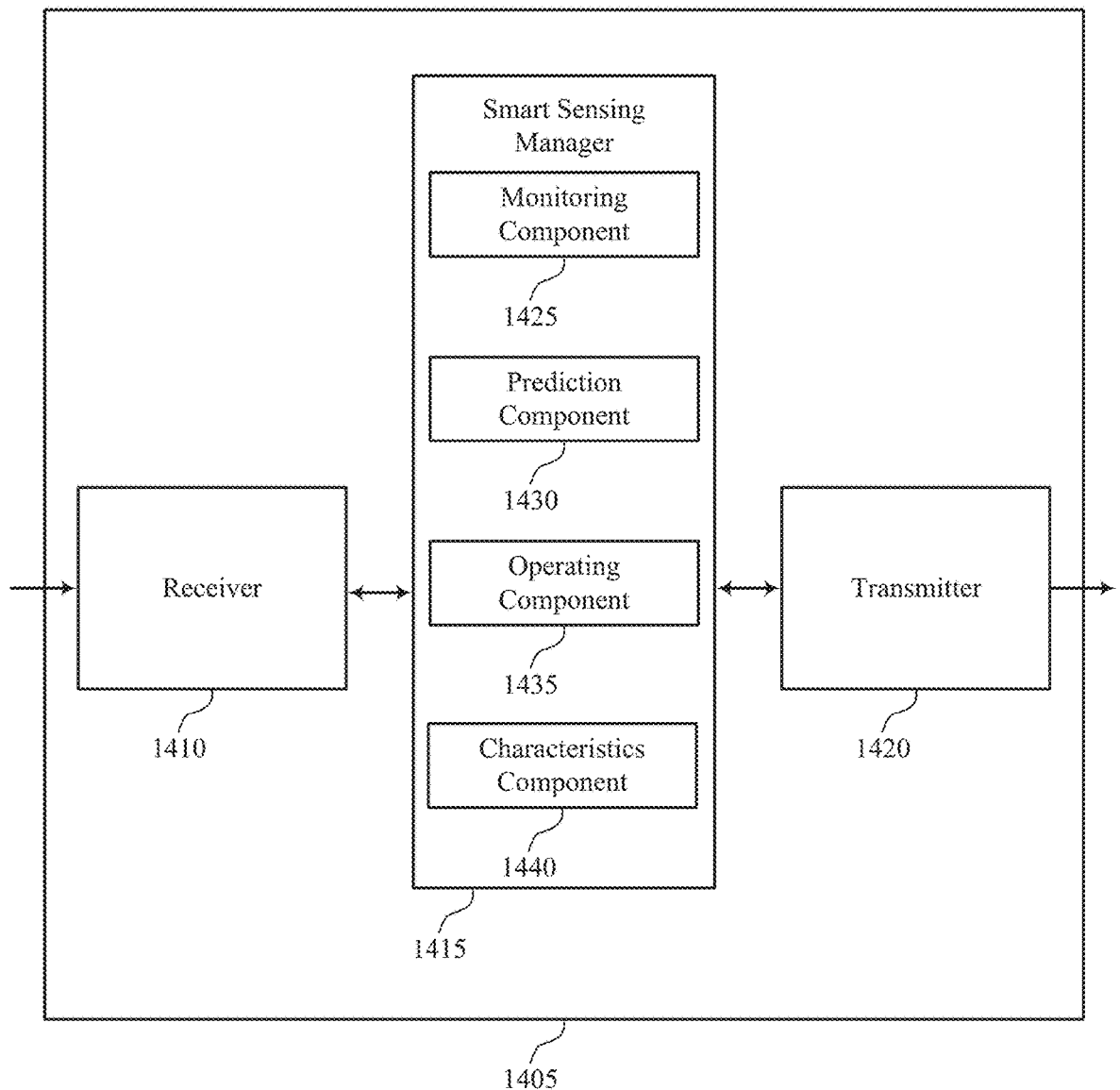

FIG. 14 shows a block diagram 1400 of a device 1405 in accordance with aspects of the present disclosure. Device 1405 may be an example of aspects of a device 1305 or a control panel 135, a local computing device 115, 120, a server 155, or a remote computing device 140 as described with reference to FIGS. 1 and 13. Device 1405 may include receiver 1410, smart sensing manager 1415, and transmitter 1420. Device 1405 may also include a processor. Each of these components may be in communication with one another (e.g., via one or more buses).

Receiver 1410 may receive information such as packets, user data, or control information associated with various information channels (e.g., control channels, data channels, and information related to smart sensing techniques, etc.). Information may be passed on to other components of the device. The receiver 1410 may be an example of aspects of the transceiver 1635 described with reference to FIG. 16. The receiver 1410 may utilize a single antenna or a set of antennas.

Smart sensing manager 1415 may be an example of aspects of the smart sensing manager 1315 described with reference to FIG. 13. Smart sensing manager 1415 may also include monitoring component 1425, prediction component 1430, operating component 1435, and characteristics component 1440.

Monitoring component 1425 may monitor a parameter of a resource associated with a structure. The monitoring component 1425 may receive real-time usage data of the resource from a sensor, and track real-time usage data based on the usage data. In some examples, performing a function using a security and automation system may be based on tracking the real-time usage data.

In some cases, the resource includes a service or a product. The monitoring component 1425 may identify the service or the product, or both. The monitoring component 1425 may determine that the product is a consumable item. In some cases, the consumable item includes at least one of food or beverages, or both. The monitoring component 1425 may determine that the product is an apparatus or a household item. In some cases, the service is a structure management service or a personal service related to an individual associated with the structure. In some cases, the personal service includes at least one of a babysitting service, a nursing care service, a pet sitting service, a medical provider visit service, or any combination thereof. In some cases, the structure management service includes at least one of a gardening and lawn care service, an internet-provider service, a housekeeping service, a laundry service, a plumbing service, a maintenance service, a termite and pest control service, a water softener service, or any combination thereof.

Prediction component 1430 may predict a future change in condition associated with the parameter based on the monitoring. The prediction component 1430 may retrieve, from a database, historical usage data associated with the service or the product, or both based on the identifying. The prediction component 1430 may compare the retrieved historical usage data with the real-time usage data to compute a usage model. In some examples, predicting the future change in condition associated with the parameter may be based on the usage model.

The prediction component 1430 may identify a consumption rate of the consumable item based on a consumption model of the consumable item. The prediction component 1430 may automatically request a purchase order with a third-party enterprise to restock and deliver the consumable item to the structure. The prediction component 1430 may identify a usage rate of the apparatus or the household item based on a usage model of the apparatus or the household item, and automatically request a purchase order or a maintenance order with a third-party enterprise to restock and deliver the household item to the structure or provide a maintenance service of the apparatus.

Operating component 1435 may perform the function using the security and automation system based on the predicting. In some cases, the function is performed automatically based on a pre-configured setting of the security and automation system.

In some examples, the monitoring component 1425 may receive a set of inputs from one or more sensors of the security and automation system. The characteristics component 1440 may determine one or more characteristics of a person proximate the security and automation system based on the received set of inputs. The prediction component 1430 may predict an event based on a correlation between the one or more characteristics and the event. The operating component 1435 may perform one or more security and automation actions prior to the predicted event.

Transmitter 1420 may transmit signals generated by other components of the device. In some examples, the transmitter 1420 may be collocated with a receiver 1410 in a transceiver component. For example, the transmitter 1420 may be an example of aspects of the transceiver 1635 described with reference to FIG. 16. The transmitter 1420 may utilize a single antenna or a set of antennas.

Figure 15:
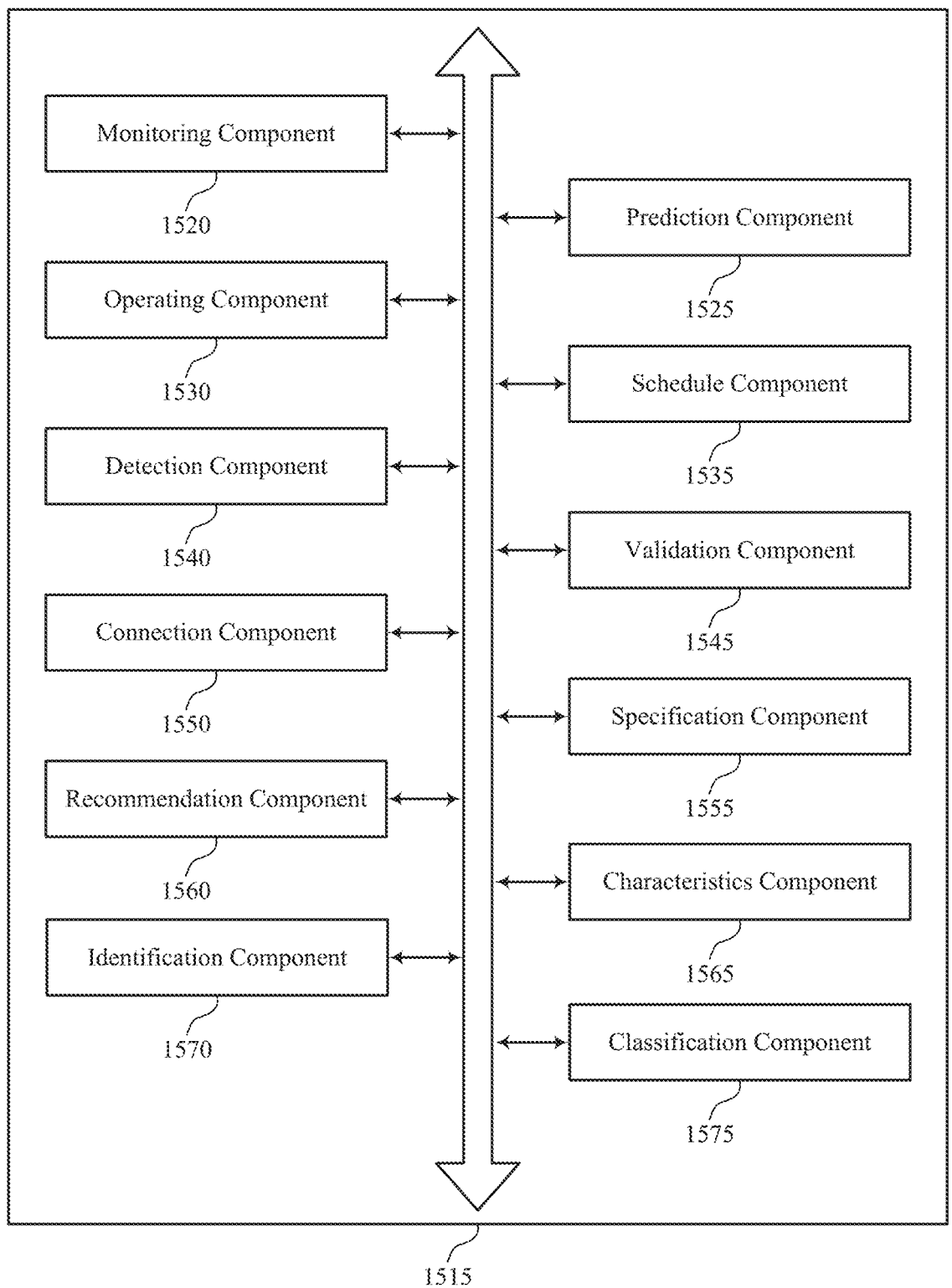

FIG. 15 shows a block diagram 1500 of a smart sensing manager 1515 in accordance with aspects of the present disclosure. The smart sensing manager 1515 may be an example of aspects of a smart sensing manager 1315, a smart sensing manager 1415, or a smart sensing manager 1615 described with reference to FIGS. 13, 14, and 16. The smart sensing manager 1515 may include monitoring component 1520, prediction component 1525, operating component 1530, schedule component 1535, detection component 1540, validation component 1545, connection component 1550, specification component 1555, and recommendation component 1560. Each of these components may communicate, directly or indirectly, with one another (e.g., via one or more buses).

Monitoring component 1520 may monitor a parameter of a resource associated with a structure. The monitoring component 1520 may receive real-time usage data of the resource from a sensor, and track real-time usage data based on the usage data. In some examples, performing a function using a security and automation system may be based on tracking the real-time usage data.

In some cases, the resource includes a service or a product. The monitoring component 1520 may identify the service or the product, or both. The monitoring component 1520 may determine that the product is a consumable item. In some cases, the consumable item includes at least one of food or beverages, or both. The monitoring component 1520 may determine that the product is an apparatus or a household item. In some cases, the service is a structure management service or a personal service related to an individual associated with the structure. In some cases, the personal service includes at least one of a babysitting service, a nursing care service, a pet sitting service, a medical provider visit service, or any combination thereof. In some cases, the structure management service includes at least one of a gardening and lawn care service, an internet-provider service, a housekeeping service, a laundry service, a plumbing service, a maintenance service, a termite and pest control service, a water softener service, or any combination thereof.

Prediction component 1525 may predict a future change in condition associated with the parameter based on the monitoring. The prediction component 1525 may retrieve, from a database, historical usage data associated with the service or the product, or both based on the identifying. The prediction component 1525 may compare the retrieved historical usage data with the real-time usage data to compute a usage model. In some examples, predicting the future change in condition associated with the parameter may be based on the usage model.

The prediction component 1525 may identify a consumption rate of the consumable item based on a consumption model of the consumable item. The prediction component 1525 may automatically request a purchase order with a third-party enterprise to restock and deliver the consumable item to the structure. The prediction component 1525 may identify a usage rate of the apparatus or the household item based on a usage model of the apparatus or the household item, and automatically request a purchase order or a maintenance order with a third-party enterprise to restock and deliver the household item to the structure or provide a maintenance service of the apparatus.

Operating component 1530 may perform the function using the security and automation system based on the predicting. In some cases, the function is performed automatically based on a pre-configured setting of the security and automation system.

Schedule component 1535 may identify schedule data of an individual associated with the structure. The schedule component 1535 may automatically schedule a service personnel to visit the structure and perform an action associated with the service based on the schedule data of the individual. In some cases, performing the function includes automatically scheduling the service personnel. The schedule component 1535 may identify a service provider associated with the service based on a pre-configured setting. The schedule component 1535 may transmit, to a remote device of the service provider, a message indicating a service request, where the message includes at least one of a payment information, a geolocation information of the structure, a contact information of the individual, or any combination thereof, and receive, from the remote device, an acknowledgment message in response to the service request.

Detection component 1540 may detect the service personnel based on sensor data received from a sensor. The detection component 1540 may identify a time associated with the detecting, and compare the identified time to a scheduled service time.

Validation component 1545 may validate that the identified time is within a threshold limit of the scheduled service time. The validation component 1545 may provide, to a device of the service personnel, access information to the structure based at least on the validating, where the access information includes at least one of a random code, a PIN, or instructions for providing the service to a designated zone of the structure, or any combination thereof. In some cases, performing the function may include providing to the device of the service personnel the access information to the structure. The validation component 1545 may operate a garage door opener based on the validating. In some cases, performing the function may include operating the garage door opener.

Connection component 1550 may establish a connection with the apparatus. Specification component 1555 may retrieve specification information associated with the apparatus based on performing a scan using the established connection. In some examples, the specification information may include warranty coverage information, appliance repair and support information, vendor information, an energy consumption and cost report of operating the apparatus, or any combination thereof.

Recommendation component 1560 may determine a set of recommended actions to perform based on the future change in condition. The recommendation component 1560 may generate a message indicating the future change in condition and an option to select at least one recommended action from the set. The recommendation component 1560 may transmit the message to a device of an individual associated with the security and automation system, and receive, from the device, a message indicating a selection of a recommended action from the set. In some cases, performing the function using the security and automation system is based on the received message.

In some examples, the monitoring component 1520 may receive a set of inputs from one or more sensors of the security and automation system. The characteristics component 1565 may determine one or more characteristics of a person proximate the security and automation system based on the received set of inputs. The prediction component 1525 may predict an event based on a correlation between the one or more characteristics and the event. The operating component 1530 may perform one or more security and automation actions prior to the predicted event.

The monitoring component 1520 may receive a video input, an image input, an audio input, or a combination thereof, from a camera associated with the security and automation system, where at least one sensor of the one or more sensors includes the camera. The monitoring component 1520 may receive data associated with a security and automation community, where predicting the event is based on the received data associated with the security and automation community.

The characteristics component 1565 may analyze a gait of the person, a physical behavior of the person, a clothing of the person, or an object carried by the person, or any combination thereof. The characteristics component 1565 may determine, based on the analyzing, a likelihood that the person is to perpetrate the predicted event. The characteristics component 1565 may determine that the received set of inputs satisfy one or more thresholds, where predicting the event is based on the received set of inputs satisfying the one or more thresholds. The characteristics component 1565 may determine that the frequency satisfies a threshold, where predicting the event is based on the frequency that the person is located within the distance of the object satisfying the threshold.

The characteristics component 1565 may select one or more events, people, scenarios, or activities, or any combination thereof, based on receiving the set of inputs. The characteristics component 1565 may transmit a notification to at least one person of a group of personnel on the selecting, where the notification identifies the selected one or more events, people, scenarios, activities, or any combination thereof.

The operating component 1530 may identify a setting of the security and automation system and emit a sound based at least in part on the identified setting. In some examples, the operating component 1530 may adjust the sound based on the identified setting and emit, at a second time prior to the predicted event, the adjusted sound. In some examples, the operating component 1530 may select the sound from a set of sounds based on a random selection procedure. In some examples, the operating component 1530 may send a drone to track the person and receive, from the drone, data associated with the person.

The identification component 1570 may identify the person on stored information or biometric information, or both, where performing the one or more security and automation actions is based on the identified person. The operating component 1530 may emit a sound based on the identified person, where the sound includes a command and an indication that the person has been identified. The operating component 1530 may select the one or more security and automation actions from a set of configured security and automation actions based on the identified person. The classification component 1575 may identify a first classification of the event at a first time. The operating component 1530 may perform a first action of the one or more security and automation actions based on the identified first classification. The classification component 1575 may identify a second classification of the event based on performing the first action. The operating component 1530 may perform a second action of the one or more security and automation actions based on the identified second classification.

Figure 16:
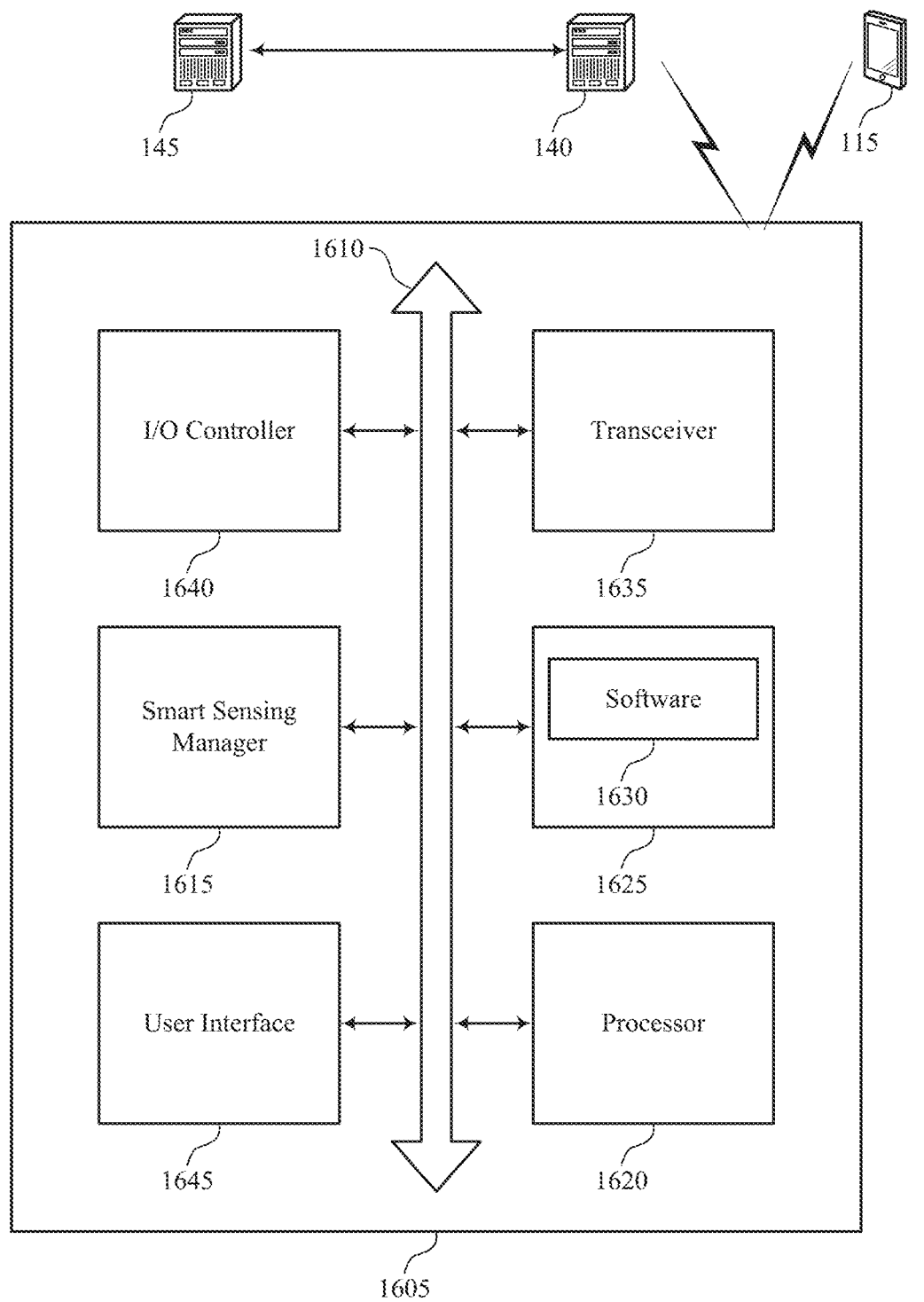
FIG. 16 illustrates a block diagram of a system including a control panel in accordance with aspects of the present disclosure.

FIG. 16 shows a diagram of a system 1600 including a device 1605 in accordance with aspects of the present disclosure. Device 1605 may be an example of or include the components of device 1305, device 1405, or a control panel 135, a local computing device 115, 120, a server 155, or a remote computing device 140 as described above, e.g., with reference to FIGS. 1, 13, and 14. Device 1605 may include components for bi-directional voice and data communications including components for transmitting and receiving communications, including smart sensing manager 1615, processor 1620, memory 1625, software 1630, transceiver 1635, I/O controller 1640, and user interface 1645. These components may be in electronic communication via one or more buses (e.g., bus 1610).

In some cases, device 1605 may communicate with a remote computing device 140, and/or a remote server (e.g., server 155). For example, one or more elements of device 1605 may provide a direct connection to the server 155 via a direct network link to the Internet via a POP (point of presence). In some cases, one element of device 1605 (e.g., one or more antennas, transceivers, etc.) may provide a connection using wireless techniques, including digital cellular telephone connection, Cellular Digital Packet Data (CDPD) connection, digital satellite data connection, and/or another connection.

Many other devices and/or subsystems may be connected to one or may be included as one or more elements of system 1600 (e.g., entertainment system, computing device, remote cameras, wireless key fob, wall mounted user interface device, cell radio component, battery, alarm siren, door lock, lighting system, thermostat, home appliance monitor, utility equipment monitor, and so on). In some cases, all of the elements shown in FIG. 16 need not be present to practice the present systems and methods. The devices and subsystems may also be interconnected in different ways from that shown in FIG. 16. In some cases, an aspect of the operations of system 1600 may be readily known in the art and are not discussed in detail in this disclosure.

The signals associated with system 1600 may include wireless communication signals such as radio frequency, electromagnetics, local area network (LAN), wide area network (WAN), virtual private network (VPN), wireless network (using 802.11, for example), 345 MHz, Z-WAVE®, cellular network (using 3G and/or Long Term Evolution (LTE), for example), and/or other signals. The radio access technology (RAT) of system 1600 may be related to, but are not limited to, WWAN (GSM, CDMA, and WCDMA), wireless local area network (WLAN) (including user equipment (UE) BLUETOOTH® and Wi-Fi), WMAN (WiMAX), antennas for mobile communications, antennas for Wireless Personal Area Network (WPAN) applications (including RFID and UWB). In some cases, one or more sensors (e.g., motion, proximity, smoke, light, glass break, door, window, carbon monoxide, and/or another sensor) may connect to some element of system 1600 via a network using the one or more wired and/or wireless connections.

Processor 1620 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 1620 may be configured to operate a memory array using a memory controller. In other cases, a memory controller may be integrated into processor 1620. Processor 1620 may be configured to execute computer-readable instructions stored in a memory to perform various functions (e.g., functions or tasks supporting smart sensing techniques).

Memory 1625 may include random access memory (RAM) and read only memory (ROM). The memory 1625 may store computer-readable, computer-executable software 1630 including instructions that, when executed, cause the processor to perform various functions described herein. In some cases, the memory 1625 may contain, among other things, a basic input/output system (BIOS) which may control basic hardware or software operation such as the interaction with peripheral components or devices.

Software 1630 may include code to implement aspects of the present disclosure, including code to support smart sensing techniques. Software 1630 may be stored in a non-transitory computer-readable medium such as system memory or other memory. In some cases, the software 1630 may not be directly executable by the processor but may cause a computer (e.g., when compiled and executed) to perform functions described herein.

Transceiver 1635 may communicate bi-directionally, via one or more antennas, wired, or wireless links as described above. For example, the transceiver 1635 may represent a wireless transceiver and may communicate bi-directionally with another wireless transceiver. The transceiver 1635 may also include a modem to modulate the packets and provide the modulated packets to the antennas for transmission, and to demodulate packets received from the antennas.

I/O controller 1640 may manage input and output signals for device 1605. I/O controller 1640 may also manage peripherals not integrated into device 1605. In some cases, I/O controller 1640 may represent a physical connection or port to an external peripheral. In some cases, I/O controller 1640 may utilize an operating system such as iOS®, ANDROID®, MS-DOS®, MS-WINDOWS®, OS/2®, UNIX®, LINUX®, or another known operating system. In other cases, I/O controller 1640 may represent or interact with a modem, a keyboard, a mouse, a touchscreen, or a similar device. In some cases, I/O controller 1640 may be implemented as part of a processor. In some cases, a user may interact with device 1605 via I/O controller 1640 or via hardware components controlled by I/O controller 1640.

User interface 1645 may enable a user to interact with device 1605. In some cases, the user interface component 1645 may include an audio device, such as an external speaker system, an external display device such as a display screen, or an input device (e.g., remote control device interfaced with the user interface component 1645 directly or through the 1/O controller component).

Figure 17:
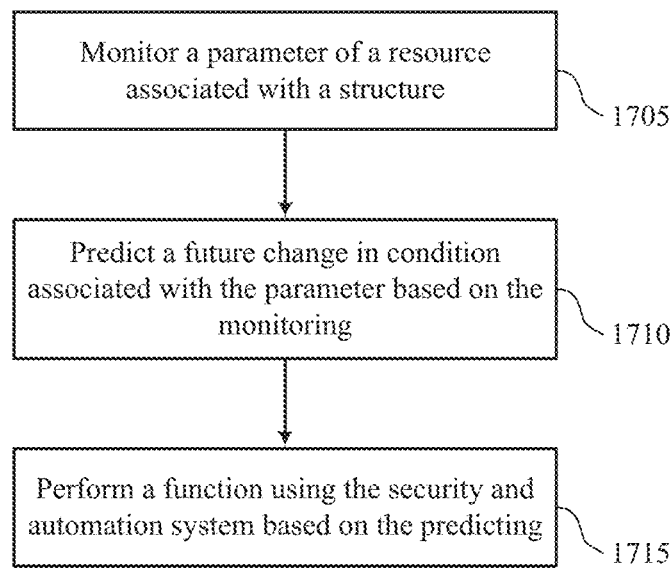
FIGS. 17 through 23 illustrate methods in accordance with aspects of the present disclosure.

FIG. 17 shows a flowchart illustrating a method 1700 for smart sensing techniques in accordance with aspects of the present disclosure. The operations of method 1700 may be implemented by a control panel 135 or its components as described herein. For example, the operations of method 1700 may be performed by a smart sensing manager as described with reference to FIGS. 13 through 16. In some cases, additionally or alternatively, the operations of method 1700 may be implemented by a local computing device 115, 120, a server 155, or a remote computing device 140 or its components as described herein. In some examples, a control panel 135 may execute a set of codes to control the functional elements of the device to perform the functions described below. Additionally or alternatively, the control panel 135 may perform aspects of the functions described below using special-purpose hardware.

At 1705 the control panel 135 may monitor a parameter of a resource associated with a structure. The operations of 1705 may be performed according to the methods described herein. In certain examples, aspects of the operations of 1705 may be performed by a monitoring component as described with reference to FIGS. 14 and 15.

At 1710 the control panel 135 may predict a future change in condition associated with the parameter based on the monitoring. The operations of 1710 may be performed according to the methods described herein. In certain examples, aspects of the operations of 1710 may be performed by a prediction component as described with reference to FIGS. 14 and 15.

At 1715 the control panel 135 may perform a function using the security and automation system based on the predicting. The operations of 1715 may be performed according to the methods described herein. In certain examples, aspects of the operations of 1715 may be performed by an operating component as described with reference to FIGS. 14 and 15.

Figure 18:
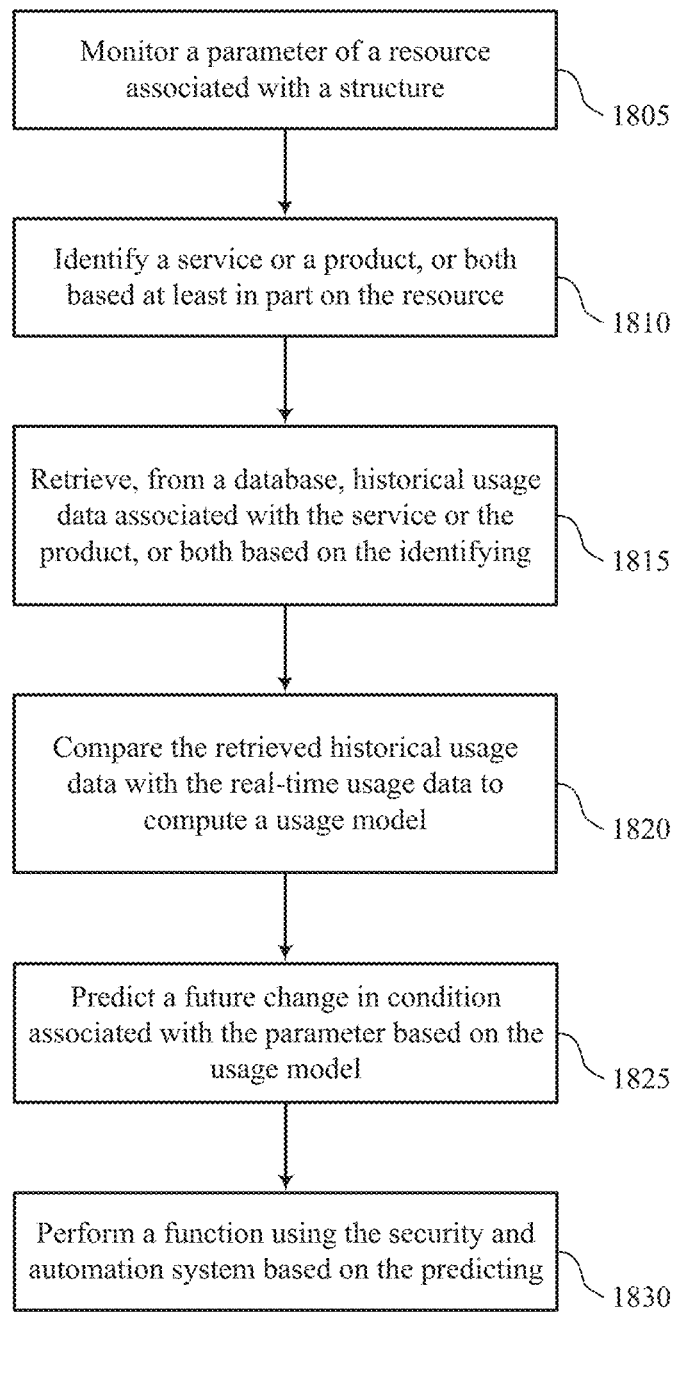

FIG. 18 shows a flowchart illustrating a method 1800 for smart sensing techniques in accordance with aspects of the present disclosure. The operations of method 1800 may be implemented by a control panel 135 or its components as described herein. For example, the operations of method 1800 may be performed by a smart sensing manager as described with reference to FIGS. 13 through 16. In some cases, additionally or alternatively, the operations of method 1800 may be implemented by a local computing device 115, 120, a server 155, or a remote computing device 140 or its components as described herein. In some examples, a control panel 135 may execute a set of codes to control the functional elements of the device to perform the functions described below. Additionally or alternatively, the control panel 135 may perform aspects of the functions described below using special-purpose hardware.

At 1805 the control panel 135 may monitor a parameter of a resource associated with a structure. The operations of 1805 may be performed according to the methods described herein. In certain examples, aspects of the operations of 1805 may be performed by a monitoring component as described with reference to FIGS. 14 and 15.

At 1810 the control panel 135 may identify a service or a product, or both based on the resource. The operations of 1810 may be performed according to the methods described herein. In certain examples, aspects of the operations of 1810 may be performed by a monitoring component as described with reference to FIGS. 14 and 15.

At 1815 the control panel 135 may retrieve, from a database, historical usage data associated with the service or the product, or both based on the identifying. The operations of 1815 may be performed according to the methods described herein. In certain examples, aspects of the operations of 1815 may be performed by a prediction component as described with reference to FIGS. 14 and 15.

At 1820 the control panel 135 may compare the retrieved historical usage data with the real-time usage data to compute a usage model, where predicting the future change in condition associated with the parameter is based on the usage model. The operations of 1820 may be performed according to the methods described herein. In certain examples, aspects of the operations of 1820 may be performed by a prediction component as described with reference to FIGS. 14 and 15.

At 1825 the control panel 135 may predict a future change in condition associated with the parameter based on the usage model. The operations of 1825 may be performed according to the methods described herein. In certain examples, aspects of the operations of 1825 may be performed by a prediction component as described with reference to FIGS. 14 and 15.

At 1830 the control panel 135 may perform a function using the security and automation system based on the predicting. The operations of 1830 may be performed according to the methods described herein. In certain examples, aspects of the operations of 1830 may be performed by an operating component as described with reference to FIGS. 14 and 15.

Figure 19:
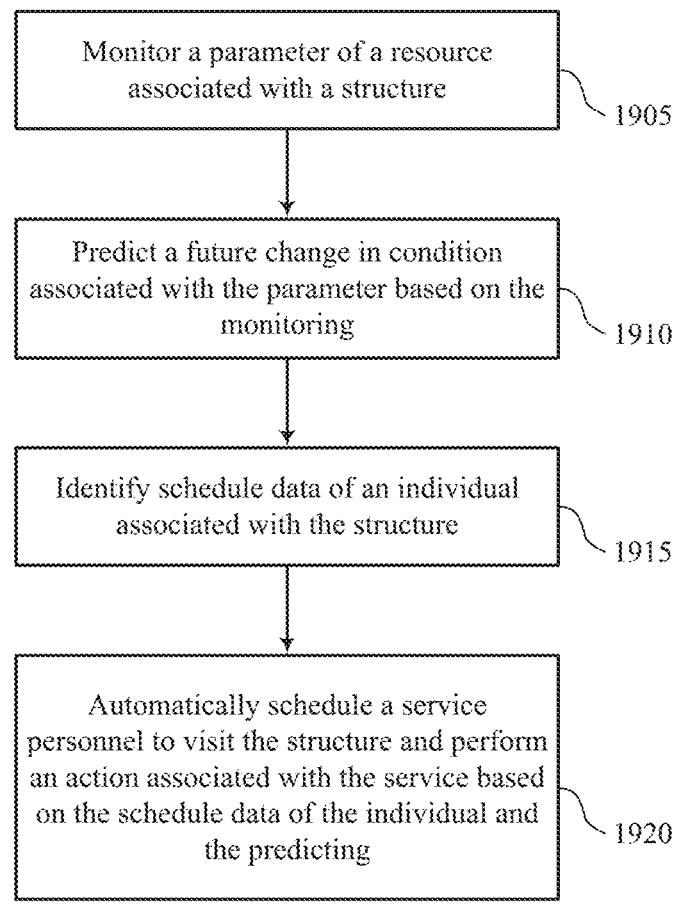

FIG. 19 shows a flowchart illustrating a method 1900 for smart sensing techniques in accordance with aspects of the present disclosure. The operations of method 1900 may be implemented by a control panel 135 or its components as described herein. For example, the operations of method 1900 may be performed by a smart sensing manager as described with reference to FIGS. 13 through 16. In some cases, additionally or alternatively, the operations of method 1900 may be implemented by a local computing device 115, 120, a server 155, or a remote computing device 140 or its components as described herein. In some examples, a control panel 135 may execute a set of codes to control the functional elements of the device to perform the functions described below. Additionally or alternatively, the control panel 135 may perform aspects of the functions described below using special-purpose hardware.

At 1905 the control panel 135 may monitor a parameter of a resource associated with a structure. The operations of 1905 may be performed according to the methods described herein. In certain examples, aspects of the operations of 1905 may be performed by a monitoring component as described with reference to FIGS. 14 and 15.

At 1910 the control panel 135 may predict a future change in condition associated with the parameter based on the monitoring. The operations of 1910 may be performed according to the methods described herein. In certain examples, aspects of the operations of 1910 may be performed by a prediction component as described with reference to FIGS. 14 and 15.

At 1915 the control panel 135 may identify schedule data of an individual associated with the structure. The operations of 1915 may be performed according to the methods described herein. In certain examples, aspects of the operations of 1915 may be performed by a schedule component as described with reference to FIG. 15.

At 1920 the control panel 135 may automatically schedule a service personnel to visit the structure and perform an action associated with the service based on the schedule data of the individual and the predicting. The operations of 1920 may be performed according to the methods described herein. In certain examples, aspects of the operations of 1920 may be performed by a schedule component as described with reference to FIG. 15.

Figure 20:
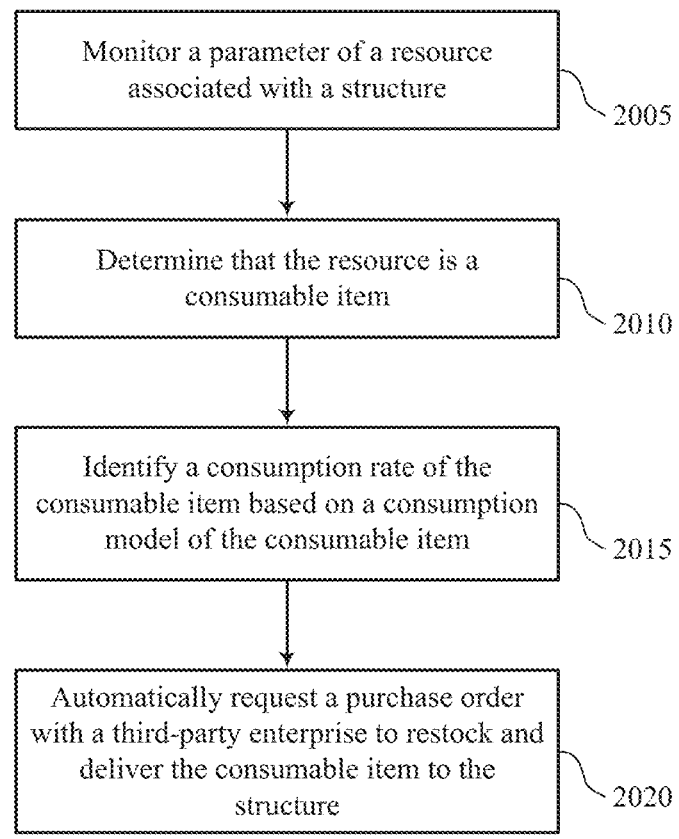

FIG. 20 shows a flowchart illustrating a method 2000 for smart sensing techniques in accordance with aspects of the present disclosure. The operations of method 2000 may be implemented by a control panel 135 or its components as described herein. For example, the operations of method 2000 may be performed by a smart sensing manager as described with reference to FIGS. 13 through 16. In some cases, additionally or alternatively, the operations of method 2000 may be implemented by a local computing device 115, 120, a server 155, or a remote computing device 140 or its components as described herein. In some examples, a control panel 135 may execute a set of codes to control the functional elements of the device to perform the functions described below. Additionally or alternatively, the control panel 135 may perform aspects of the functions described below using special-purpose hardware.

At 2005 the control panel 135 may monitor a parameter of a resource associated with a structure. The operations of 2005 may be performed according to the methods described herein. In certain examples, aspects of the operations of 2005 may be performed by a monitoring component as described with reference to FIGS. 14 and 15.

At 2010 the control panel 135 may determine that the resource is a consumable item. The operations of 2010 may be performed according to the methods described herein. In certain examples, aspects of the operations of 2010 may be performed by a monitoring component as described with reference to FIGS. 14 and 15.

At 2015 the control panel 135 may identify a consumption rate of the consumable item based on a consumption model of the consumable item. The operations of 2015 may be performed according to the methods described herein. In certain examples, aspects of the operations of 2015 may be performed by a prediction component as described with reference to FIGS. 14 and 15.

At 2020 the control panel 135 may automatically request a purchase order with a third-party enterprise to restock and deliver the consumable item to the structure. The operations of 2020 may be performed according to the methods described herein. In certain examples, aspects of the operations of 2020 may be performed by a prediction component as described with reference to FIGS. 14 and 15.

Figure 21:
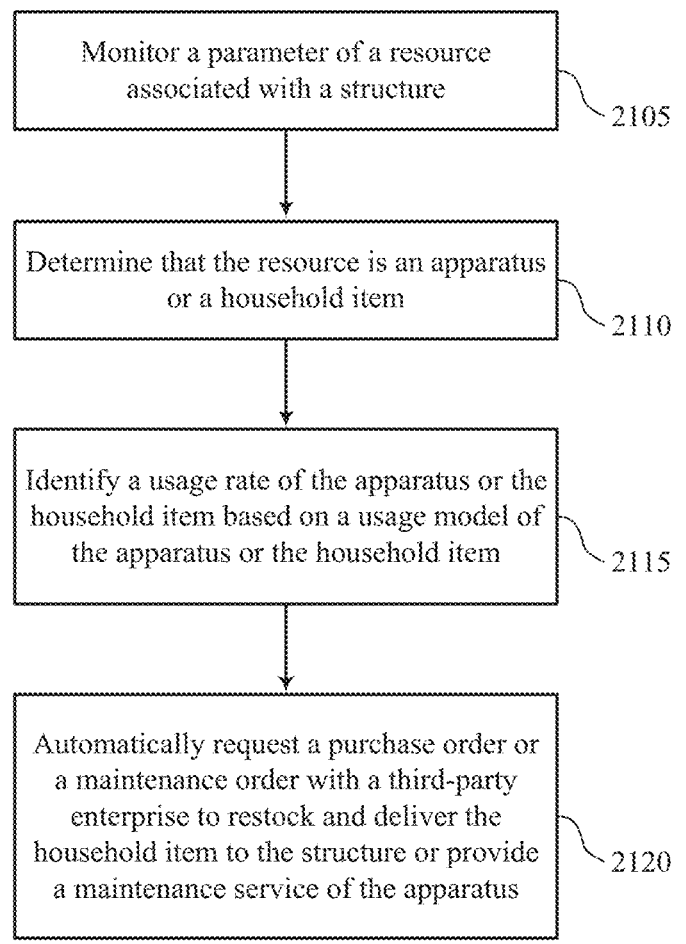

FIG. 21 shows a flowchart illustrating a method 2100 for smart sensing techniques in accordance with aspects of the present disclosure. The operations of method 2100 may be implemented by a control panel 135 or its components as described herein. For example, the operations of method 2100 may be performed by a smart sensing manager as described with reference to FIGS. 13 through 16. In some cases, additionally or alternatively, the operations of method 2100 may be implemented by a local computing device 115, 120, a server 155, or a remote computing device 140 or its components as described herein. In some examples, a control panel 135 may execute a set of codes to control the functional elements of the device to perform the functions described below. Additionally or alternatively, the control panel 135 may perform aspects of the functions described below using special-purpose hardware.

At 2105 the control panel 135 may monitor a parameter of a resource associated with a structure. The operations of 2105 may be performed according to the methods described herein. In certain examples, aspects of the operations of 2105 may be performed by a monitoring component as described with reference to FIGS. 14 and 15.

At 2110 the control panel 135 may determine that the resource is an apparatus or a household item. The operations of 2110 may be performed according to the methods described herein. In certain examples, aspects of the operations of 2110 may be performed by a monitoring component as described with reference to FIGS. 14 and 15.

At 2115 the control panel 135 may identify a usage rate of the apparatus or the household item based on a usage model of the apparatus or the household item. The operations of 2115 may be performed according to the methods described herein. In certain examples, aspects of the operations of 2115 may be performed by a prediction component as described with reference to FIGS. 14 and 15.

At 2120 the control panel 135 may automatically request a purchase order or a maintenance order with a third-party enterprise to restock and deliver the household item to the structure or provide a maintenance service of the apparatus.

The operations of 2120 may be performed according to the methods described herein. In certain examples, aspects of the operations of 2120 may be performed by a prediction component as described with reference to FIGS. 14 and 15.

Figure 22:
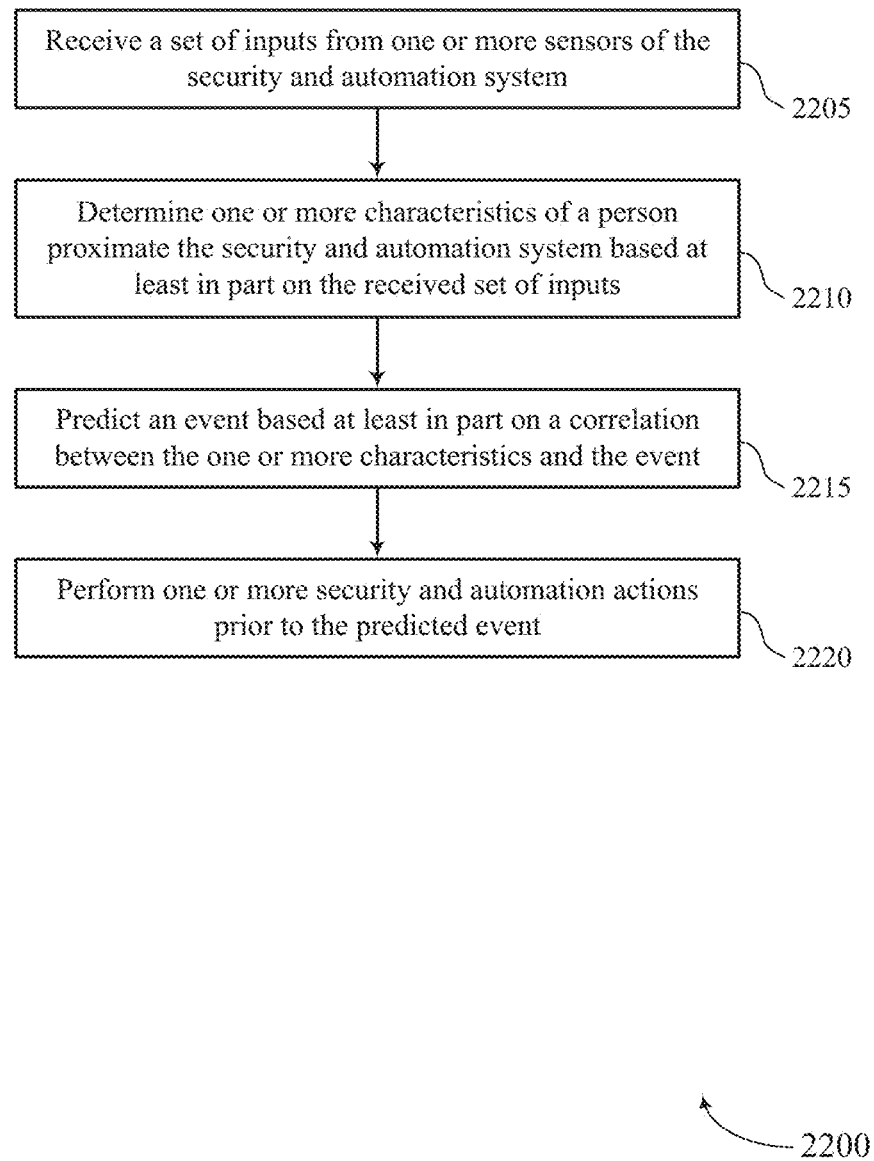

FIG. 22 shows a flowchart illustrating a method 2200 for smart sensing techniques in accordance with aspects of the present disclosure. The operations of method 2100 may be implemented by a control panel 135 or its components as described herein. For example, the operations of method 2200 may be performed by a smart sensing manager as described with reference to FIGS. 13 through 16. In some cases, additionally or alternatively, the operations of method 2100 may be implemented by a local computing device 115, 120, a server 155, or a remote computing device 140 or its components as described herein. In some examples, a control panel 135 may execute a set of codes to control the functional elements of the device to perform the functions described below. Additionally or alternatively, the control panel 135 may perform aspects of the functions described below using special-purpose hardware.

At 2205, the method may include receiving a set of inputs from one or more sensors of the security and automation system. The operations of 2205 may be performed in accordance with examples as disclosed herein. In some examples, aspects of the operations of 2205 may be performed by a monitoring component as described with reference to FIGS. 14 and 15.

At 2210, the method may include determining one or more characteristics of a person proximate the security and automation system based at least in part on the received set of inputs. The operations of 2210 may be performed in accordance with examples as disclosed herein. In some examples, aspects of the operations of 2210 may be performed by a characteristic component as described with reference to FIGS. 14 and 15.

At 2215, the method may include predicting an event based at least in part on a correlation between the one or more characteristics and the event. The operations of 2215 may be performed in accordance with examples as disclosed herein. In some examples, aspects of the operations of 2215 may be performed by a prediction component as described with reference to FIGS. 14 and 15.

At 2220, the method may include performing one or more security and automation actions prior to the predicted event. The operations of 2220 may be performed in accordance with examples as disclosed herein. In some examples, aspects of the operations of 2220 may be performed by an operating component as described with reference to FIGS. 14 and 15.

Figure 23:
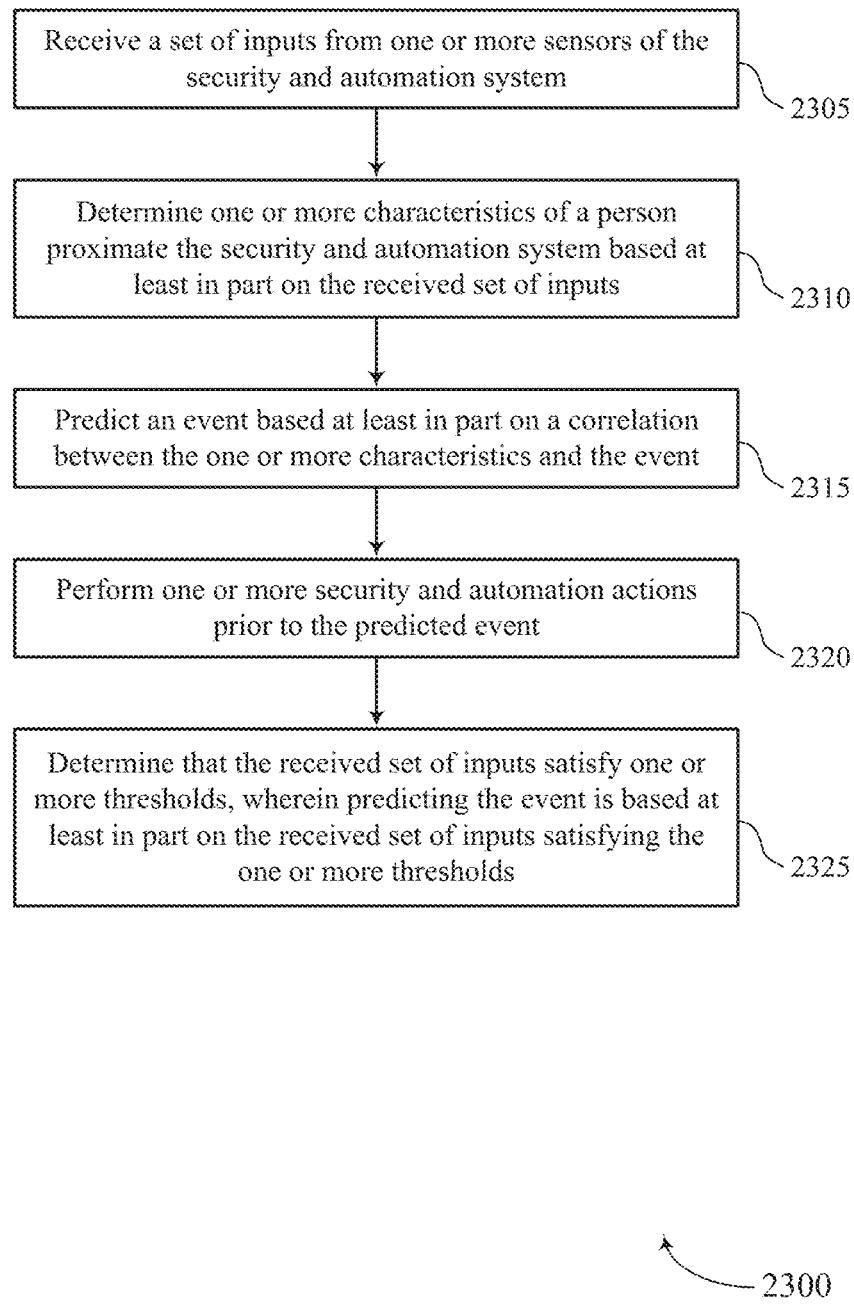

FIG. 23 shows a flowchart illustrating a method 2300 for smart sensing techniques in accordance with aspects of the present disclosure. The operations of method 2300 may be implemented by a control panel 135 or its components as described herein. For example, the operations of method 2300 may be performed by a smart sensing manager as described with reference to FIGS. 13 through 16. In some cases, additionally or alternatively, the operations of method 2300 may be implemented by a local computing device 115, 120, a server 155, or a remote computing device 140 or its components as described herein. In some examples, a control panel 135 may execute a set of codes to control the functional elements of the device to perform the functions described below. Additionally or alternatively, the control panel 135 may perform aspects of the functions described below using special-purpose hardware.

At 2305, the method may include receiving a set of inputs from one or more sensors of the security and automation system. The operations of 2305 may be performed in accordance with examples as disclosed herein. In some examples, aspects of the operations of 2305 may be performed by a monitoring component as described with reference to FIGS. 14 and 15.

At 2310, the method may include determining one or more characteristics of a person proximate the security and automation system based at least in part on the received set of inputs. The operations of 2310 may be performed in accordance with examples as disclosed herein. In some examples, aspects of the operations of 2310 may be performed by a characteristic component as described with reference to FIGS. 14 and 15.

At 2315, the method may include predicting an event based at least in part on a correlation between the one or more characteristics and the event. The operations of 2315 may be performed in accordance with examples as disclosed herein. In some examples, aspects of the operations of 2315 may be performed by a prediction component as described with reference to FIGS. 14 and 15

At 2320, the method may include performing one or more security and automation actions prior to the predicted event. The operations of 2320 may be performed in accordance with examples as disclosed herein. In some examples, aspects of the operations of 2320 may be performed by an operating component as described with reference to FIGS. 14 and 15.

At 2325, the method may include determining that the received set of inputs satisfy one or more thresholds, wherein predicting the event is based at least in part on the received set of inputs satisfying the one or more thresholds. The operations of 2325 may be performed in accordance with examples as disclosed herein. In some examples, aspects of the operations of 2325 may be performed by a prediction component 2335 as described with reference to FIGS. 14 and 15.

The detailed description set forth above in connection with the appended drawings describes examples and does not represent the only instances that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with this disclosure may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, and/or state machine. A processor may also be implemented as a combination of computing devices, e.g., a combination of a DSP and a microprocessor, multiple microprocessors, one or more microprocessors in conjunction with a DSP core, and/or any other such configuration. An operating system utilized by the processor (or by I/O controller component or another component described above) may be iOS®, ANDROID®, MS-DOS®, MS-WINDOWS®, OS/2®, UNIX®, LINUX®, or another known operating system.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In addition, any disclosure of components contained within other components or separate from other components should be considered exemplary because multiple other architectures may potentially be implemented to achieve the same functionality, including incorporating all, most, and/or some elements as part of one or more unitary structures and/or separate structures.

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, flash memory, CD-ROM, DVD, or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed.

This disclosure may specifically apply to security system applications. This disclosure may specifically apply to automation system applications. In some cases, the concepts, the technical descriptions, the features, the methods, the ideas, and/or the descriptions may specifically apply to security and/or automation system applications. Distinct advantages of such systems for these specific applications are apparent from this disclosure.

The process parameters, actions, and steps described and/or illustrated in this disclosure are given by way of example only and can be varied as desired. For example, while the steps illustrated and/or described may be shown or discussed in a particular order, these steps do not necessarily need to be performed in the order illustrated or discussed. The various exemplary methods described and/or illustrated here may also omit one or more of the steps described or illustrated here or include additional steps in addition to those disclosed.

Furthermore, while various cases have been described and/or illustrated here in the context of fully functional computing systems, one or more of these exemplary cases may be distributed as a program product in a variety of forms, regardless of the particular type of computer-readable media used to actually carry out the distribution. The cases disclosed herein may also be implemented using software components that perform certain tasks. These software components may include script, batch, or other executable files that may be stored on a computer-readable storage medium or in a computing system. In some cases, these software components may permit and/or instruct a computing system to perform one or more of the exemplary cases disclosed here.

This description, for purposes of explanation, has been described with reference to specific cases. The illustrative discussions above, however, are not intended to be exhaustive or limit the present systems and methods to the precise forms discussed. Many modifications and variations are possible in view of the above teachings. The cases were chosen and described in order to explain the principles of the present systems and methods and their practical applications, to enable others skilled in the art to utilize the present systems, apparatus, and methods and various cases with various modifications as may be suited to the particular use contemplated.

What is claimed is:

1. A method, comprising:
   receiving a set of inputs from one or more sensors of a security system, the set of inputs comprising a video input;
   detecting a presence within a field of view of the video input;
   determining that the presence is within a zone established within the field of view of the video input based on the received set of inputs and a dimension of the zone;
   determining, by inputting the received set of inputs into an artificial intelligence model, that the presence comprises a presence of a person;
   determining one or more characteristics of the person based at least in part on the received set of inputs;
   predicting an event within the zone based at least in part on a correlation between the one or more characteristics and the event; and
   performing one or more security actions prior to the predicted event, the one or more security actions selected to deter the person from performing the predicted event within the zone.

2. The method of claim 1, further comprising:
   receiving the video input, an image input, an audio input, or a combination thereof, from a camera associated with the security system, wherein at least one sensor of the one or more sensors comprises the camera.

3. The method of claim 1, wherein determining the one or more characteristics comprises:
   analyzing a gait of the person, a physical behavior of the person, a clothing of the person, or an object carried by the person, or any combination thereof; and
   determining, based at least in part on the analyzing, a likelihood that the person is to perpetrate the predicted event.

4. The method of claim 1, wherein determining the one or more characteristics comprises:
   determining that the received set of inputs satisfy one or more thresholds, wherein predicting the event is based at least in part on the received set of inputs satisfying the one or more thresholds.

5. The method of claim 4, further comprising:
   determining a frequency that the person is located within a distance of an object; and
   determining that the frequency satisfies a threshold, wherein predicting the event is based at least in part on the frequency that the person is located within the distance of the object satisfying the threshold.

6. The method of claim 1, wherein receiving the set of inputs comprises:
   receiving data associated with a security community, wherein predicting the event is based at least in part on the received data associated with the security community.

7. The method of claim 1, wherein determining the one or more characteristics comprises:
   selecting one or more events, people, scenarios, or activities, or any combination thereof, based at least in part on receiving the set of inputs; and
   transmitting a notification to at least one person of a group of personnel based at least in part on the selecting, wherein the notification identifies the selected one or more events, people, scenarios, activities, or any combination thereof.

8. The method of claim 1, wherein performing the one or more security actions comprises:
   identifying a setting of the security system;
   emitting a sound based at least in part on the identified setting;

adjusting the sound based at least in part on the identified setting; and emitting, at a second time prior to the predicted event, the adjusted sound.

9. The method of claim 1, wherein the one or more security actions comprise emitting a whistling sound.

10. The method of claim 1, wherein the one or more security actions comprise emitting one or more of a barking sound, a growling sound, a shouting sound, a gunshot sound, and an announcement for the person to leave.

11. The method of claim 1, further comprising:
sending a drone to track the person; and
receiving, from the drone, data associated with the person.

12. The method of claim 1, further comprising:
identifying the person based at least in part on stored information or biometric information, or both, wherein performing the one or more security actions is based at least in part on the identified person.

13. The method of claim 12, wherein the one or more security actions comprise:
emitting a sound based at least in part on the identified person, wherein the sound comprises a command and an indication that the person has been identified.

14. The method of claim 12, further comprising:
selecting the one or more security actions from a set of configured security actions based at least in part on the identified person.

15. The method of claim 1, further comprising:
identifying a first classification of the event at a first time;
performing a first action of the one or more security actions based at least in part on the identified first classification;
identifying a second classification of the event based at least in part on performing the first action; and
performing a second action of the one or more security actions based at least in part on the identified second classification.

16. An apparatus, comprising:
a processor;
memory coupled with the processor; and
instructions stored in the memory and executable by the processor to cause the apparatus to:
receive a set of inputs from one or more sensors of a security system, the set of inputs comprising a video input;
detect a presence within a field of view of the video input;
determine that the presence is within a zone established within the field of view of the video input based on the received set of inputs and a dimension of the zone;
determine, by inputting the received set of inputs into an artificial intelligence model, that the presence comprises a presence of a person;
determine one or more characteristics of the person based at least in part on the received set of inputs;
predict an event within the zone based at least in part on a correlation between the one or more characteristics and the event; and
perform one or more security actions prior to the predicted event, the one or more security actions selected to deter the person from performing the predicted event within the zone.

17. The apparatus of claim 16, wherein the instructions are further executable by the processor to cause the apparatus to:
receive the video input, an image input, an audio input, or a combination thereof, from a camera associated with the security system, wherein at least one sensor of the one or more sensors comprises the camera.

18. The apparatus of claim 16, wherein the instructions to determine the one or more characteristics are executable by the processor to cause the apparatus to:
analyze a gait of the person, a physical behavior of the person, a clothing of the person, or an object carried by the person, or any combination thereof; and
determine, based at least in part on the analyzing, a likelihood that the person is to perpetrate the predicted event.

19. The apparatus of claim 16, wherein the instructions to determine the one or more characteristics are executable by the processor to cause the apparatus to:
determine that the received set of inputs satisfy one or more thresholds, wherein predicting the event is based at least in part on the received set of inputs satisfying the one or more thresholds.

20. A non-transitory computer-readable medium storing code comprising instructions executable by a processor to:
receive a set of inputs from one or more sensors of a security system, the set of inputs comprising a video input;
detect a presence within a field of view of the video input;
determine that the presence is within a zone established within the field of view of the video input based on the received set of inputs and a dimension of the zone;
determine, by inputting the received set of inputs into an artificial intelligence model, that the presence comprises a presence of a person;
determine one or more characteristics of a person proximate the one or more sensors based at least in part on the received set of inputs;
predict an event within the zone based at least in part on a correlation between the one or more characteristics and the event; and
perform one or more security actions prior to the predicted event, the one or more security actions selected to deter the person from performing the predicted event within the zone.

21. The apparatus of claim 16, wherein the processor comprises a processor of at least one of: a control panel, a local computing device, a remote computing device, or a server.

22. The apparatus of claim 16, wherein the processor comprises a processor of an outdoor camera.

23. The apparatus of claim 16, wherein the instructions are further executable by the processor to transmit an alert of the detected person to a mobile computing device of a user.

24. The apparatus of claim 16, wherein the instructions are further executable by the processor to transmit an audio message from the user to the detected person via a microphone of the mobile computing device and a speaker of the one or more sensors.

25. The apparatus of claim 16, wherein the instructions are further executable by the processor to transmit an additional audio message from a microphone of the one or more sensors to a speaker of at least one of a computing device and a control panel.

26. The apparatus of claim 16, wherein the instructions are further executable by the processor to transmit an image, a video feed, or a combination thereof of the detected person from the one or more sensors to a mobile computing device, and display, via a mobile application of the mobile computing device, the image, video feed, or combination thereof of the detected person to a user on an electronic display screen of the mobile computing device.

27. The apparatus of claim 16, wherein the instructions are further executable by the processor to transmit an image, a video feed, or a combination thereof of the detected person from the one or more sensors to a control panel and display the image, video feed, or combination thereof of the detected person to a user on an electronic display screen of the control panel.

28. The apparatus of claim 16, wherein:
the one or more sensors comprises an outdoor camera; and
the one or more security actions comprises emitting a sound from a speaker of the outdoor camera to deter the person.

29. An apparatus, comprising:
means for receiving a set of inputs from one or more sensors of a security system, the set of inputs comprising a video input;
means for detecting a presence within a field of view of the video input;
means for determining that the presence is within a zone established within the field of view of the video input based on the received set of inputs and a dimension of the zone;
means for determining, by inputting the received set of inputs into an artificial intelligence model, that the presence comprises a presence of a person;
means for determining one or more characteristics of the person based at least in part on the received set of inputs;
means for predicting an event within the zone based at least in part on a correlation between the one or more characteristics and the event; and
means for performing one or more security actions prior to the predicted event, the one or more security actions selected to deter the person from performing the predicted event within the zone.

\* \* \* \* \*